(12) United States Patent
Biran et al.

(10) Patent No.: US 8,983,891 B2
(45) Date of Patent: Mar. 17, 2015

(54) PATTERN MATCHING ENGINE FOR USE IN A PATTERN MATCHING ACCELERATOR

(75) Inventors: Giora Biran, Zichron-Yaakov (IL); Christoph Hagleitner, Zurich (CH); Timothy H. Heil, Rochester, MN (US); Russell D. Hoover, Rochester, MN (US); Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/022,881

(22) Filed: Feb. 8, 2011

(65) Prior Publication Data

US 2012/0203730 A1 Aug. 9, 2012

(51) Int. Cl.
*G06N 5/02* (2006.01)

(52) U.S. Cl.
CPC ...................................... *G06N 5/025* (2013.01)
USPC .......................................................... 706/48

(58) Field of Classification Search
None
See application file for complete search history.

(56) References Cited

U.S. PATENT DOCUMENTS

| | | | | |
|---|---|---|---|---|
| 6,178,261 | B1* | 1/2001 | Williams et al. | 382/190 |
| 6,435,737 | B1* | 8/2002 | Wise et al. | 712/200 |
| 6,757,787 | B2* | 6/2004 | Shen et al. | 711/141 |
| 8,402,003 | B2* | 3/2013 | Biran et al. | 707/688 |
| 2005/0132342 | A1 | 6/2005 | Van Lunteren | |
| 2005/0273450 | A1* | 12/2005 | McMillen et al. | 707/1 |
| 2007/0124146 | A1 | 5/2007 | Lunteren | |
| 2009/0307175 | A1* | 12/2009 | Francesco et al. | 706/48 |
| 2012/0158635 | A1* | 6/2012 | Van Lunteren | 706/48 |
| 2012/0203718 | A1* | 8/2012 | Biran et al. | 706/12 |
| 2012/0203729 | A1* | 8/2012 | Biran et al. | 706/48 |
| 2012/0203730 | A1* | 8/2012 | Biran et al. | 706/48 |
| 2012/0203753 | A1* | 8/2012 | Biran et al. | 707/706 |
| 2012/0203754 | A1* | 8/2012 | Biran et al. | 707/706 |
| 2012/0203755 | A1* | 8/2012 | Biran et al. | 707/706 |
| 2012/0203756 | A1* | 8/2012 | Biran et al. | 707/706 |
| 2012/0203761 | A1* | 8/2012 | Biran et al. | 707/713 |
| 2012/0203970 | A1* | 8/2012 | Biran et al. | 711/128 |
| 2012/0204000 | A1* | 8/2012 | Biran et al. | 711/202 |

OTHER PUBLICATIONS

Jan van Lunteren, "High-Performance Pattern-Matching for Intrusion Detection", Proceedings of IEEE INFOCOM '06, Barcelona, Spain, Apr. 2006.*

(Continued)

*Primary Examiner* — Kakali Chaki
*Assistant Examiner* — Fuming Wu
(74) *Attorney, Agent, or Firm* — International IP Law Group, PLLC

(57) ABSTRACT

A pattern matching accelerator (PMA) for assisting software threads to find the presence and location of strings in an input data stream that match a given pattern. The patterns are defined using regular expressions that are compiled into a data structure comprised of rules subsequently processed by the PMA. The patterns to be searched in the input stream are defined by the user as a set of regular expressions. The patterns to be searched are grouped in pattern context sets. The sets of regular expressions which define the pattern context sets are compiled to generate a rules structure used by the PMA hardware. The rules are compiled before search run time and stored in main memory, in rule cache memory within the PMA or a combination thereof. For each input character, the PMA executes the search and returns the search results.

31 Claims, 31 Drawing Sheets

(56) References Cited

OTHER PUBLICATIONS

Jan van Lunteren and Ton Engbersen, "High-Performance Pattern-Matching Engine for Intruction Detection—A New Approach for Fast Programmable Accelerators" (Slides), HC 17, Aug. 14-16, 2005, Memorial Auditorium, Stanford University.*
Jan van Lunteren, "High-Performance Pattern-Matching for Intrusion Detection," Proceedings of IEEE Infocom, 2006.*
Lunteren et al., "High-Performance Pattern-Matching for Intrusion Detection," Slides, HC-17, 2005.*
Lunteren, "High-Performance Pattern-Matching for Intrusion Detection," Proceedings IEEE Infocom, 2006.*
Lunteren, "High-Performance Pattern-Matching for Intrusion Detection," Proceedings IEEE Infocom INFOCOM 2006, Apr. 23-29, 2006, 13 pp.*
J Van Lunteren et al., "XML Accelerator Engine," First International Workshop on High Performance XML Processing, in conjunction with the 13th International World Wide Web Conference (WWW2004), New York, N.Y., USA, May 2004. URL: http://www.research.ibm.com/XML/IBM_Zurich_XML_Accelerator_Engine_paper_2004May04.pdf.
Jan Van Lunteren et al., "High-Performance Pattern-Matching for Intrusion Detection," Proceedings of IEEE INFOCOM'06, Barcelona, Spain, Apr. 2006.
Davide Pasetto et al., "Tools for Very Fast Regular Expression Matching," IEEE Computer, Mar. 2010.

* cited by examiner

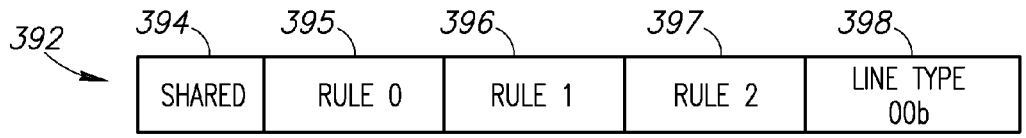
FIG.26
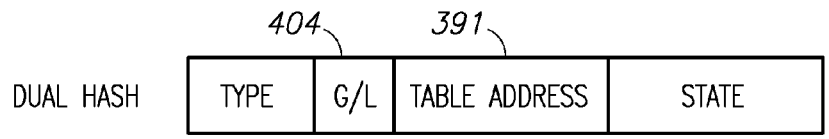
FIG.27A
FIG.27B
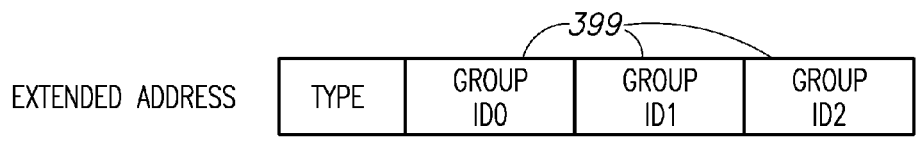
FIG.27C
| SHARED | RULE 0 | RULE 1 | RULE 0 EXTENSION | LINE TYPE 01b |
| SHARED | RULE 0 | RULE 1 | RULE 1 EXTENSION | LINE TYPE 10b |
| SHARED | RULE 0 | RULE 1 | RULE 0/1 EXTENSION | LINE TYPE 11b |
FIG.28

PATTERN MATCHING ENGINE FOR USE IN A PATTERN MATCHING ACCELERATOR

FIELD OF THE INVENTION

The present invention relates to the field of data processing, and more particularly relates to a pattern matching accelerator (PMA) and related sub-systems for use in high-speed pattern matching applications.

SUMMARY OF THE INVENTION

There is thus provided in accordance with the present invention, an apparatus for pattern matching, comprising a state register operative to store a current state, a rules selector operative to perform a comparison among a plurality of rule candidates read from a transition rules memory and a default rules memory in search of a rule matching said current state, said transition rules stored in compressed form in said transition rules memory and said default rules stored in compressed form in said default rules memory, and an address generator operative to point to a next plurality of rules to be matched against said input character stream by the output of said rules selector.

There is also provided in accordance with the present invention, a method of pattern matching, said method comprising providing a state register for storing a current state, performing a comparison among a plurality of rule candidates read from a rules memory cache to search for a rule matching said current state, said rules stored in compressed form in said rules memory cache, performing a pattern search on an input character stream in accordance with said matching rule, and generating the address of a next rule to be matched against said input character stream.

There is further provided in accordance with the present invention, a method of pattern matching, said method comprising receiving a stream of input characters to be searched, for each input character, generating a transition rule address and a default rule address, reading transition rules corresponding to said transition rule address and default rules corresponding to said default rule address from a memory cache, checking for a match on said input character stream in accordance with said transition rule and said default rule, and generating a next rule address based on the state information of a currently selected rule.

There is also provided in accordance with the present invention, a pattern matching apparatus, comprising providing a state register operative to store a current state, a first circuit operative to receive an input character stream, a second circuit operative to generate a transition rule address and a default rule address for each input character, a rules selector circuit operative to compare a plurality of transition rule candidates corresponding to said transition rule address and default rules corresponding to said default rule address from a rules memory cache coupled thereto in search of a rule matching said current state, said transition rules and said default rules are both stored in compressed form in said rules memory cache, a matching circuit operative to perform a pattern search on said input character stream in accordance with said transition rule and said default rule, and an address generator operative to generate the address of a next rule based on the state information of a currently selected rule.

BRIEF DESCRIPTION OF THE DRAWINGS

The invention is herein described, by way of example only, with reference to the accompanying drawings, wherein:

FIG. 26 is a diagram illustrating the structure of an example rule;

FIG. 27A is a diagram illustrating the format of the shared field in the case of dual hash;

FIG. 27B is a diagram illustrating the format of the shared field in the case of an LRP instruction;

FIG. 27C is a diagram illustrating the format of the shared field in the case of an extended address;

FIG. 28 is a diagram illustrating the structure of a rule line with extended rules;

DETAILED DESCRIPTION OF THE INVENTION

Figure 1:
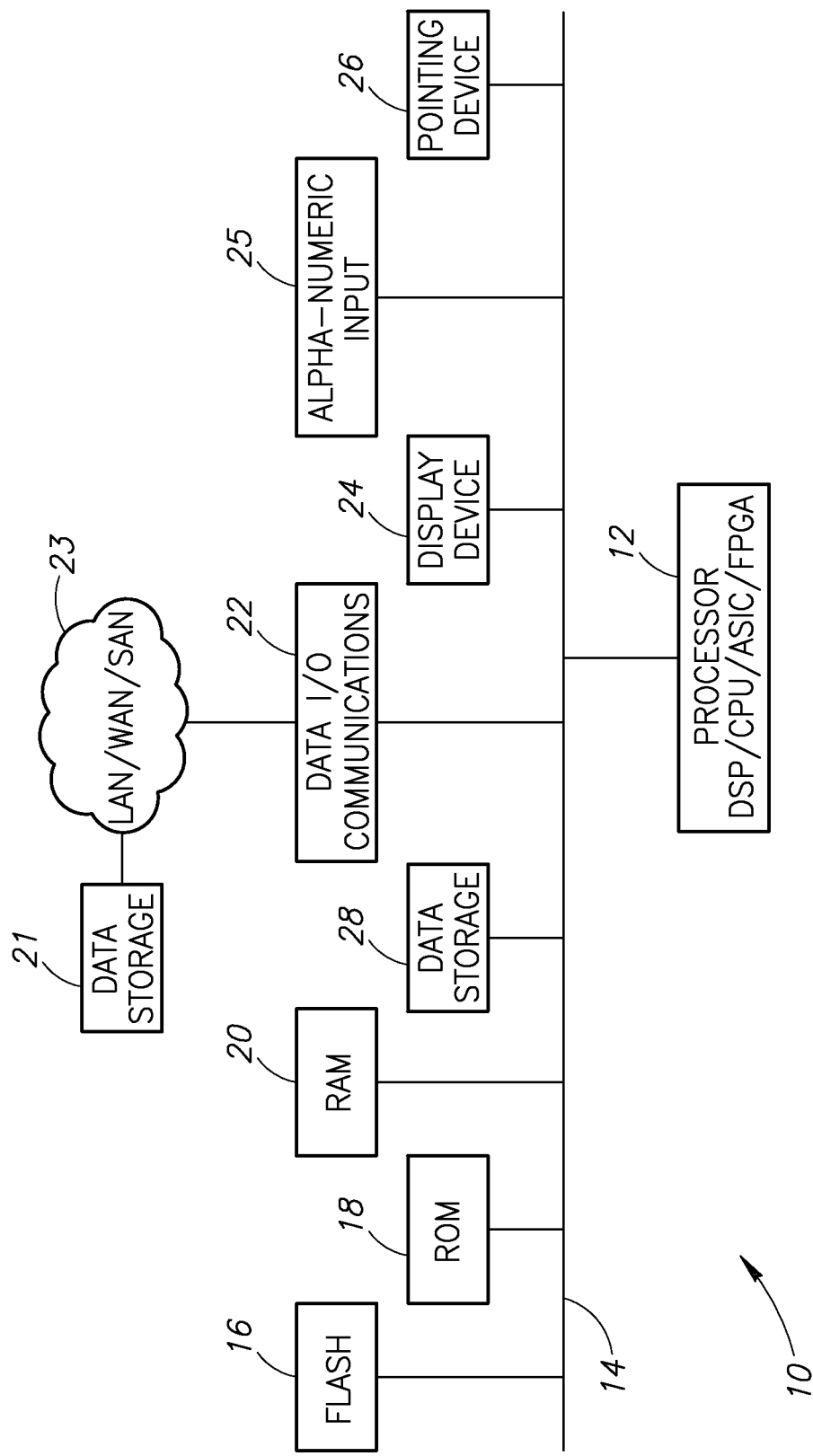
FIG. 1 is a block diagram illustrating an example computer processing system adapted to implement the pattern matching mechanism of the present invention.

Many computing applications require scanning for groups of patterns in streams of data. For example, in the field of network security, network traffic is scanned for viruses and other types of network attacks. Patterns are developed to identify known attacks, and the incoming traffic is scanned for these patterns.

Rather than search for patterns one at a time, such applications usually group individual patterns into sets called pattern contexts. The application searches the data for all patterns in a pattern context simultaneously. Applications typically have many such contexts for scanning different types of data in the input data stream.

This processing may be done by a gateway server, a dedicated network appliance or the computer that is the final destination of the network traffic. The gateway server or network appliance essentially interpose themselves between the computers on a local area network (LAN) and the outside world, guaranteeing a level of security for all computers on the LAN.

For most common protocols, such as TCP/IP, network traffic arrives in the form of packets. Packets from multiple data streams (or sessions) are usually interleaved, with each session being processed essentially independently. It is appreciated that numerous other applications of the PMA unit are possible, for example, text analysis applications, protein analysis applications, etc.

The data in the packets are scanned against the patterns as they are received. This scanning can be executed by software, or a dedicated ASIC, FPGA or other computing device or chip. The patterns are supplied as some form of regular expressions, a well-known and well-developed class of pattern specification. There are many variations of regular expressions, but they typically provide means of specifying: string literals; case insensitivity; character classes (e.g., a digit, or an upper class letter); repetition (e.g., using quantifiers); and OR operations (i.e. match one of several possibilities).

The patterns are compiled before the software or hardware uses them to scan the packet data. This involves converting the human-readable regular expression syntax into an internal form that the PMA can handle.

For each detected pattern, the PMA produces a match report. The match report indicates which pattern was matched and where the match was found. The application typically analyzes the match reports as needed and takes appropriate action, e.g., rejecting the packet. In many cases, match reports cause the application to perform deeper inspection of the packet data.

Network applications such as the security application just described require high-speed scanning of data streams with low latency and high throughput to meet the increasing speed of modern computer networks. The present invention provides a pattern matching hardware accelerator optimized for scanning data streams against predefined sets of patterns at high speed that meets these requirements.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement the system and methods of the present invention is shown in FIG. 1. The computer system, generally referenced 10, comprises a processor 12 which may comprise a digital signal processor (DSP),7 central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 and/or 28 for storing application programs and data. The system comprises computer readable storage medium that may include any suitable memory means, including but not limited to, magnetic storage, optical storage, semiconductor volatile or non-volatile memory or any other memory storage device.

Software adapted to implement the system and methods of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Pattern Matching Accelerator Overview

Throughout this document the term pattern is defined as a definition of a set of strings, where a string is defined as any sequence of symbols or bits, such as the ASCII character set, for example. One common example of a pattern is a regular expression which provides for matching strings of text, such as particular characters, words, or patterns of characters. A pattern context is defined as a set of patterns grouped together. A pattern context set is defined as a set of pattern contexts grouped together (i.e. a superset of pattern contexts).

Throughout this document the term "rule" is defined as a specification of a transition from one or multiple states to one next state within a state diagram or tree structure. A rule comprises a set of conditions defining the states and the input values for which the rule applies. This is denoted as the test part of the rule. A rule also comprises a result part which defines the next state. The result part may further include information associated with the next state, such as the hash information needed to search for a matching rule for the next state and a given input value, and, for example, a result flag indicating that the next state corresponds to the detection of a given pattern in the input stream. Further information may also be associated with a rule, for example, an instruction. Rules also have a priority assigned.

Throughout this document the term "initial rule" is defined as a rule branching to the initial state, i.e. the initial rule's result part defines the initial state as next state. The term "default rule" is defined as a rule that is assigned as such by the pattern compiler or by other means, and which will be evaluated and selected if matched by the search engine when no matching transition rule has been found for a given current state. The term "transition rule" is defined as a rule that is neither an initial rule nor a default rule.

Throughout this document the term "rules structure" is defined as a data structure that is comprised of rules and which is organized in such way that it can be executed by a search engine (SE). The rules structure may also comprise further information that is associated with the rules it contains, for example, instructions.

Throughout this document the term search engine is defined as a programmable state machine implemented in hardware, software or a combination thereof. A search engine (also referred to as a pattern search engine) is programmed by providing/writing a rules structure in a memory that is accessed by the search engine. The search engine processes an input data stream by executing the given rules structure in the following way. For each consecutive input character in the input stream the highest-priority rule is searched in the rules structure having a test part containing conditions that match the current state and the given input character. The next state defined in the found rule then becomes the new state of the search engine and is used to process the next input character.

Figure 2:
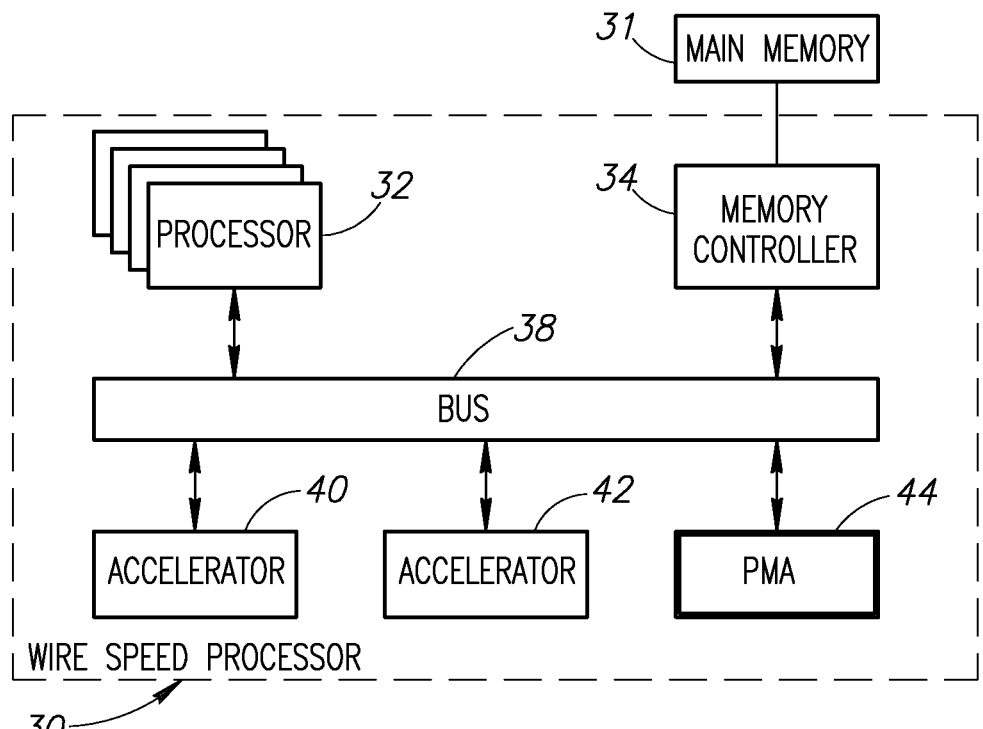
FIG. 2 is a high level block diagram illustrating the pattern matching coprocessor of the present invention in an example wire speed processor.

A high level block diagram illustrating the pattern matching coprocessor of the present invention in an example wire speed processor is shown in FIG. 2. The example wire speed processor, generally referenced 30, comprises one or more general purpose CPU cores 32, a memory controller 34 coupled to main memory 31 (alternatively may be internal to processor 30), one or more accelerators 40, 42 and processor bus (or system bus) (Bus) 38. One of the accelerators comprises a pattern matching accelerator (PMA) 44 that is attached to the Bus. The PMA (also referred to as PMA unit or module) assists software threads to find the presence and location of strings in an input data stream that match a given pattern. The patterns are defined using regular expressions which are compiled into a data structure comprised of rules, also denoted as rules structure, subsequently processed by the search hardware.

Figure 3:
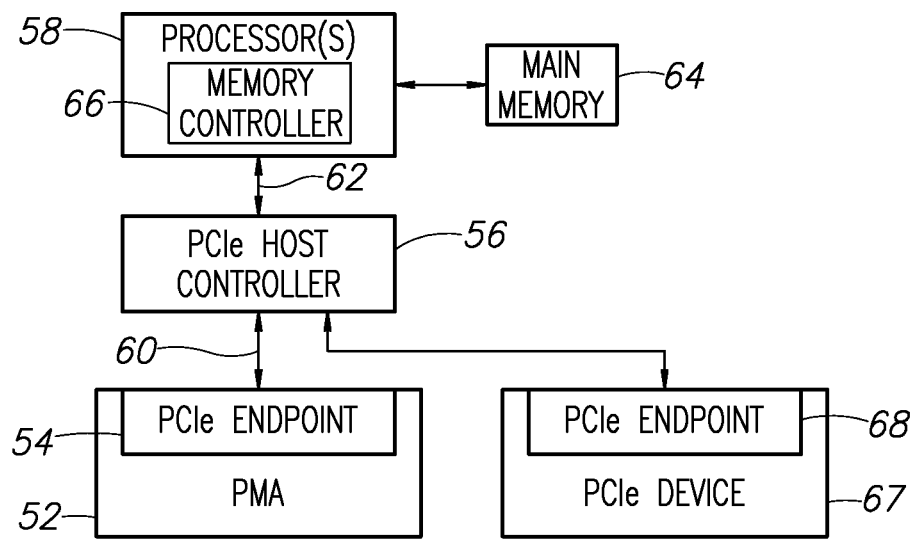
FIG. 3 is a high level block diagram illustrating an alternative embodiment of the pattern matching engine of the present invention as a stand alone component.

Note that in an alternative embodiment shown in FIG. 3, the PMA is implemented as a stand alone integrated circuit 52. In this embodiment, the PMA is attached to a PCIe endpoint controller 54 to form a PCIe attached accelerator that communicates over PCIe link 60, for example, with a host PCIe adapter 56 connected over a bus 62 to one or more processor(s) 58 (e.g., general purpose CPU core(s)). As an example a second PCIe device 67 is shown in communication with the processors 58 via PCIe endpoint 68 and PCIe host 56. The processors 58 communicate with main memory 64 via memory controller 66. It is appreciated that any suitable communication link, other than PCIe, could also be used without departing from the scope of the invention. In this embodiment, the structure of the PMA is the same as the PMA in FIG. 2.

The patterns to be searched in the input stream are defined by the user as a set of regular expressions. The patterns are grouped in pattern contexts. Each pattern context includes one or more patterns to be searched. The full set of pattern contexts to be used by the system at a given time defines a pattern context set. The sets of regular expressions which define the pattern context set are compiled by a pattern compiler to generate a rules structure used by the accelerator hardware. The rules are compiled before search run time and stored in main memory, in rule cache memory within the PMA (described in more detail infra), or a combination of the two.

The software thread sends an application search command from the processor directly to the accelerator to initiate a search. It is appreciated that the mechanism of the invention may use any suitable method of initiating a search and is not critical to the invention, for example, utilization of a command queue in memory from which the PMA reads commands. Once received, the command comprises a pointer to the input data on which the search is done, one or more identifiers of the pattern context to be searched on the given input data, a pointer to the match results output buffer and other parameters required for the operation of the PMA. The PMA reads the data, executes the search and returns the search results back to the software through an output buffer.

At the end of the operation a status is returned and an optional additional status and/or completion notifications.

The PMA is based on the accelerator hardware as well as three associated software elements: (1) a regular expression compiler which functions to generate the hardware readable rules structure from the user defined regular expressions; (2) an upload manager which functions to manage a dynamic loading of rules into the PMA hardware local memory; and (3) API software that functions to format commands going to the PMA, interprets and post processes match results coming back from the PMA and manages data structures needed to communicate with the PMA (e.g., the output buffers). The compiler and upload manager software elements operate in the background of the normal PMA operation to allow dynamic updating and replacement of the pattern context set in use during run time.

The PMA is attached to the system bus through a Bus Interface Unit (BIU). The PMA is controlled by one or more software threads executing on one or more of the processor cores 32. The processor 32 defines a source buffer and an identifier of a set of patterns for a search, also referred to as a scan. Rules expressing the patterns to be searched are stored in local memory attached directly to the accelerator, or in the system memory. Upon completion of the search, information about any matches is returned, typically to the calling processor thread.

Example features of the PMA include (1) handling a rich set of regular expression features; (2) searching for multiple regular expressions (i.e. pattern contexts) in a single command which reads and processes the input characters and searches for regular expressions (patterns) in a single pass; (3) the ability to save and restore scan state, known as continuous search, to allow searching data which might be segmented to multiple network packets (such sequences referred to as a session), and supporting millions of simultaneously open sessions; (4) reporting all matches including reporting end position and supporting reporting of start match position; (5) wire speed processing providing high-speed pattern searching; and (6) relatively small chip real estate required in combination with no need for dedicated fast off-chip memory.

The software interface of the PMA comprises a search command that is initiated by software using an application search command initiated by a processor command. In one embodiment, the command stores one or more search commands allowing the input data to be read only once for one or more different pattern context searches. All search matches are reported back to the software through an output buffer in the PMA. In the event of a search match, the hardware reports the match position and an identifier of the matching pattern. In one embodiment, any number of concurrent sessions can be handled and continuous mode is supported whereby during a session processing, a search state is transferred between consecutive packets allowing a search to cross the boundary of a an input data stream pointed to by an application search command (i.e. typically a network packet). Further, the software interface supports packet interleaving whereby packets from different applications can be interleaved.

In one embodiment, the PMA comprises eight command units handling eight application search commands at a time, each command comprising two searches (i.e. up to 16 searches). Embodiments comprising any number of command units are contemplated as well. A flexible search is performed on a pattern set using a programmable state machine search engine referred to as a search engine. A plurality (e.g., four) of search engine lanes, each comprising a plurality (e.g., four) of parallel running search engines are provided. Each search engine comprises local rules (also referred to as resident rules) storage and global rules (also referred to as non-resident rules) storage. Rules required for a search which are not in the local storage are fetched by hardware from the main memory to the local memory. The rules are managed in a cache that in one example embodiment comprises both a software managed portion and a hardware managed portion. Local memory storage is managed by upload manager software using a set of management application search commands as described in more detail infra. In addition, a performance monitoring scheme allows tracking the efficiency of local memory usage. This information is used by the upload manager to select the rules that are placed in the local memory to improve search efficiency and performance.

Figure 4:
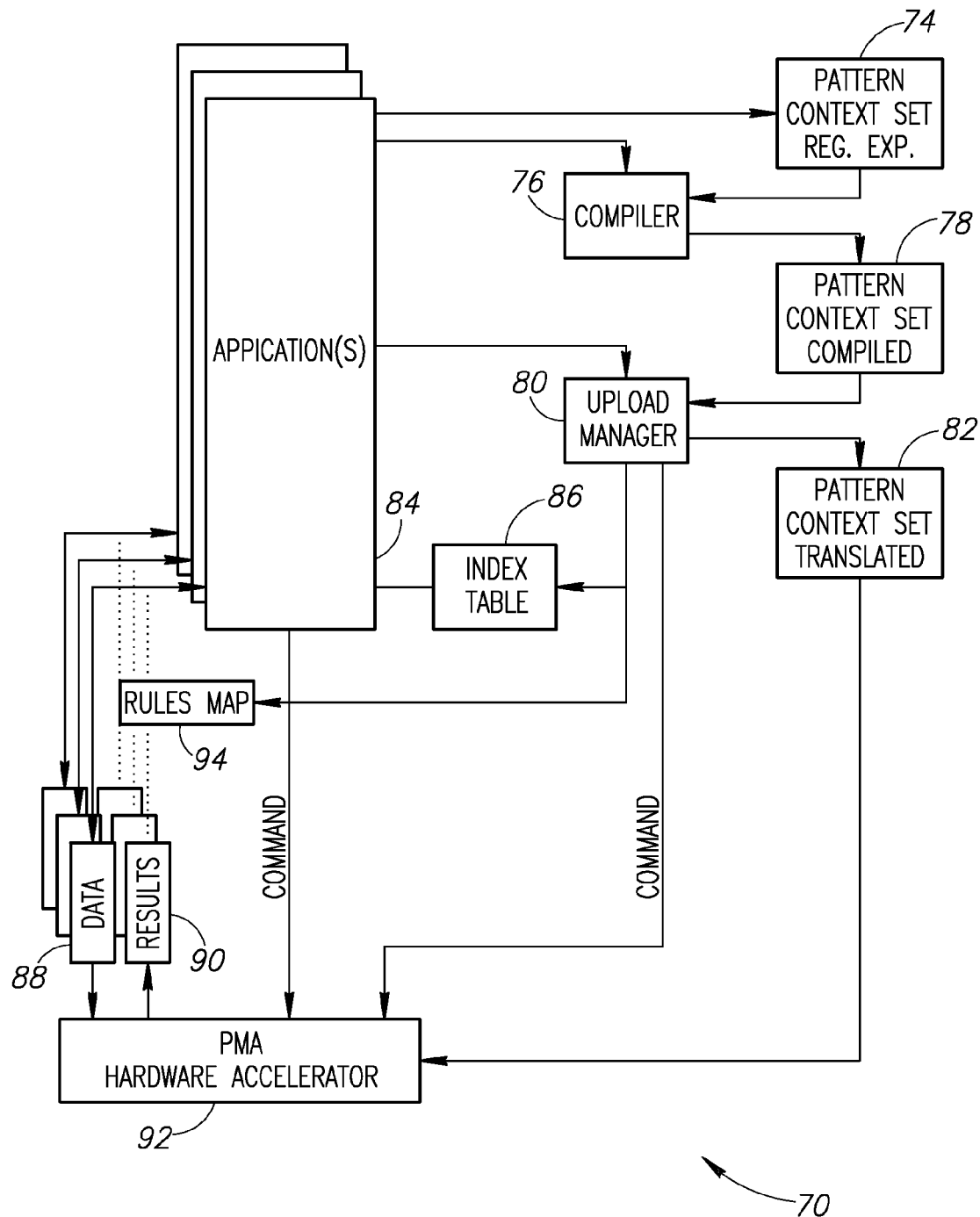
FIG. 4 is a high level block diagram illustrating the upload manager and PMA.

A high level block diagram illustrating the upload manager and PMA is shown in FIG. 4. The example circuit, generally referenced 70, comprises applications 84, compiler 76 comprising upper and lower layers, pattern context set (i.e. regular expressions) 74, compiled pattern context set 78, upload manager 80, translated pattern context 82, PMA 92, index table 86, rules map 94 data 88 and results 90.

The applications 84 define the pattern context set to be complied. The communication is performed to a system dependent compiler upper layer. This layer calls the compiler lower layer which functions as the compilation and rule optimization engine. The compiler 76 generates a compiled pattern context set 78 and communicates the rule structure to the upload manager 80. The upload manager 80 may receive pre-defined rule usage statistics to allow it select an optimized initial setting of the PMA local memory from the application preliminary information. The upload manager initializes the PMA internal data structures, such as the classifier, PCH table, Global Address Translation Table, and the local rules in the local memory using upload manager commands. During run time the upload manager collects performance information from the PMA hardware to optimize performance by replacing the local rules with frequently accessed rules. The applications call the hardware services directly using application search commands.

In operation, at the time of initialization or when an update is required, one of the applications 84 defines the pattern context set (PCS) and sends the regular expressions to the compiler 76. The compiler 76 functions to receive as input a set of pattern contexts as regular expressions 74 (analogous to source code). The compiler runs once and compiles the pattern context set into a compiled set of pattern contexts 78 (analogous to object code). The compiler generates a PCS file containing the output files of the compiled PCS input and a rules map comprising the mapping between PMA states (i.e. reported match results) and the patterns. The upload manager 80 takes the compiled pattern context set 78 and translates it to a translated version of the pattern context set 82 (analogous to linked object code) for writing to main memory that is accessed by the PMA 92 in a form that the hardware can execute. Subsequently, some rules in main memory are written to the local rule area. The upload manager functions to generate the Rules Map 94 comprising (1) mappings from application pattern context identifiers to uploaded hardware pattern context identifiers, used by the application when submitting searches; and (2) match report decode information used by the application to decode match results into application pattern identifiers. The upload manager also initializes the PMA hardware using upload manager commands and maintains the PMA data structures during run time. The application sends search instructions to the PMA hardware via processor commands and the hardware returns coded match results which the application translates using the match report decode information in the Rules Map.

Figure 5:
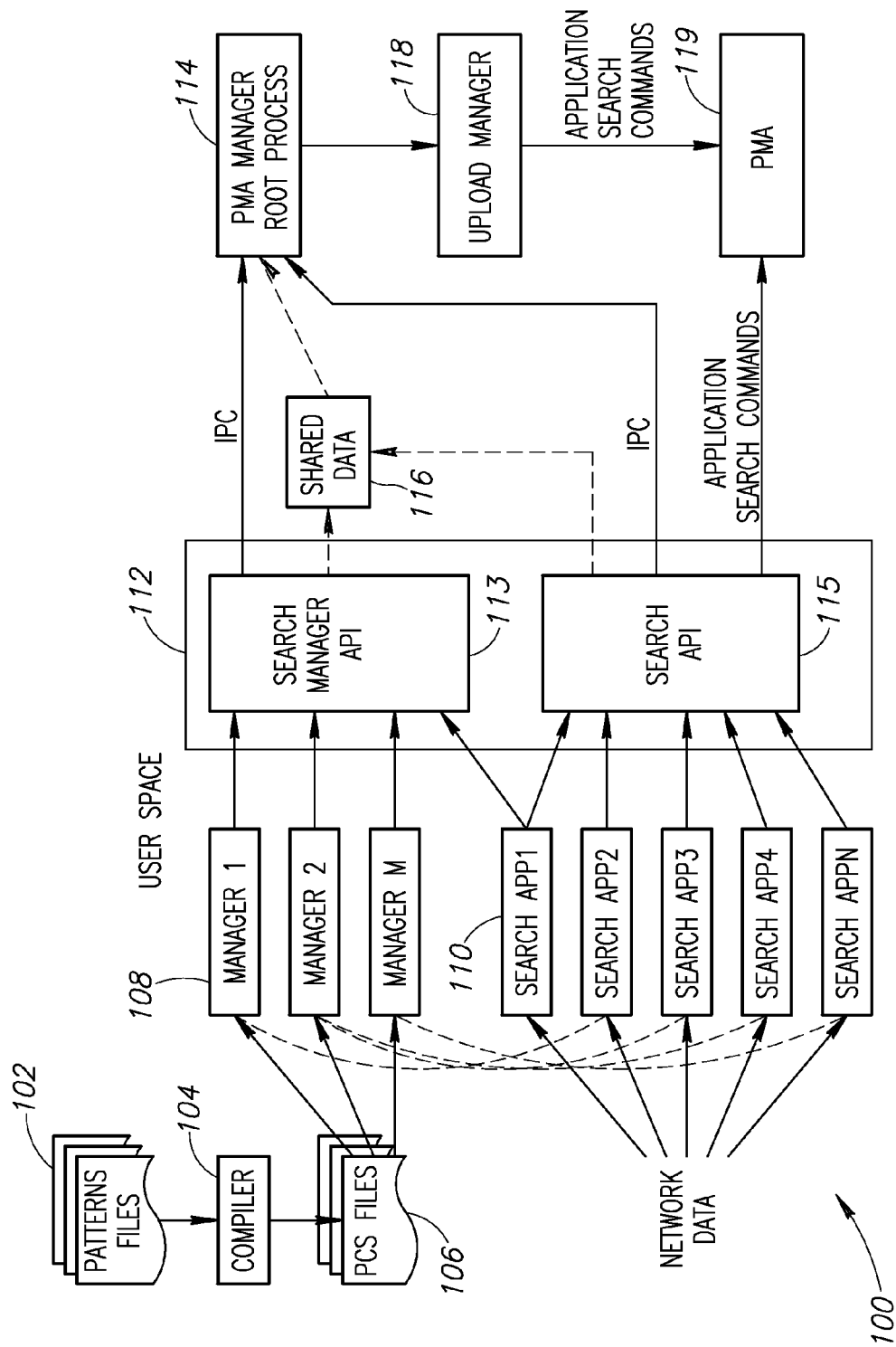
FIG. 5 is a diagram illustrating the PMA software structure and coprocessor library for an exemplary network security application.

A diagram illustrating the PMA software structure and coprocessor library for an exemplary network security application is shown in FIG. 5. The software structure comprises pattern files 102 input to the compiler 104 which functions to compile the pattern files into PCS files 106. The PCS files are input to the M manager tasks 108 in the user space which are handled by the search manager API 113 in the software library 112. Network data traffic is input to the N search applications 110 which are handled by the search API 115 in the library 112. The search manager API 113 and search API 115 communicate with the PMA root process 114 via inter-process communications (IPC) and a shared data block 116. The upload manager 118 configures the PMA 119 via application search commands which are also written to the PMA via the search API 115.

Figure 6:
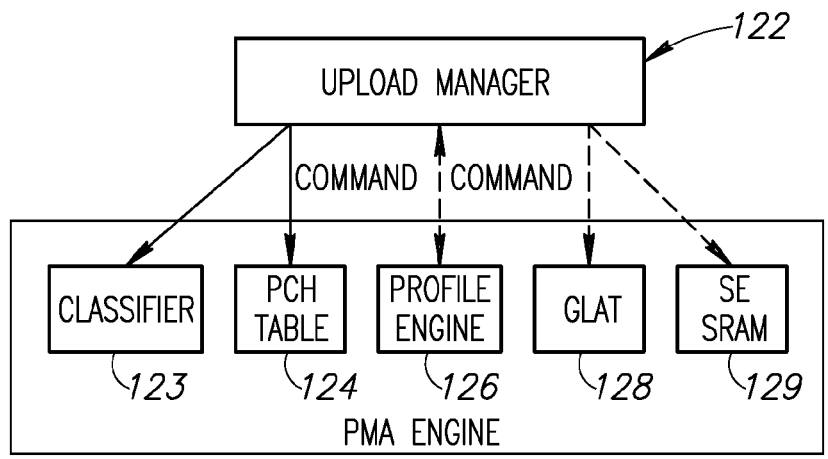
FIG. 6 is a high level block diagram illustrating the upload manager hardware interface.

A high level block diagram illustrating the upload manager hardware interface is shown in FIG. 6. The upload manager 122 is responsible for several sets of operations as follows: (1) managing the rules structure (i.e. the output of the compiler) in the main memory; (2) initializing various hardware structures in the PMA 120; and (3) monitoring the operation of the PMA and balancing its performance.

The upload manager controls the hardware using the following commands: (1) initializing the classifiers 123 in the search engine; (2) initializing the rules clusters in the local memory portion of the rules cache 129; (3) initializing the global⇔local address translation (GLAT) tables 128; (4) monitoring the usage of the rules using search engine performance counters 126 (described in more detail infra); and (5) initializing the pattern context header (PCH) table 124.

The PCH comprises management information required for the hardware to execute the search operation. This includes, but not limited to, a pointer to the related GLAT entries, the algorithm engines that can be used, the search engine in use in each algorithm engine, etc.

In operation, the upload manager sends a command in the form of an upload manager command using a processor command. The hardware comprises a separate queue (i.e. channel #2) for the upload manager commands, separate from the search commands sent by the applications (i.e. channel #1).

The upload manager is also responsible for tuning the rules stored in the search engine local memory to achieve optimal performance. One or more dedicated hardware search engine performance counters (BPC) functions to collect samples of the search engine processed rules and process it using a dedicated set of counters. Alternatively, the samples can be collected using software as well, depending on the particular implementation. The information on what to count is loaded by the upload manager sending a "Load BPC" command. The Load BPC either initializes the counter values, configures the sample processing (i.e. hash, mask, etc.) or both. The counter results are collected by the upload manager using a "Store BPC" command.

Figure 7:
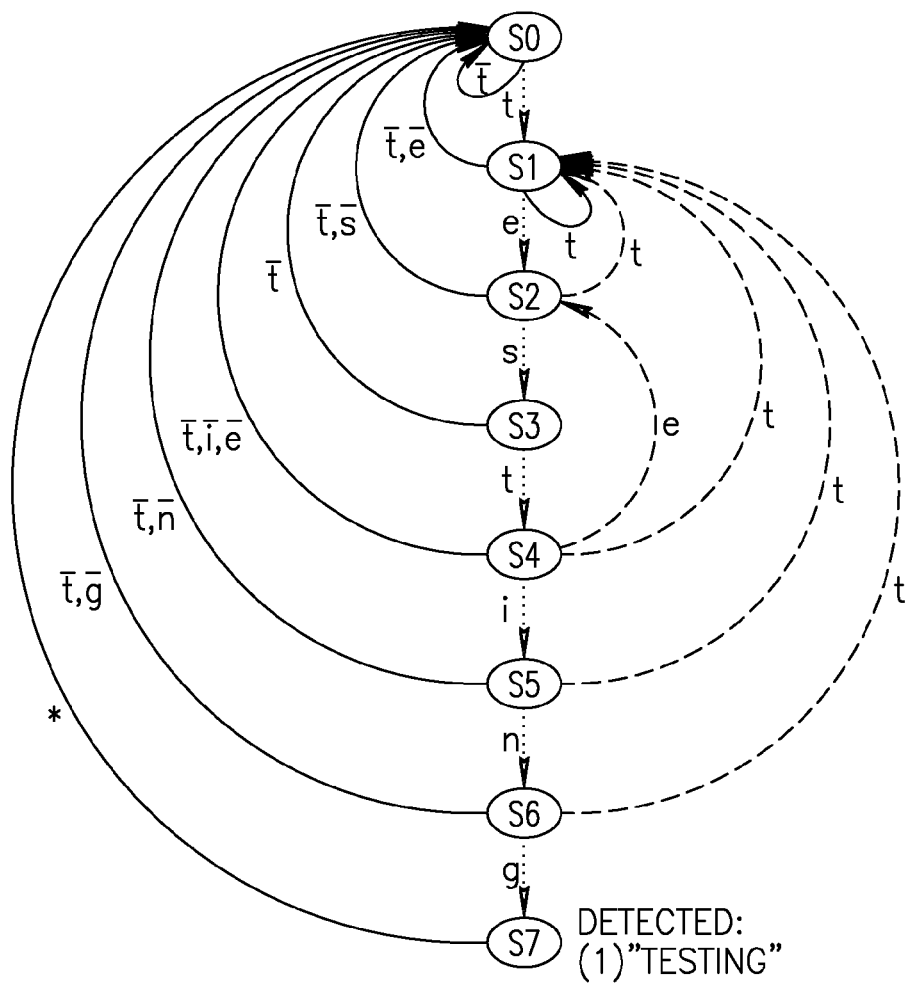
FIG. 7 is a pattern matching example search tree (i.e. state transition diagram) executed by the pattern matching engine.

A pattern matching example search tree (i.e. state transition diagram) executed by the pattern matching engine is shown in FIG. 7. The solid transition lines represent initial rules which point back to the initial state S0. The dashed transition lines represent default rules which point to a state at the first level in a search tree. The level of a state is defined in this case as the length of the shortest path in the search tree from the initial state to the given state, expressed in number of rules. The dotted transition lines represent transition rules which comprise all remaining rules that are neither initial rules nor default rules.

The pattern matching engine is based on a Finite State Machine (FSM) referred to as the search engine (SE) which in one embodiment, is optimized for hardware operation. In one embodiment, the search engine comprises a programmable state machine is referred to as a Balanced Routing Table search (BaRT)-based Finite State Machine or BFSM. The search engine is essentially a programmable FSM that stores the state transition rules in a large table. The rules structure obtained by compiling the pattern context set defines the transitions between the states which are evaluated by the search engine to determine the next state to branch to after processing an input character (i.e. symbol or byte) in a data stream being received by the search engine.

The data stream received by the search engine comprises a series of bytes, which may be a continuous stream or may be in the form of data packets (as is common in Internet communication). The search engine scans the data stream for input strings that match specific patterns. The PMA engine is configured to pass the data stream to each search engine involved in the scanning operation, and further arranged to output a signal indicating a pattern match when a state transition rule executed by one of the search engines indicates a pattern match.

As an example consider detecting all occurrences of the pattern "testing" in an input character stream. The match function is defined by the following seven search engine transition rules R3 to R9, one initial rule R1 and one default rule R2. The state transition rules for encoding such a state machine are as follows:

| | | State Transition Rules | | | | |
|---|---|---|---|---|---|---|
| Rule | Current state | Input | -> | Next State | Output | Priority |
| R1 | * | * | -> | S0 | — | 0 |
| R2 | * | t | -> | S1 | — | 1 |
| R3 | S1 | e | -> | S2 | — | 2 |
| R4 | S2 | s | -> | S3 | — | 2 |
| R5 | S3 | t | -> | S4 | — | 2 |
| R6 | S4 | i | -> | S5 | — | 2 |
| R7 | S5 | n | -> | S6 | — | 2 |
| R8 | S6 | g | -> | S7 | 1 | 2 |
| R9 | S4 | e | -> | S2 | — | 2 |

Each rule governs the operation of the search engine by moving from a first state to a second state according to the input, with a possible output being triggered by a change in state. The wildcard character '*' in rules R1 and R2 refers to any state or input. For example, the first state transition rule R1 includes a wildcard state condition and a wildcard input condition, the second state transition rule R2 includes a wildcard state condition and a specified input condition, and the third state transition rule R3 includes a specified state condition and a specified input condition. Transition rule R3 states that if an 'e' is received while in state S1, the next state will be S2. Transition rule R2 states that if a 't' is received while being in any given state, the next state will be S1. Transition rule R1 states that if any character is received while being in any state, the next state will be S0.

As this example illustrates, it is possible that multiple rules can match for a given state and input due to wildcard conditions. In order to resolve such situations, the state transition rules are assigned priorities as shown in the above table. When deciding on the change of state, the search engine acts on the rule with the highest priority, in case of multiple matching rules. For the above example, this means that if the search engine is in state S1, receiving an 'e' results in a transition to a next state S2 as defined by transition rule R3, receiving a 't' results in a transition to a next state S1 as defined by transition rule R2, and receiving any other character that is not an 'e' or a 't' results in a transition to the initial state S0 as defined by transition rule R1 which has the lowest priority.

If state S7 is reached, it means that the pattern 'testing' was successfully found. For that reason, rule R8, which defines the transition to state S7, includes an output component indicating a pattern match, which is the number one in the output column for that rule. Consequently, this set of rules will return an output one for each and every presence of the string "testing" in any longer input stream without returning an output one in any other circumstance.

Figure 8:
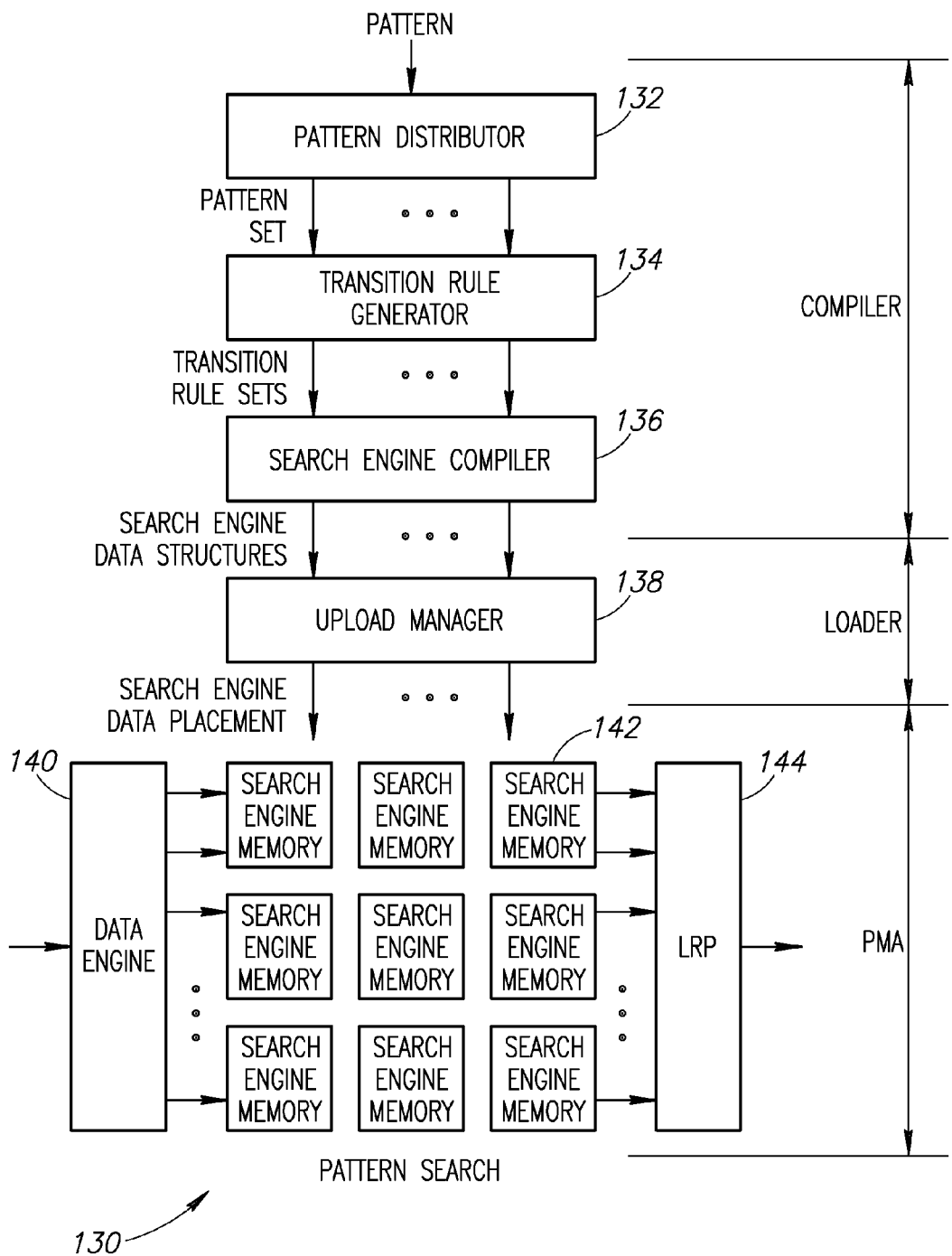
FIG. 8 is a diagram illustrating the compiler and associated loader and processing scheme.

The rules are generated automatically by a pattern context compiler. A diagram illustrating the compiler and associated loader and processing scheme is shown in FIG. 8. The pattern context compilation scheme, generally referenced 130, is divided into three portions, namely, a compiler portion comprising pattern distributor 132, transition rule generator 134 and search engine compiler 136; a loader portion comprising upload manager 138; and a hardware multi-threaded processing portion comprising pattern search mechanism including input controller 140, a plurality of search lanes each including a plurality of search engines and associated cache memory 142 and a results processor 144.

The pattern compiler functions to compile the input pattern context set, which is defined as regular expressions, into the set of binary rules processed by the PMA hardware. The pattern compiler has three main software building blocks: (1) a pattern distributor 132 distributes patterns over multiple pattern sets, based on pattern properties (conflicts, overlaps); (2) a transition rule generator 134 converts each pattern set into state transition rule sets; and (3) a search engine compiler 136 organizes transition rule sets into search engine data structures using state clustering, state encoding, and Balanced Routing Table (BaRT) search algorithm based compression.

The pattern contexts, expressed as regular expressions, are processed by a compiler. The compiler runs offline and functions to generate a rules structure, equivalent to the input regular expressions. The executable rules structure is processed by a set of hardware search engines, i.e. the search engines, inside the PMA. The rules structure is loaded into the PMA rule memory by the upload manager software which initializes the PMA hardware. The upload manager operates as a "driver" that controls the PMA. The upload manager also functions to monitor the operation of the hardware and dynamically reloads the rules to the local rules area within the PMA to optimize the performance of the PMA hardware.

Figure 9:
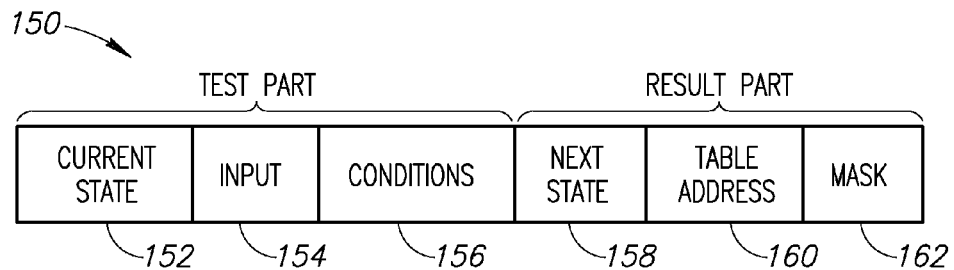
FIG. 9 is a diagram illustrating the format of an example rule.

A diagram illustrating the format of a rule is shown in FIG. 9. The rule, generally referenced 150, comprises a current state 152, input 154, conditions field 156, next state 158, table address 160 and mask 162. The test part of the rule functions to check that this rule applies to the current input character and search engine state. The results part of the rule functions to define the next state (i.e. new state) of the search engine if the test part passes successfully. The result part of rules that branch to a next state that corresponds to a match includes a so called result flag to indicate a match. Note that the invention includes alternative means of match reporting as well. The search engine reads new rules for every input character and updates the state register accordingly. Every cycle the search engine reads two new rule lines (e.g., each rule line comprises a plurality of rules (e.g., three)). One rule line is for the transition rules and the other rule line is for the default rules. The pattern search decision is made based on the information in both rule lines. The frequency of this cycle defines the maximal bandwidth of a single search engine.

Figure 10:
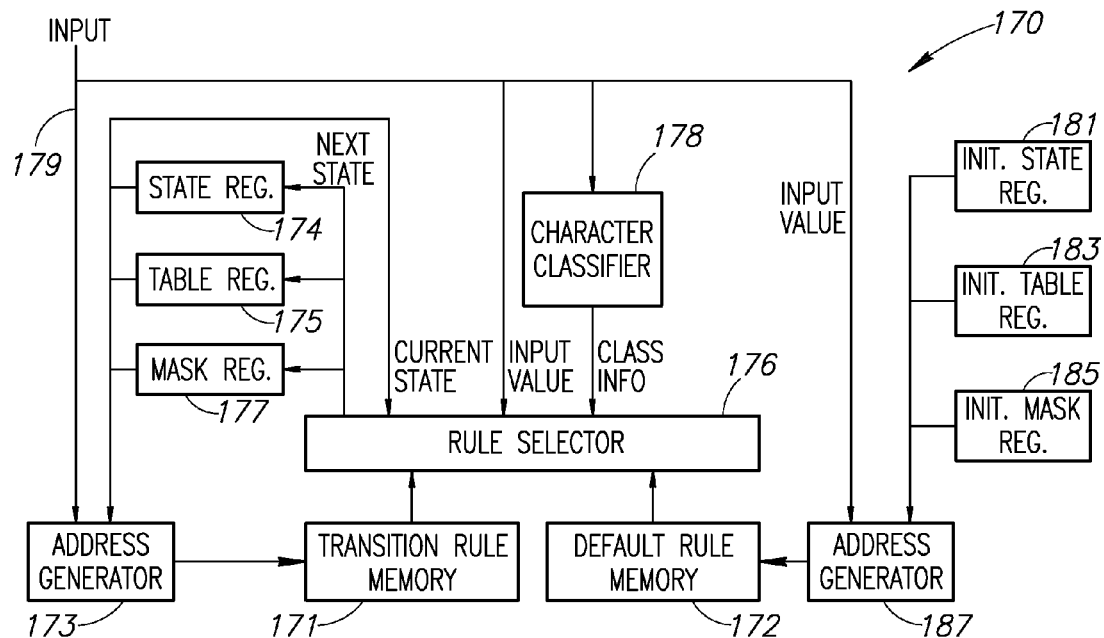
FIG. 10 is a high level block diagram illustrating the operation of the search engine search engine state machine.

A high level block diagram illustrating the operation of the search engine state machine is shown in FIG. 10. The circuit, generally referenced 170, comprises a transition rule memory 171 for storing transition rules, a default rule memory 172 for storing default rules, both of which are coupled to a rule selector 176 which functions to determine which rule applies and generates the next state based on the current contents of the state register 174, output of the classifier 178, default rule memory 172, transition rule memory 171 and the input character stream 179. The circuit 170 also comprises transition rule address generator 173, table register 175, mask register 177, default rule address generator 187 and initial state register 181, initial table register 183 and initial mask register 185. The state, table and mask registers keep track of the current state of the search engine.

For each character, the search engine reads a set of transition rules based on the current state and input character and a set of default rules based on the initial state and input character, compares the rules against the input character, and selects the next state based on one of the rules. Basic search engine operation performs the following operation for each input character: (1) calculate the address for the transition rule line based on the current search engine state and the current character, and calculate the address for the default rule line based on the initial search engine state and the current character; (2) read the rules from the search engine rule tables; (3) for each one of the rules, check if the current state and character meets the rule's match criteria; (4) pick the matching rule, and if multiple rules match, the one with the highest priority is selected according to a well-defined rule priority; (5) each rule has a result flag, and if the selected rule's result flag is set, a match is reported; and (6) the search engine state is updated to the next state, as determined by the rule.

Each search engine rule comprises three basic portions: (1) a match portion; (2) a next state portion; and (3) various flags. The match portion determines if the rule matches. The match portion checks if the input character or the class info provided by the classifier matches the test part of a particular rule. Various types of character checks include case-sensitive and case-insensitive tests, class tests, and negated tests. The match portion also checks if the rule applies to the current state, allowing rules for multiple states to be packed together on a single rule line. Considering the next-state portion, if the rule matches, the search engine state is updated which controls the set of rules read and processed for the next character. Various flags include, for example, the result flag.

The search engine has three kinds of rules (transition rules, default rules and initial rules), all of which may be read for a given character. Transition rules are read based on the current state and the input character. Transition rules have a higher priority than the default rules and initial rules. Default rules are used when no matching transition rule is found. The default rules are read based on the initial state and the input character. Since the default rules will match any given state, they depend only on the input character. The initial rule has the lowest priority and is only used if no other matching rule is found. The initial rule simply returns the search engine to the initial state, and is not a rule in the normal sense that something is read from the table.

Default and transition rules are indexed separately, and are therefore typically held in separate physical data structures. For each character, the search engine reads a line of transition rules and a line of default rules. Each line typically contains multiple rules, all of which are checked in parallel. In one embodiment, the priority of the transition rules and the default rules in each line is defined in a decreasing priority from left to right.

Search trees (or state transition diagrams) for pattern matching applications typically include states for which no transition rules are defined. One example is state S7 in FIG. 7, for which only the initial rule branching to state S0 applies, which is represented by a solid transition line. For these types of states no transition rules have to be read, but rather only default rules are read. This is to enable saving memory access bandwidth and improving performance by preventing additional latency in case of a miss to the rules cache. This is exploited by providing a corresponding indication in the rules branching to a next state for which no transition rules are defined. The latter types of states are also referred to as "next state invalid". In one example embodiment, this information can be provided using a special encoding of the next state within a rule, for example, starting with two bits set at the most significant bit positions.

The search engine thus defines a compact way to calculate the next address using a limited set of match conditions. This allows relatively simple hardware to run at high frequency to achieve high-performance pattern matching.

As an illustrative example, consider the search for the example pattern "testing" shown in FIG. 7. If a portion of the data stream comprises "testesting" (which contains only a single match with the pattern "testing"), then the search engine operates according to the rules of the table shown supra as follows:

Starting with state S0 (the search engine always defaults to this state); the first letter "t" R2 applies and moves to state S1 (R2 has a higher priority than R1 and so takes precedence, R5 does not apply as the current state is not S3); second letter "e" R3 applies and moves to S2; third letter "s" R4 applies and moves to S3; fourth letter "t" R5 applies and moves to S4; fifth letter "e" R9 applies and moves to S2; sixth letter "s" R4 applies and moves to S3; seventh letter "t" R5 applies and moves to S4; eighth letter "i" R6 applies and moves to S5; ninth letter "n" R7 applies and moves to S6; tenth letter "g" R8 applies and moves to S7 and outputs a "1" indicating that the pattern "testing", with corresponding pattern identifier "1", has been detected in the data stream being scanned by the search engine.

To permit the search engine state machine to run at maximal speed it is preferable to keep the required rules close to the search engine. In one embodiment, the PMA needs to access new rules every cycle. Therefore, the search engine reads the rules from a fast access SRAM inside the PMA.

The total rules image for a real application, however, can be hundreds of megabytes, making it impractical to keep all the rules in fast chip memory. Hence, not all the rules can be placed in local (on chip) storage. On the other hand, there is typically a clear pattern of commonly used pattern contexts on each of the workloads. The search engine therefore typically caches frequently accessed rules nearby while keeping the majority of rules in more distant memory structures. For example, depending on the implementation, several of the most commonly used pattern contexts may cover more than half of the character scans. Further, in typical applications most of the pattern contexts are rarely used. Even in frequently used contexts, most rules are rarely accessed. Those rules can be loaded when required from main memory. Performance profiler feedback is collected by the upload manager and used to tune the rules preloaded in the local rule cache store. Depending on the particular implementation, a low miss rate can be achieved for large pattern contexts. Smaller pattern contexts can be completely loaded to the local rules store.

Figure 11:
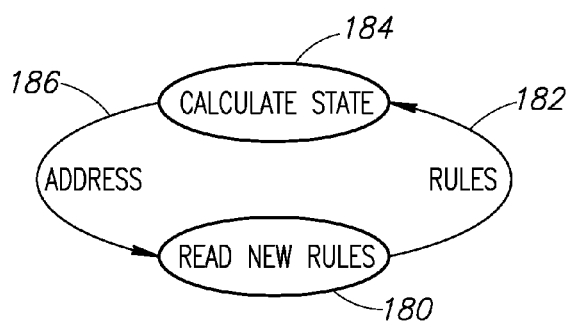
FIG. 11 is a high level diagram illustrating the cycling of the search engine.

As shown in FIG. 11, the search engine cycles between a read new rules state 180 and calculate next state 184. In the read new rules state, the search engine reads a new transition rule 182 for every input character processed. Using the rules 182 and the input character, an address 186 pointing to the next rule is generated in state 184.

Figure 12:
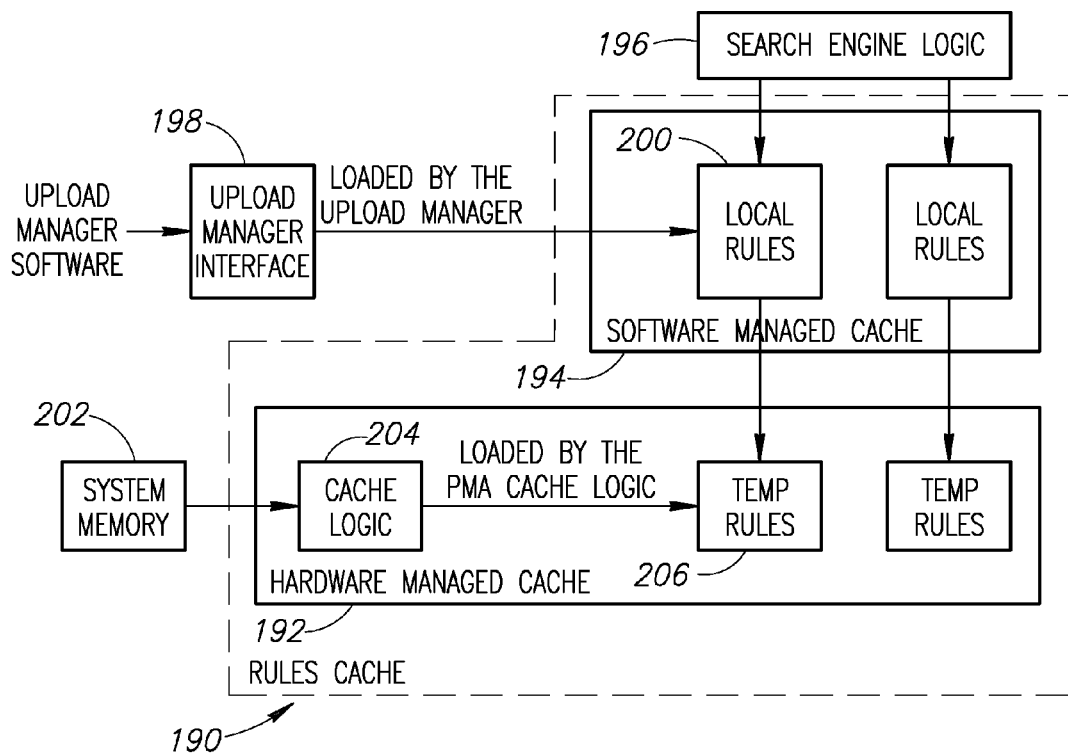
FIG. 12 is a block diagram illustrating the rules cache in more detail.

A block diagram illustrating the rules cache in more detail is shown in FIG. 12. The rules cache, generally referenced 190, comprises a software managed cache portion 194 and a hardware managed cache portion 192. The software managed cache portion stores the local rules 200 which are loaded and updated via the upload manager interface 198. The hardware managed cache portion stores the temporary rules 206 which are loaded by the PMA hardware cache logic 204 from system memory 202.

In one embodiment, the search engine state machine logic accesses the next rules in a single cycle. It simultaneously reads a rule line from both the transition rules and the default rules. The rules are always read from the close memory attached directly to the search engine logic 196. The commonly used rules are defined and loaded by the upload manager into the local rules area 200. The upload manager continuously updates the rules at run time and ensures that the most frequently used rules are in the local rules area 200. Other rules are loaded by the PMA cache logic 204 into the temporary rules area 206. These rules are also located in a memory attached directly to the search engine logic 196. A rule miss happens if a rule is neither in the local rules area nor in the temporary rules area. In this case, the hardware fetches the missing hardware managed cache rule line from main memory, while the search engine meanwhile processes a different search command so as to make efficient use of time and resources.

Figure 13:
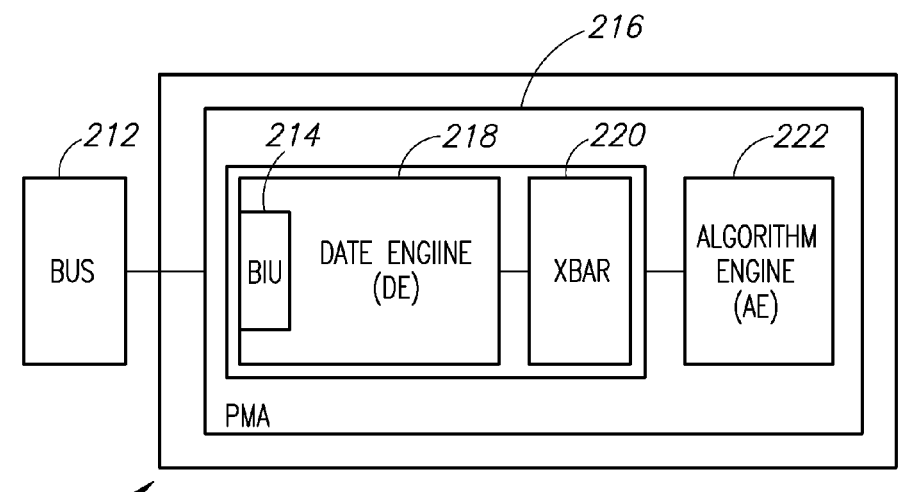
FIG. 13 is a high level block diagram illustrating the PMA attached to the System Bus.

A high level block diagram illustrating the PMA attached to the System Bus is shown in FIG. 13. The circuit, generally referenced 210, comprises system bus 212, PMA 216 comprising data engine (DE) 218 incorporating Bus interface unit (BIU) 214, crossbar (Xbar) 220 and algorithm engine (AE) 222.

The PMA accelerator 216 is attached to the bus 212 using the bus interface 214. The PMA comprises two main portions connected through a crossbar (Xbar) 220: (1) a data engine 218 operative to interface to the software through the bus, process the software commands, manage the input data and output (i.e. match results), and report status and completion events; and (2) an algorithm engine 222 which functions to implement the search algorithm and comprises the search engine programmable state machine.

It is noted that, in one example embodiment, the PMA can process eight application search commands in parallel, wherein each application search command drives two search commands. The PMA comprises four independent physical lanes, each composed of four programmable state machines (i.e. search engines). Each lane is time multiplexed by two logical lanes and each search engine is connected to its own memory store (e.g., SRAM). The SRAM holds local rules (i.e. the software managed cache) and temporary rules (i.e. the hardware managed cache). Rules from main memory are automatically mapped to local address range upon being copied for efficient memory usage.

Figure 14:
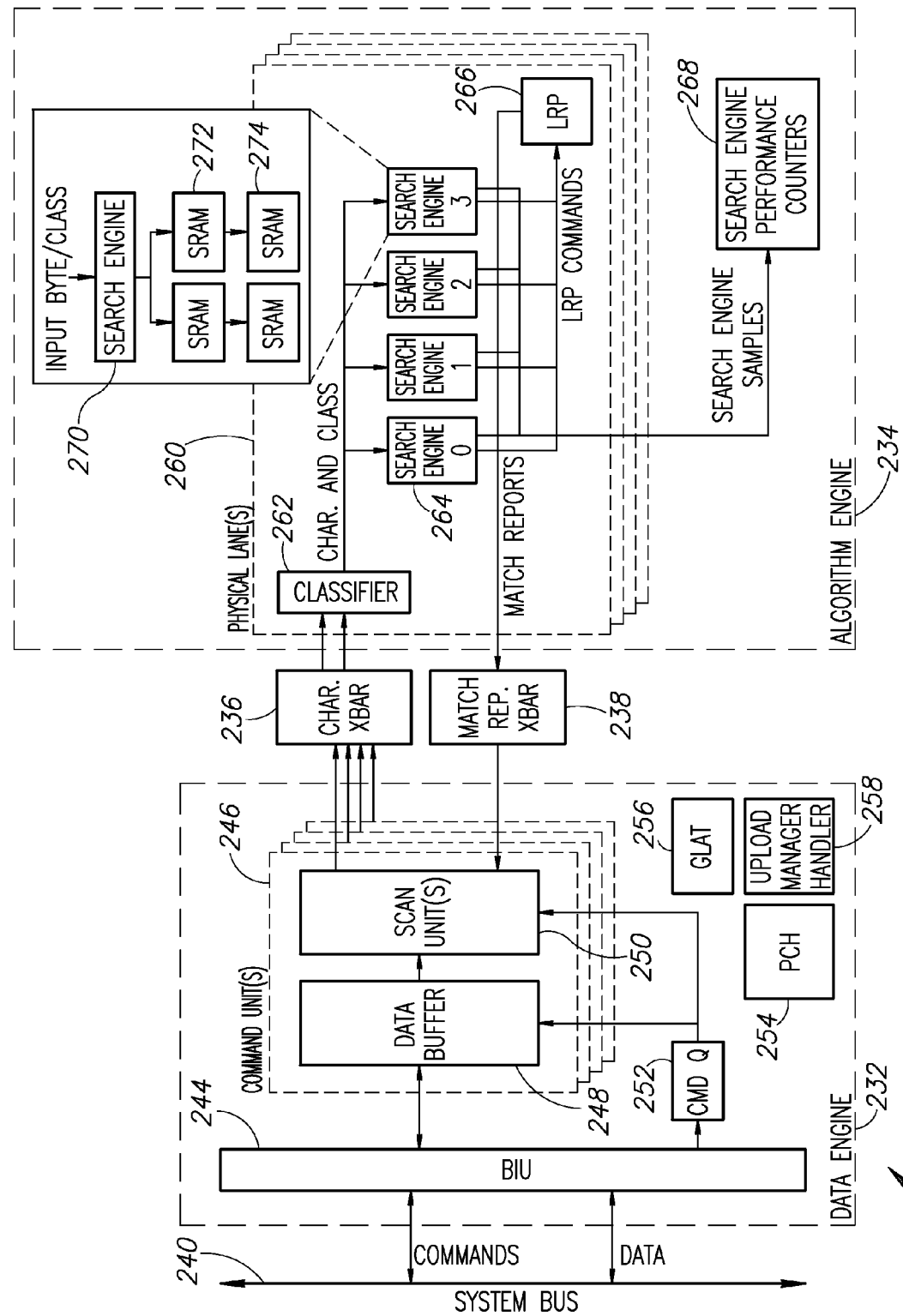
FIG. 14 is a block diagram illustrating the PMA in more detail.

A block diagram illustrating the PMA in more detail is shown in FIG. 14. The PMA, generally referenced 230, comprises a data engine 232 and an algorithm engine 234 coupled by character crossbar 236 and match reporting crossbar 238.

The data engine comprises bus interface unit (BIU) 244 for interfacing the coprocessor to the system bus 240, a plurality of command units 246 (eight in this example), each comprising a data buffer 248 and scan units 250, a command queue 252, GLAT 256, PCH 254 and upload manager handler 258. The upload manager handler logic receives and executes commands sent by the upload manager software, as described in more detail infra. The algorithm engine comprises a plurality of physical lanes 260 (four in this example), each comprising a classifier 262 and a plurality of search engines 264 (four per physical lane in this example) and a local results processor (LRP) 266. The algorithm engine also comprises search engine performance counters 268 used to profile rule access. Each search engine 264 comprises search engine logic 270, local rules cache (SRAM) 272 and temporary rules cache (SRAM) 274.

The PMA comprises several major components. The data engine 232 Command Queue Manager (CQM) 252 comprises a queue for storing incoming application search commands which are not yet active. Each command unit (CU) 246 (the data engine may comprise any number of CUs) functions to fetch all data stream cache lines required for all scans in its command. Use of multiple command units compensates for the latency of the rule miss delay (i.e. from main memory) and the data fetch. One CU can make use of a lane while another CU is stalled fetching new data or missing rules. The CU comprises two or more scan or search units (SU) 250. The SU functions to handle the operations related to the individual search in the command. The SU arbitrates for a lane that has the rules required for the processing of the scan. Once the SU wins the arbitration, it is connected to a lane inside the algorithm engine 234. Following the engagement between the SU and the lane, the scan state information is forwarded to the lane. At the end of the engagement between the lane and the SU the state information is transferred back to the SU if required.

The SU communicates with the algorithm engine across a crossbar like structure (XBar) 236, 238. The crossbar allows all the SUs to connect to all the lanes. The Xbar comprises a crossbar or other interconnect that connects the SU to the physical lanes 260. All the information between the SU and the physical lane is transferred through the Xbar including: the input characters, state and match results. It is noted that any other suitable interconnect topologies are suitable for use with the invention. In one embodiment, it is not required by the invention that every CU be able to connect to every lane.

The Bus Interface Unit (BIU) 244 functions to interface the PMA to the system bus 240. The BIU performs read/write arbitration and interfaces to the system bus passing commands and data back and forth as well as managing the associated interrupt queues.

The upload manager handler 258 functions to manage the interface to the upload manager software and stores the data engine control unit control data structures. The data engine also comprises PMA memory mapped I/O (MMIO) mapped registers.

The algorithm engine 234 comprises a multiple physical lane pattern search engine 260. Each lane comprises of a set of search engines (e.g., four). Note that each physical lane optionally runs two or more independent logical lanes. Every physical lane comprises multiple search engines which are time multiplexed between two Logical Lanes (i.e. the memory (e.g., SRAM) is read every other cycle per each search engine on the logical lanes). Each physical search engine 264 can be time multiplexed to provide two or more logical search engines. Each physical lane 260 also comprises a Local Result Processor (LRP) per each logical lane and a classifier 262 which functions to generate a class value of the classes associated with the particular input character (e.g., a 32 bit value).

Pattern Matching Accelerator Functional Description

Figure 15:
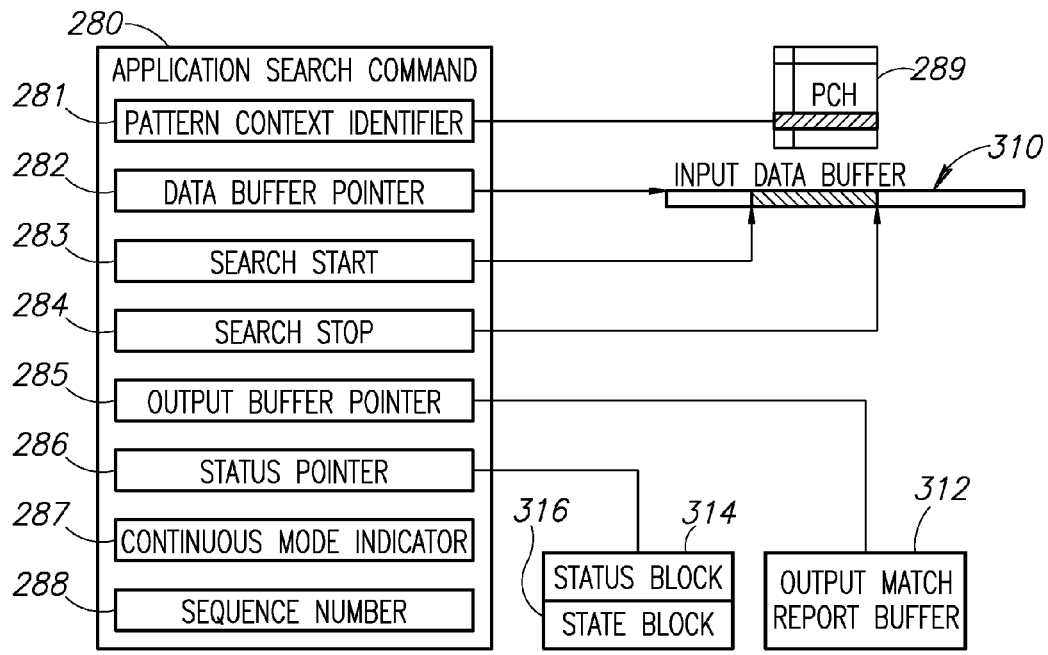
FIG. 15 is a diagram illustrating the structure of an application search command in more detail.

To perform searches, applications send application search commands to the PMA. An application search command comprises several data items, as illustrated in FIG. 15. The application search command, general referenced 280 indentifies the pattern context 281 containing the patterns to be searched. In the example embodiment shown, the identifier comprises an index into the Pattern Context Header (PCH) table 289 which is the indexed entry providing information about the pattern context needed to perform the search. The application search command further comprises the location (i.e. data buffer pointer) of the data packet 310 to be searched in memory 282, and the range of bytes within that packet to search, as defined by start 283 and stop 284 offsets within the packet. Alternatively, for example, only a starting address and length may be specified. The application search command also provides the address in memory of an output buffer 312 in the output buffer pointer field 285. The PMA places match reports identifying all pattern matches found during the search in the output buffer. The application search command further comprises the address of a status block 314 in memory in the status block pointer field 286. Following execution of the search command by the PMA, the PMA places information concerning the outcome of the search in the status block, such as error conditions and the number of match reports produced. Two fields in the application search command, the continuous mode indicator 287 and the sequence number 288, are used to support continuous mode searches, described in more detail infra. The state block 316, placed at a fixed offset from the state block to eliminate the need for an additional address field in the application search command, is also used during continuous mode searches.

In one embodiment, a single search command calls up to two search operations on two independent pattern contexts. A pattern context can hold multiple patterns (e.g., thousands or more). Prior to the search, the pattern context set is compiled and the hardware initialized accordingly. In the example embodiment presented herein, the PMA hardware can process a plurality (e.g., eight) application search commands in parallel and hold additional application search commands in its input buffer to prevent stalled commands head of line blocking.

A PMA request is initiated by the software by writing a command referred to as an application search command. The use of application search commands allows efficient communication by which the software pushes a command to a queue in the hardware. It is appreciated that alternative methods of communications are known in the art and may be used including, for example, a "doorbell" to notify that there are additional elements in a work queue in the memory, etc. For illustration purposes only, the use of the application search command is used through the description of the PMA.

The application search command holds the information required for the PMA accelerator to manage the operation and includes: source data buffer, target buffers, command to execute, location of the status and other parameters, etc. Additional information is transferred from one of the general processor cores to the PMA accelerator BIU during the address phase of a coprocessor request. The application search command also comprises a pointer to the status block which holds the status of the application search command operation, and to the state block which holds search state information. At the end of the operation, status is returned along with optional additional status and/or completion notifications. The PMA functions to read the data to be analyzed and return the corresponding match results. In one embodiment, input data is copied into the PMA leaving a valid copy in the system coherent memory. Input data is described in the application search command by a direct data descriptor (which points directly to the data buffer in memory) or by an indirect data descriptor (which points to a list of data descriptors in memory when each data descriptor, points to the data buffer in memory).

Figure 16:
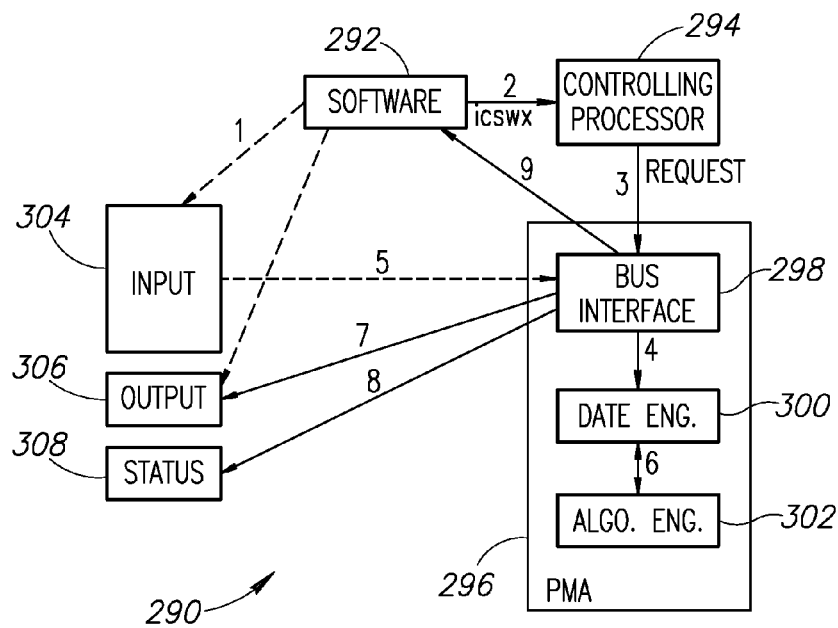
FIG. 16 is a diagram illustrating the general flow of the application software.

A diagram illustrating the general flow of the application software is shown in FIG. 16. The flow, generally referenced 290, of how the application software uses PMA is shown with reference to the numbered lines 1 through 9. First, the software 292 defines the input data 304 and results output buffer 306 (reference line #1). The software then builds an application search command in the controlling processor 294 and issues a PMA processor command (reference line 2). The controlling processor sends a request to the PMA accelerator 296 through the system bus. The application search command is written into internal queues in the Bus interface 298 (reference line #3). The request is sent to the data engine 300 (reference line #4). The accelerator reads the application search command and request main memory reads through the data engine. Depending on the application search command, it may read the status block and state block. The accelerator then reads the source data from the input data 304 (i.e. the input character stream) it needs to process the application search command (reference line #5). The algorithm engine 302 processes the data (reference line #6) and the accelerator writes output data 306 (reference line #7). The accelerator writes final status to the status block 308 (reference line #8) and then signals back to the software 292 that the request processing has been completed (reference line #9).

A description of the search application search command flow will now be presented. Prior to sending application search commands, one or more hardware internal data structures are initialized by the upload manager software. The application search commands are sent by the application to post a new work request to the PMA. Multiple application search commands can be posted to PMA by one or more applications. A search request points to a buffer in the application memory effective address space. An application search command may be used to perform a search on a packet received from the network. The search command input buffer may comprise complete network packets. In one embodiment, each application search command comprises one or two search commands.

The PMA supports a continuous mode in which the boundary of the search crosses the boundary of a single input packet (and the boundary of a single application search command). Each packet may be searched as it arrives. The search state at the end of one packet may be saved in main memory, and then reloaded to continue the pattern search when the next packet arrives, as if both packets had been scanned at once. The application search commands related in a continuous mode are referred to as a stream or session.

Application search commands are received from the Bus interface and are stored inside the Command Queue Manager (CQM) 252 (FIG. 14). The CQM is responsible for distributing the application search commands between the command units (CU) 246. A new application search command in a continuous mode (saves search results and next search picks up where left off) should maintain order with a previous application search command of the same session. Order must be maintained so that a next search command reads the search state saved by the previous search command of the same session. Therefore, the CQM sends a new application search command only after the CU has completed the processing of the previous related application search command. The CU processes a single application search command at a time and therefore a subsequent application search command waits in the CQM for the completion of the previous application search command. Non-related application search commands can be completed out of order.

For improved performance, application search commands pending due to ordering constraints preferably do not inhibit later application search commands without ordering constraints from being processed. The CQM holds a plurality of pending application search commands, thereby allowing application search commands without ordering constraints to be processed ahead of multiple pending application search commands. The CQM sends the oldest hazard free application search command to an available CU.

The CU analyses the validity of the search command and reads the state block as required (i.e. if the current request is not the first request in a session). Further checking is performed following the reading of the status block. If an error is detected at this stage or at a later stage in the application search command processing, the application search command processing is terminated and an error status is reported through the status block. The CU is also responsible for reading the input data required for the search operation and for writing the match results to the output buffer. When continuous mode application search commands are processed, the CU reads the state block at the beginning of the request processing and updates the state block at the end of the operation. In the case of an error, the CU has to write a valid search state or avoid overwriting the previous search state.

In the example embodiment presented herein, the amount of input search data referenced by a single application search command is limited. Longer searchers may be performed using a chain of continuous mode application search commands. An application search command can hold one or more search requests for the same input buffer allowing multiple searches to be performed on every input byte read. The CU reads all the data needed by both searches. Data needed by both searches is read only once.

The CU reads the Pattern Context Header (PCH) for both scans from the PCH Table. The PCH holds information which is required to initiate the search engine search operation including: security check information, resource mapping, and rules address translation information. The PCH points to the Global/Local Address Translation (GLAT) table. Based on the GLAT information, the CU performs the rule address translation required to translate between the global addresses of the rules in main memory and the local addresses of the rules in the local memory. This is described in more detail infra. Both the GLAT information and the PCH information are loaded by the upload manager software prior to running the search command.

Once the CU has sufficient information (e.g., input data, input status, input state) required to start the search operation, it arbitrates through the Xbar to obtain a search engine (i.e. lane). The algorithm engine comprises a plurality (e.g., four) of physical lanes. In one embodiment, the search operation requires two cycles per input byte, one for rules SRAM read and the other for the next rule address calculation. In general, the search pipe may be short or longer than two cycles. The PMA uses a pipeline allowing the physical lane to run two independent logical lanes pipelined on the physical lane. Each logical lane runs a search command controlled by a CU.

The operation of each one of the logical lanes in the physical lanes is independent. A CU operating on two searches may be connected to two logical lanes (either on the same physical lane or on different lanes) at the same time.

Each lane comprises a classifier table 262 and a plurality of search engines 264 (e.g., four). The classifier table adds a class value to every input byte that will be processed by the search engine. Each search engine 264 (also referred to as a search engine) comprises a programmable state machine which lies at the heart of the search algorithm.

When a match is found, match reporting is performed by writing the matching rule state and the current position in the input stream to the match result entry in the output buffer. A Local Result Processor (LRP) logic circuit 266 is associated with each logical lane. The LRP receives and executes commands from the search engines during the search operation. The LRP commands represent simpler portions of complex regular expressions. The LRP analyses the complete match results for the search thereby assisting the lane to process complicated regular expression patterns.

Every search engine is connected to two rules banks. In one example embodiment, each rule bank comprises 16K bytes of SRAM, although any suitable memory size may be used. Each bank holds local rules preloaded by the upload manager software in a local rules cache as well as hardware managed rules cache. The content of the local rules cache can be dynamically updated by the upload manager during run time when adding or removing pattern context sets or to optimize the rule organization for better performance of the PMA.

At the end of the search operation, the PMA writes back status to the status block and optionally notifies the software by interrupt, flag write, or any other suitable means. The status block indicates the completion status of the search command and the number of the matches found.

The output buffers are pointed to by the application search command. Match reports are written to the output buffer pointed to by the application search command. In one embodiment, a single output buffer is shared by both search commands in the search command. In this case, the match reports in the output buffer comprise a field indicating which search command produced the match report. Alternatively, the application search command may specify separate output buffers for each search command.

With reference to FIG. 15, the Status Block 314 is the control structure that holds the final status of the request and gets written when the PMA has completed the execution of the search command. The state block 316 is used to pass search state information from one application search command to another, in the case where the PMA processed a continuous mode search command. The PMA uses the state block to maintain the state of the search operation at the end of the application search command and to allow the next search in the session to restore the search state.

Figure 17:
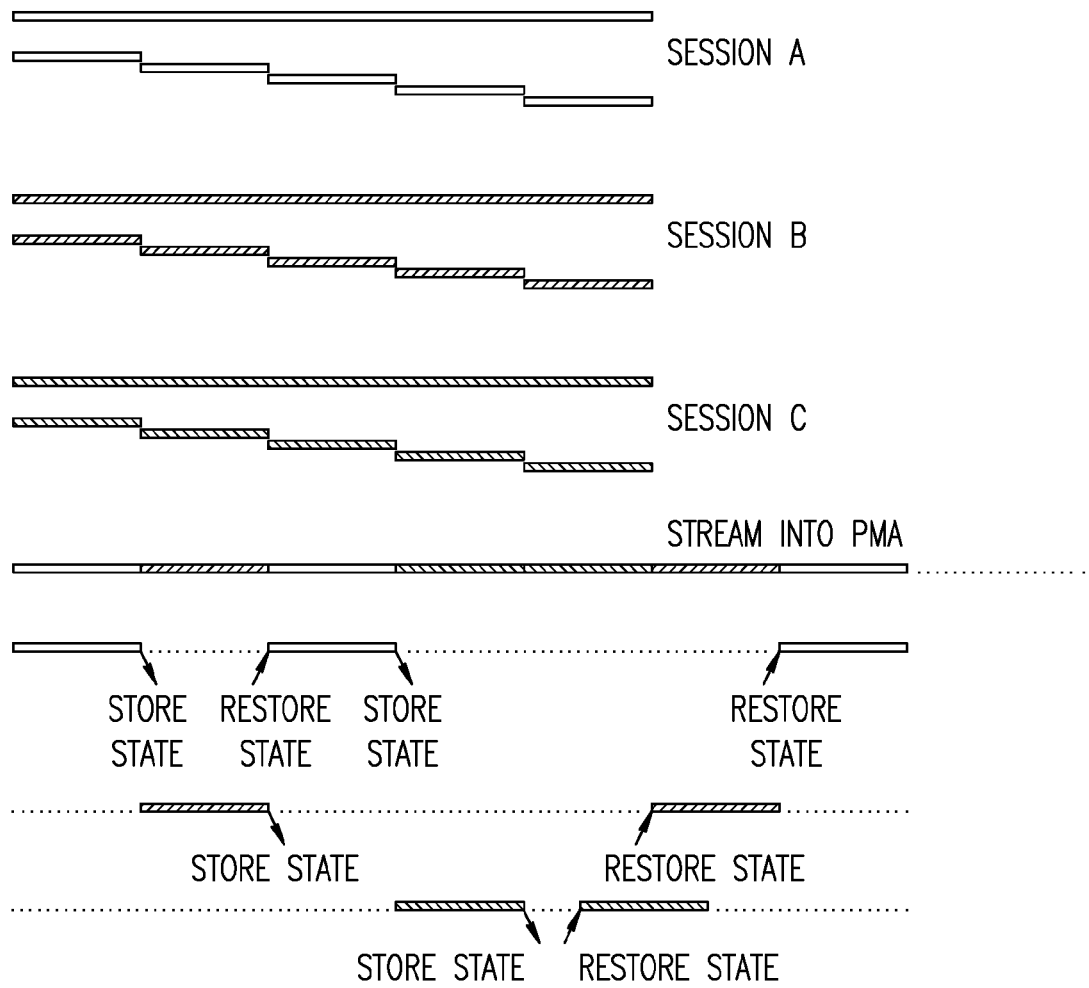
FIG. 17 is a diagram illustrating interleaved continuous sessions.

A diagram illustrating interleaved continuous sessions is shown in FIG. 17. In continuous mode the scan state is saved to the state block and restored from the state block by the PMA. In one embodiment, the application search command for different sessions can be interleaved into a single stream of packets that is forwarded to the PMA hardware. The PMA hardware stores the state in the state block at the end of application search command processing and restores the state from the state block when the next application search command of the same session is processed. Note that in FIG. 17, session A is denoted by no hatching, session B by forward hatching and session C by backward hashing.

Figure 18:
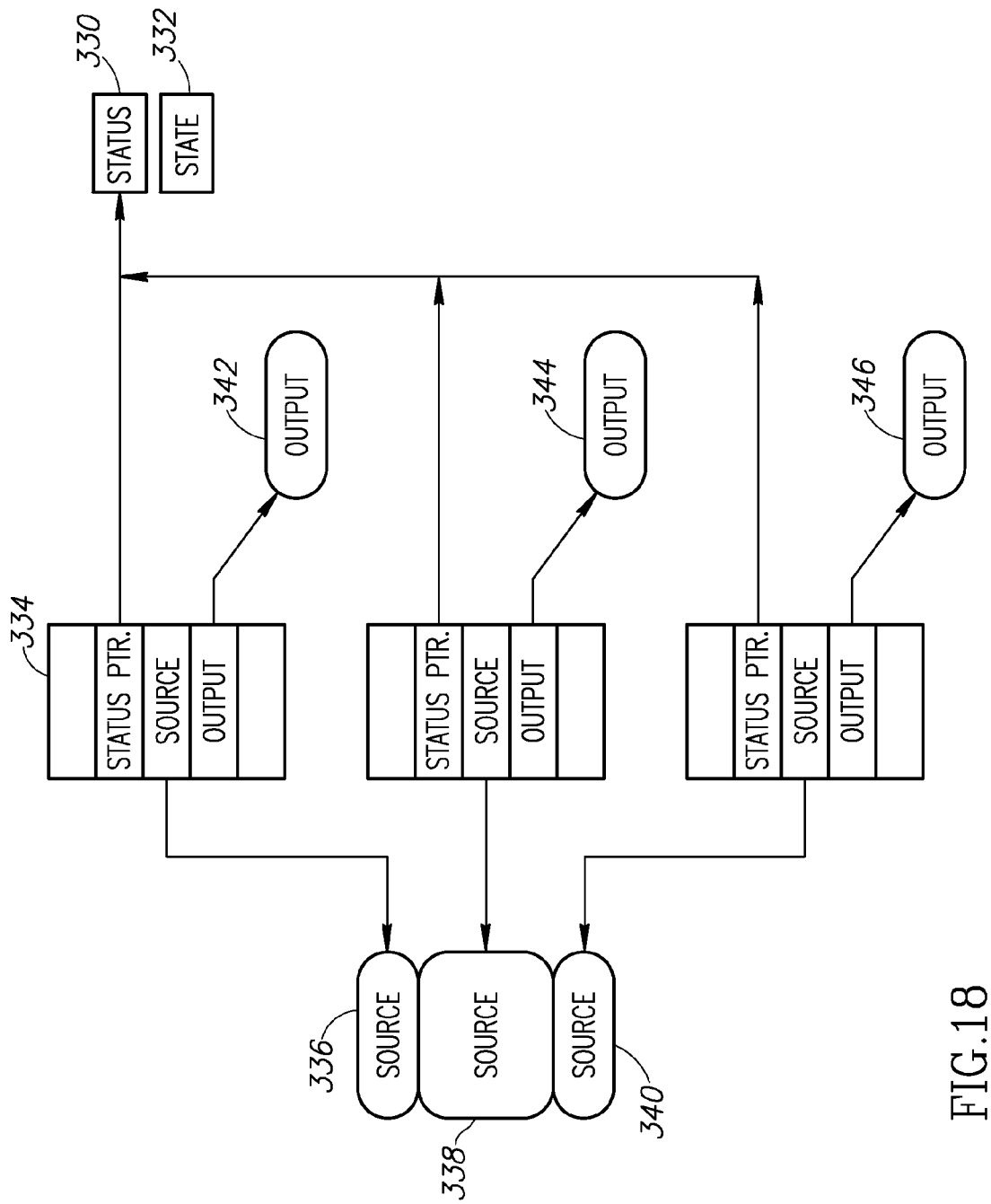
FIG. 18 is a diagram illustrating continuous mode pattern search commands.

As shown in FIG. 18, the state block 332 is defined as an offset from the status block 330 and all application search commands in the same session use the same status block 330.

Depending on their position within a session, continuous mode search commands may need to read search state, write search state, or both. The continuous mode indicator in the application search command identifies the required continuous mode operation. The first search command in a session only writes the state block. A search command in the middle of a session both reads and writes the state block. The last search command in a session only reads the state block. Non-continuous searches, also indicated by the continuous-mode indicator, neither read nor write the state block. The state block need not be present for non-continuous searches.

The sequence numbers in the application search commands within a session comprise consecutive numbers. The hardware uses the sequence number to check that the application search commands arrive in the correct order and for restarting search commands following certain error conditions, such as output buffer overflow.

A continuous mode application search command can be in one of the three positions in a session: first, middle or last. The first position is the first application search command in the session. There is no previous state in the state block that has to be loaded. At the end of the application search command processing, the accelerator performs the following operations: (1) write the search state to the state block; and (2) update the status block with the application search command sequence number (as read from the application search command) and the completion status.

A middle application search command is an application search command within the session's sequence of continuous mode search commands. At the beginning of the application search command processing, the accelerator performs the following operations: (1) the accelerator reads the state from the state block; and (2) the status block is read and checked to see if the previous command was successfully completed and if the sequence number in the status is equal to the current command sequence number (as indicated in the application search command) minus one. If the status block checking does not pass successfully, the current application search command is purged without executing the application search command. At the end of the application search command processing the accelerator performs the following operations: (1) write an updated state block; (2) update the status block with the application search command sequence number (as read from the application search command) and the completion status.

The last application search command is the last search command in a session. At the beginning of the application search command processing the accelerator performs the following operations: (1) the accelerator reads the state from the state block at the beginning of the processing; (2) the status block is read and checked similarly to a middle search command. At the end of the application search command processing the accelerator performs the following operation: (1) update the status block with the application search command sequence number (as read from the application search command) and the completion status.

Note that multiple application search commands from different applications can be interleaved and that all application search commands of the same session are posted in order and arrive at the accelerator in order.

The application search command will now be described in more detail. The application search command provides the following information to the accelerator: (1) Pattern Context ID (PCID)—the pattern context containing the patterns to search for; (2) Source Data—the data bytes to be searched, preferably the address of the data and length (PMA may also support searching multiple discontinuous regions); (3) Continuous Search Mode—non-continuous, first, middle, last; (4) continuous mode sequence number; and (5) match report output buffer location and size. Note that for middle and last continuous search, the search state at the end of the prior search in the session is also provided.

The accelerator performs the search as directed and returns the following information: (1) Completion Status—an indication that the accelerator completed the request, and preferably along with an error indicator; (2) Match Reports—a list of all matches found, including the number of match reports. For first and middle continuous search, the search state at the end of the prior search is also returned.

The application search command comprises the pattern context ID directly, an address and length of source data, the continuous mode, the address and size of a match report buffer (or buffers) and the address of the status block. The PMA writes matches into the match report buffer as the search progresses. If the match buffer overflows, the search stops and an error is reported. Upon completion, the PMA writes completion status and the number of match reports to the status block.

A state block holds the search state for continuous searches. The state block is located at a fixed known offset from the status block. This eliminates the need for sending an additional pointer as part of the search command. The search state is loaded from the state block at the start of the middle and last continuous mode searches and saved to the same state block at the end of the first and middle continuous mode searches. The same status block/state block construct is used for an entire continuous session. Note that two or more searches can be stored in a single application search command. This allows the source data to be read in once for both searches when the searches are to be performed on the same data.

Regarding application search command ordering and hazard detection, the CQM maintains the ordering between continuous mode application search commands of the same session The CQM checks if an application search command loads the same state block that a previous application search command, still in process, is yet to write. In this case, it stalls the second application search command until the prior application search command has written the search state. Other, unrelated application search commands are allowed to proceed. Once all hazards for a pending application search command have been cleared, the application search command can be routed to any CU independent of the CU that processed the earlier application search command.

As an optimization, search state information may be passed directly from one search command to the next in the session inside the PMA, without writing the search state out to memory, and then immediately reading it back in. In this embodiment, it is preferable to keep the search state within the CU, in which case the dependent search command issues to the same CU as the prior search command in the session.

Control application commands from the upload manager are processed independently of application search commands. For simplicity sake, the PMA processes a single control application command at a time and therefore a complete ordering is guaranteed for the execution of the control application commands. Therefore, detecting the completion of one control application command indicates that all previous application commands have completed as well, thereby simplifying the upload manager software.

Two hazards may stall control application commands once they arrive at the PMA: a Write PCH hazard and a continuous mode hazard. The Write PCH hazard exists between Write PCH control commands and application search commands. A Write PCH command cannot update the PCH memory while a search command that uses the same PCH (i.e. pattern context) is being processed by any of the command units. The upload manager handler (UMH) unit in the PMA stalls the execution of the Write PCH command until all search commands that indicated the same PCH are complete. Conversely, once a Write PCH command reaches the head of the control command queue, the Command Queue Manager will not allow any new application search commands that use the same PCH to begin execution until the Write PCH command is complete. Application search commands that are not related to the PCH that is to be updated are not stalled.

Pattern Matching Accelerator Algorithm Engine

The algorithm engine (AE) 234 (FIG. 14) in the PMA is the logical unit that performs the actual search operation. The AE receives command parameters and state information from the command units (CU). Multiple CUs can be connected to the AE and execute their search command at the same time. The CUs are connected to the AE through the crossbar (e.g., Xbar). A CU also provides a stream of input characters on which the AE runs the pattern matching algorithm. The AE returns search results to the CU following every match found. When required, the AE returns to the CU a state at the end of the search. In one example embodiment, the AE comprises four similar entities that execute the search, each referred to as a lane. The lane comprises the following main building blocks: (1) control logic which functions to handle the interface to the command units through the crossbar (Xbar); (2) classifier which generates the class information for the input character; (3) search engine which is the core component of the algorithm engine that performs the search (there are multiple search engines in a lane (e.g., four), each coupled to memory that hold the search rules, i.e. the output of the compiler); and (4) Local Result Processor (LRP) that combines intermediate search results from the search engines in the lane.

The pattern context set defined by the user is compiled by the pattern compiler into a rule structure which the PMA hardware is able to execute. During a search operation on the input character stream, each search engine processes two rule lines per input character byte. To enable a fast processing rate, PMA comprises a local memory (e.g., SRAM) that allows memory access within one cycle. The size of the memory is implementation dependent.

Figure 19:
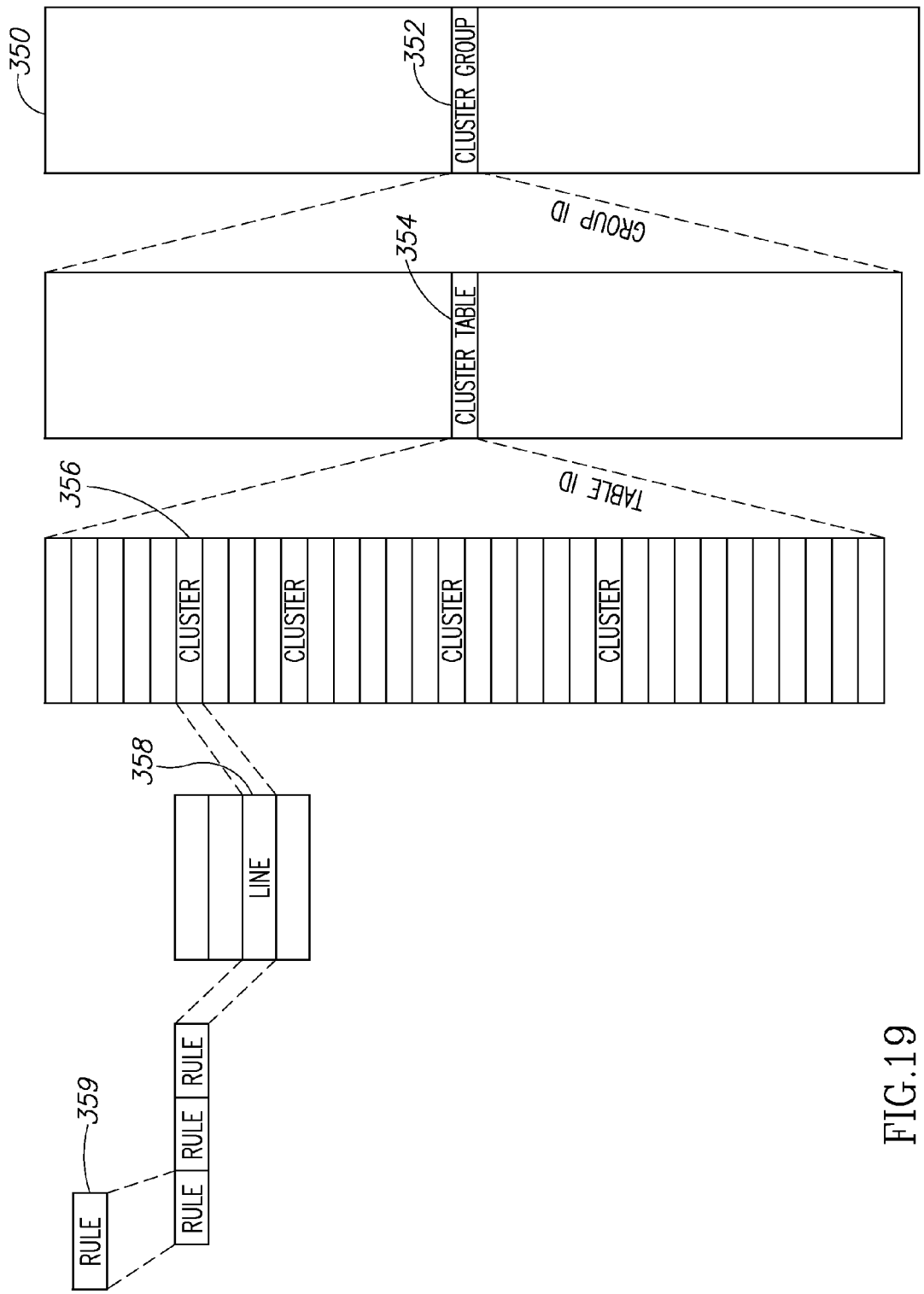
FIG. 19 is a diagram illustrating the organization of the pattern context rules.

A diagram illustrating the organization of the pattern context rules is shown in FIG. 19. Note that the organization shown in an example as the rule may be organized differently in accordance with the particular implementation. With reference to FIG. 19, the pattern context rules 259 are organized in lines 358, referred to as rule lines. Each rule line 358 comprises a plurality of rules 359 (e.g., three). The set of rule lines accessible by a single search engine state are known as a cluster. In an example embodiment, each cluster occupies between 16 B and 2 K bytes of memory. Clusters may be discontinuous and the size and location of a cluster is determined by the search engine state ID and mask, as described in detail infra. The clusters are further organized in cluster tables 354, also referred to as "tables", which have a fixed size. Multiple tables form a group 352 stored in memory 350.

Each rule is used to calculate the address of the next rule based on the value of the new byte from the input stream. A rule includes a cluster table ID, a pointer which points to the cluster table containing the rules of the next state. A rule can point to a rule set of a next state in the same table or to a rule in a different table. The compiler places the clusters such that a pattern context has only one cluster per cluster table.

Tables are stored consecutively in memory by ID. The address of the first table, Table 0, in a pattern context is stored in the Pattern Context Header (PCH). Each of the four search engines uses a different set of tables in memory, and has a different address for Table 0.

The search operation requires access to the rules every processed character. Therefore, fast access to the rules is preferable to achieve high search bandwidth. In one example embodiment, the PMA access rules every second cycle. In a first cycle, the rule is processed and in a second cycle, the new rule line is read. Both cycles are required for the processing of a single character. The total size of rules required to achieve particular system level requirements may be many megabytes. To handle such large rule sets, the search engine uses a caching scheme to keep frequently-accessed rules in a local memory within each search engine of the PMA unit.

With reference to FIGS. 12 and 14, as described supra, the local memory cache is divided into a software managed portion 194 and a hardware managed portion 192: The software managed cache is referred to as the local rule area and the rules contained therein are local rules. The upload manager software functions to place the most frequently accessed rules in the local rule area, based on statistical profiling of rule access patterns. Run time profiling is performed by the upload manager 258 using hardware programmable performance counters 268. The upload manage initializes the memory at the search start and may update the rules in the memory during run time.

Figure 20:
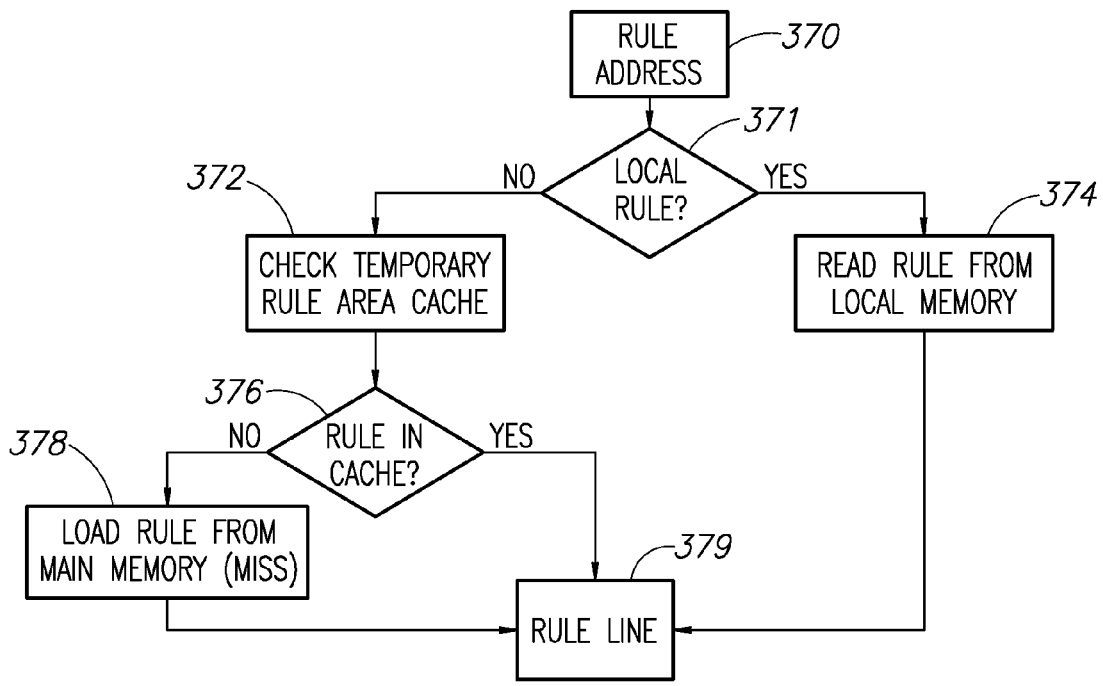
FIG. 20 is a flow diagram illustrating the rule read logical flow.

The hardware-managed cache is referred to as the temporary rule area and the rules contained therein are temporary rules. With reference to the flow diagram in FIG. 20, when the search engine attempts to access a rule (step 370) which is not found in the local memory (step 371), it checks if the rule is in the hardware managed cache (i.e. temporary rule cache) (step 372). If the rule is not found (i.e. a miss) (step 376) the hardware fetches the rule from the main memory and places it in the temporary area cache (step 378). If the rule was found in the local area cache (step 371), the rule is read from local memory (i.e. local rule are cache) (step 374). Note that the PMA knows whether the rule is in the software managed cache or not in accordance with a global/local flag included as part of the rule addressing.

Figure 21:
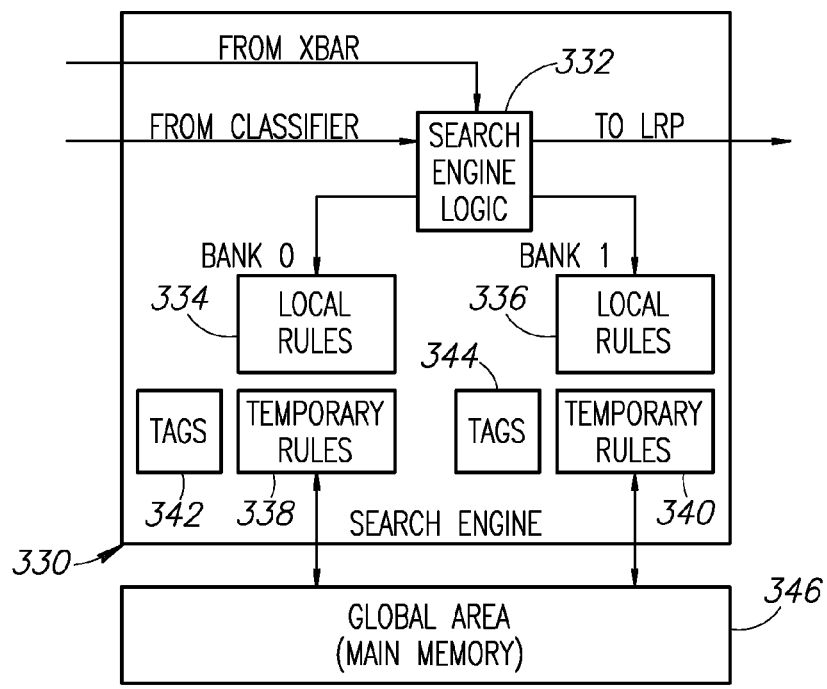
FIG. 21 is a block diagram illustrating the dual rule bank scheme of the search engine memory cache.

A block diagram illustrating the dual rule bank scheme of the search engine memory cache is shown in FIG. 21. In one example embodiment, each search engine 330 comprises search engine logic 332 and a local rules area divided into two banks, i.e. Bank 0 334 and Bank 1 336. The local rule area requires no tags.

In an example embodiment, the temporary rule area comprises memory divided into two banks 338, 340. Each bank is managed as a two-way associative cache. It is appreciated that other memory bank management schemes can be used with the present invention.

The contents of each block in the temporary rule area are identified by a set of tags 342, 344, one tag for each group of blocks. A replacement policy decides which of the blocks in a set are replaced when a new block is to be brought in. The well known least recently used (LRU) scheme is used by the PMA unit. The tags also comprise a valid bit, as blocks may contain no data. Tags are invalid at system initialization, and the upload manager may explicitly invalidate tags following upload manager's changes in the rules. Note that the upload manager keeps the rules updated in the main memory following a change of the rules loaded in the local store. This requires a flush of the old rules which might not be updated from the cache, wherein the upload manager uses the Tag invalidation indication.

If the rule is found in the local memory in either the local rule area or the temporary rule area, the rule line is returned in the next cycle. If, however, the rule is not found in the temporary area (i.e. a miss) a block is fetched from main memory (i.e. non local area 346), incurring a performance penalty.

In the case of a miss, the lane returns the state to the search unit 250 (FIG. 14) (a part of the command unit 246) and is de-allocated (the search state of the lane is saved in the search unit). Once available, the lane can proceed to process an input character stream from different search units (SU). The SU re-arbitrates for the lane only after it fetches the missed rule cache line. Once the SU wins the arbitration to the lane, it loads its state and the missed rule cache line and proceeds with the search. This method allows efficient use of lane resources at the time of a miss, reducing the effective performance penalty of misses.

The rule read miss process is described as follows. The initial rule address is loaded from the PCH. The PCH holds an Initial Rule Table ID (which is identical for all four search engines) and a value of the rule mask per search engine.

In the example embodiment presented herein, the search engine comprises two memory banks. The banks are referred as Bank 0 (334) and Bank 1 (336). Both memory banks are identical in their structure. The two banks are accessed simultaneously on each search engine cycle. For each pattern context, one bank holds the transition rules and the other bank holds the default rules. Assignment of the transition rules to a specific bank is defined in the PCH per pattern context. Transition rules generally occupy more memory space than the default rules. The upload manager is capable of placing rules either in Bank 0 or Bank 1 so as to balance the data storage across the two banks.

Thus, the rule cache incorporated in the search engine comprises the following features: (1) a hybrid hardware/software-managed cache solution; (2) the software portion of the cache, called the local area, is controlled by the upload manger background process which continuously optimizes the use of the software portion in an intelligent way, e.g., using profiling; (3) the upload manager uses profile information to determine which rules are accessed most frequently, and should therefore be placed in the local area; (4) when rules are placed in the local area, their address changes whereby all rules that reference them are updated to point to the new local address, making look-ups fast and tag-free; and (5) translation between local and global addresses are used to make management of the local area transparent to the application (described in more detail infra).

Note that in the case of the PMA every rule is in essence a branch. In the general case we may assume blocks of rules without branching and branch commands. The search engine can read multiple rules (e.g., three), from each bank during each cycle.

A described supra, the local area is managed by the upload manager which runs in its own thread and continuously monitors rule usage, shuffling states in and out of the local area to optimize performance. The application that is currently performing scanning is oblivious to the upload manager process. This allows the upload manager to optimize performance freely, without explicitly interacting with the application.

To place rules in the local area, the following steps are performed: (1) software (e.g., upload manager or other entity) determines which rules are most frequently accessed and therefore beneficial to place in the local area; (2) software performs a placement algorithm to optimally pack the frequently accessed rules into the local rule area; (3) software copies the rules from system memory to the local rule area; (4) any rules that point to the local rules must be updated to point to the new location in the local rule area, rather than the old location in system memory; and (5) address translation is performed to make the software management transparent to the application (described in more detail infra).

The efficiency of the upload manager depends on how frequently the set of most frequently used rules changes and what portion of it changes. If the used rule image is changed slowly, the upload manager changes the local rules slowly, or may even keep it unchanged.

A rule in the temporary rule memory might point to a global rule or to a local rule. Once the upload manager updates the rules in the local rules area, the temporary rules might become invalid and need to be updated. The upload manager invalidates the portions of the temporary rules area that might hold invalid rules. This operation can also invalidate valid entries in the cache. In this case, the rules will be reloaded in the future by the cache logic.

The upload manager can use the Flush Temporary Rule application search command to invalidate specific entries in the tag. The command can select the banks to flush. One, several or all the banks within the lane's search engines can be flushed. According to the enable flag in the command, either all the entries in the selected banks are invalidated, or only the entry pointed by the tag hash value specified in the command is invalidated. The command can also select certain groups of tables to be flushed.

The search engine performs three serialized operations for each character scanned: (1) reading search engine rules based on the current search engine state and character; (2) matching rules against the input character or class; and (3) computing the next search engine state. Steps 2 and 3 are designed to be simple and fast to execute in hardware. It is preferable that reading the rules be as fast as possible. To achieve this goal, each search engine comprises a fast SRAM memory divided into two regions: (1) the local area containing rules fixed in place by the upload manager; and (2) the temporary area, a hardware-managed cache of global rules.

If the search engine needs a local rule, it looks directly in the fast SRAM at the known location. If the search engine needs a global rule, it looks for it in the temporary area. The temporary area resides in the same physical SRAM as the local rules and can be accessed with the same latency. If the rule is not found in the temporary area, it is brought in to the temporary area from the system main memory.

Figure 22:
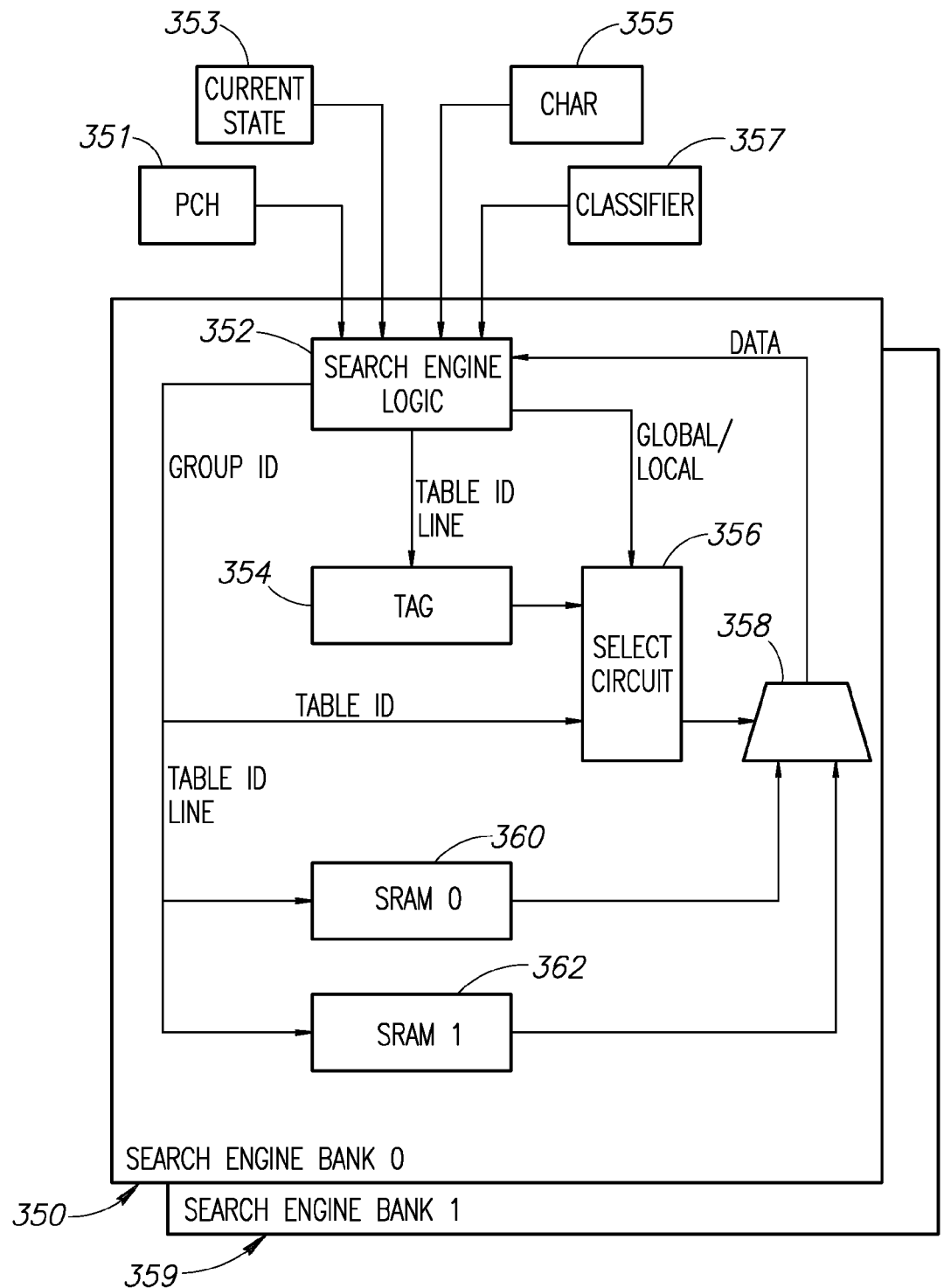
FIG. 22 is a block diagram illustrating one rule bank of the search engine memory cache in more detail.

A block diagram illustrating one rule bank of the search engine memory cache in more detail is shown in FIG. 22. The search engine rule bank, generally referenced 350, comprises two memory blocks 360, 362 (e.g., SRAM 0 and SRAM 1), search engine logic 352, tag block 354, select circuit 356 and multiplexer 358.

It is noted that only the temporary area requires tags. The tag lookup and compare is shown for a two-way set-associative temporary area. Both ways are read from the temporary area in parallel with tag lookup and compare. Upon a tag hit, the correct way is late-selected. Because the tag array is small, it can be constructed out of latches to reduce latency, allowing the tag read and compare to occur in one cycle.

Part of the search engine state comprises a global/local flag which informs the search engine whether the current state is in the local area or not. If a state is local, all the rules associated with that state must be in the local area. A single state may comprise from 1 to 256 rules. For local states, the search engine state directly indicates the physical location of the rules in the local area. Hence, local area look up is simple, fast and tag-free. For global rules, the temporary area is indexed using a hash function. The tags are used to determine if the desired rules are actually in the temporary area.

In the example embodiment presented herein, two cycles of the search engine logic are needed to process a single character: a memory read cycle and a computation cycle. Every physical lane comprises four search engines which are time multiplexed between two logical lanes (i.e. the memory (e.g., SRAM) is read every cycle, every other cycle per each search engine on the logical lanes). Due to timing constraints, the address is latched into the memory at the beginning of the cycle and the address at the output of the memory is latched on the next cycle. Therefore, the processing of the memory output until a new address is ready is performed in a single cycle.

The address generation based on the input character is fed to the memory 360, 362 in both banks 350, 359. In each bank, the contents of one of the memories is selected. If it is a local rule, the selection is made according to the rule address. If the rule is a global rule, the memory selection is done according to the Tag match results. The PCH 351 tells which bank holds the transition rules and which bank holds the default rules for the specific PCH. Both banks can hold either transition or default rules.

The data from the memory is used by the search engine logic, which determines the matching rule with the highest priority and generates the next rule address. The search engine logic also drives the LRP command of the winning rule to the LRP. The search engine logic generates two addresses: one for the transition rule bank and the other for the default rule bank. The information from the PCH controls the output multiplexer to send the transition rule address and the default rule address to the correct bank.

Global/local address translation will now be described in more detail. As described supra, the local rule area has no tags. When rules are placed in the local rule area, all rules that refer or point to those rules are updated to refer directly to the location of the local rule in the local rule area.

A rule points to the next rule set by defining the next table ID, next state and next mask. An explicit local/global bit in each rule indicates if the next table is a local table (found in the local area) or a global table (found in global memory) accessed through the temporary area. If the next table is local, it refers to a specific physical location in the local area in the search engine cache memory. The search engine reads the rules found at that location. Hence, the local area needs no tags to determine if the needed rules are available.

The upload manager can select any local table as the new location of a given global table. It can also add constants to the state IDs, allowing small tables to be shifted in the local table. This gives the upload manager great freedom in placing rules in the local area. As a result, the local rule area behaves similarly to a fully-associative cache.

The rule's original addressing, as defined in the rule's address in the main memory is referred to as a global (i.e. logical) address. The address of the rules in the local memory is referred to as a local (i.e. to the search engine) address. All rules have a global address, but only rules placed in the local rule area have a local address. The global address is invariant over the life of the pattern context. The local address, however, is transitory. The upload manager may change the local address of rules over the life of a pattern context. When the upload manager places a rule in the local rule area it updates the value of the local/global bit, the next table ID and the next state in all the rules pointing to rules in the local store. These modified rules may be in global memory or the local area.

The upload manager can change the contents of the local area, dynamically rewriting rules as necessary, asynchronously with the application. In order to make this process transparent to the application, a mechanism ensures that the application does not see changing rule addresses, in the form of changing table IDs or states. Therefore, match results are always reported back to the application using global addresses. Similarly, the search state is stored using global addresses. When restoring a state, the addresses in the state are translated back from global to local, based on the current local area contents.

The translation is controlled by the upload manager using the Global Local Address Translation (GLAT) table. The content of the GLAT is loaded by the upload manager and is updated by the upload manager whenever local rules allocation is changed.

Figure 23:
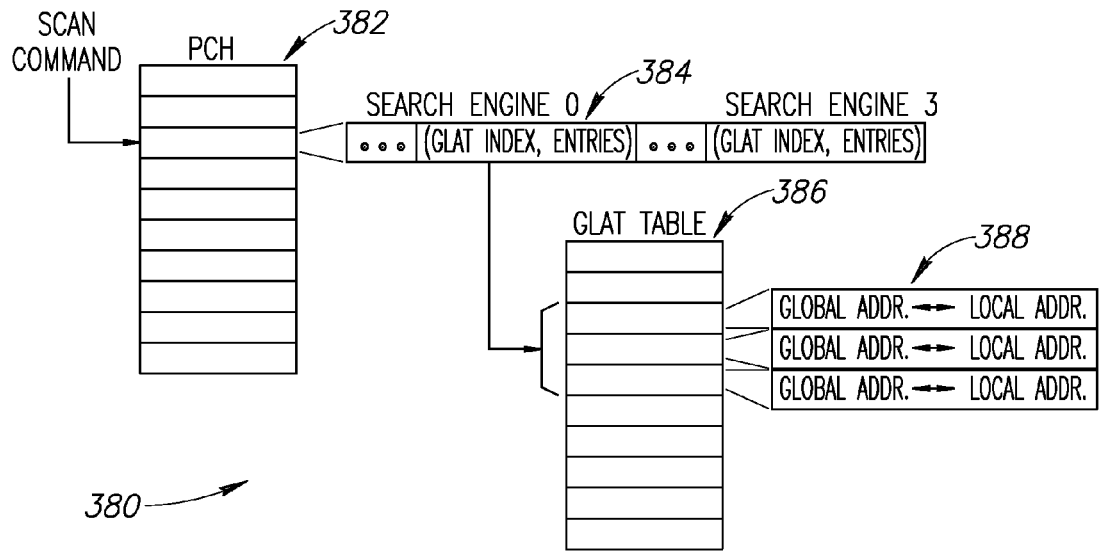
FIG. 23 is a first diagram illustrating the global/local address translation.

A diagram illustrating the global/local address translation is shown in FIG. 23. In the example translation scheme presented, generally referenced 380, a single GLAT index 384 is provided for each search engine. Per each search engine, the PCH also indicates the number of GLAT entries for the banks of the search engines. All the GLAT entries are located in a single table (i.e. the GLAT table) 386. Each GLAT entry 388 comprises the information required for the global ⇔ local address translation, described below. In addition, locations are expressed in terms of table ID and chunk mask. A table illustrating the global/local address translation is presented below.

one embodiment, the GLAT table stores 4096 GLAT entries (two bytes each entry). Each GLAT entry defines the local area location of a global table, or pieces of a global table.

Each GLAT entry holds the following fields: (1) global table ID indicating the global table ID of the table placed in the local area; (2) local table ID indicating the local table in the local area that holds the local rules; (3) chunk mask which comprises a 4-bit value that defines which portions of the global table have been placed in the local area; and (4) state shift which indicates how the local rules have been shifted relative to their original location in the global table.

Every PCH points to a set of translation entries inside the GLAT table by an Address Translation Base parameter in the PCH. Each PCH defines the number of translation bank entries and the number of default bank entries per search engine. Only tables that have some rules in the local area need a GLAT entry.

Note that address translation is performed for the transition rules bank and default rules bank separately using the GLAT entries associated with each bank. All the translation entries of a pattern context are located in one continuous group pointed to by the PCH.

At the beginning of application search command processing, the command unit (CU) loads the translation information from the GLAT table. The CU holds a decompressed repre- Global/Local Address Translation

| Case | Operation | Direction of Translation | Translated Fields | Translator | When Translation Happen? |
|------|-----------|--------------------------|-------------------|------------|--------------------------|
| 1 | Load State | Global -> Local | BFSM # Table ID DH Table ID DH State Current State | RegX hardware When loading a state of a continuous search from the CPB. | During CRB state initialization. If the GroupID is as the GroupID in the PCH and there is matching TableID in the related GLAT entries. AND Chunk Mask checking is OK. |
| 2 | Load Init Rule | Global -> Local | BFSM # Table ID Current State | RegX hardware Whenever start processing a new CRB. | During CRB state initialization. |
| 3 | Store State | Local -> Global | BFSM # Table ID DH Table ID DH State Current State | RegX hardware When storing a state of a continuous search to the CPB. | At the end of CRB processing. When the G/L bit in the state is set. |
| 4 | Report Match | Local -> Global | BFSM # Table ID Current State | RegX hardware At every write of match result. | Following every match reporting. When the G/L bit in the state is set. |

Figure 24:
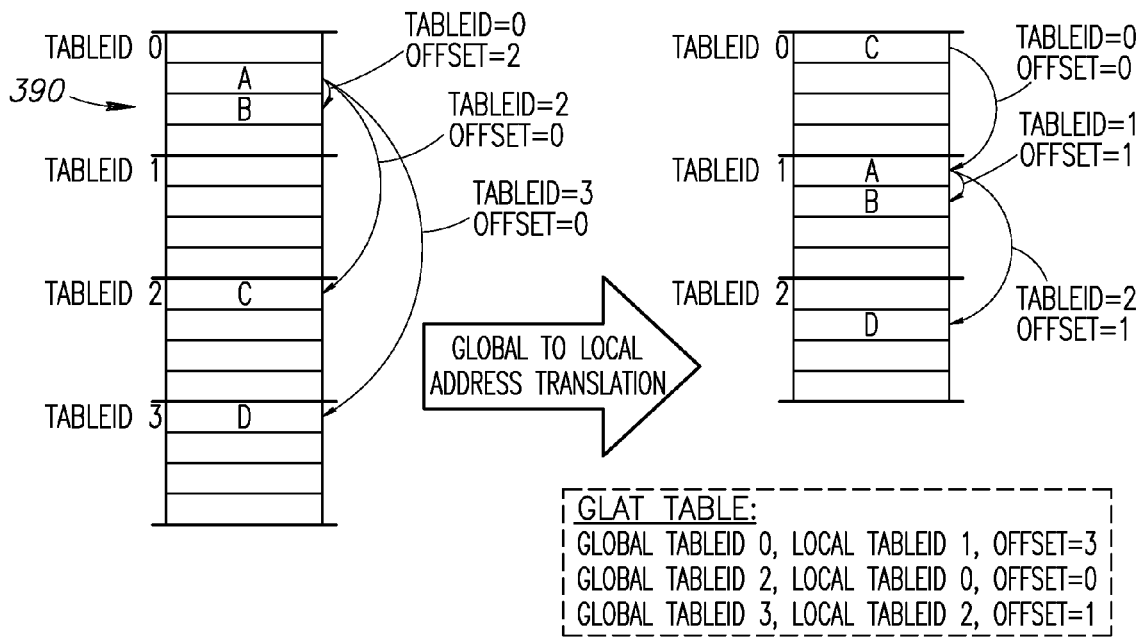
FIG. 24 is a second diagram illustrating the global/local address translation.

The rule translation from a global address to a local address is done per cluster table 390, as shown in FIG. 24. This allows the upload manager the freedom to place the cluster anywhere inside the local memory regardless of its global address (which was defined by the compiler).

The translation is defined per cluster and comprises two parts: (1) translating the table ID wherein the table ID in the rule or state is converted from the global to local; and (2) shifting the cluster inside the cluster table which allows replacement of the cluster inside by adding an offset to the line address. The following fields are translated: (1) cluster ID; and (2) current state.

The GLAT table stores the information required to carry out the address translation. The GLAT table memory is implemented as a memory area (e.g., SRAM) inside the PMA. The content of the GLAT is loaded by the upload manager using the Write GLAT application search command command. In sentation of the compression information allowing a faster translation of state and match reports.

Note also that address translation is performed only for the global table ID values referred by the GLAT entries associated with the search engine for the given PCH. The dual hash (described in more detail infra) and the initial state are translated using the default rules bank GLAT entries. The state is translated using the transition rule bank GLAT entries, unless it is an initial state (which is translated using the default rule bank entries). The initial state table ID is read from the PCH. The initial state global state value is next state Invalid. The table ID in the state should be equal to the table ID in one of the related GLAT entries, otherwise the state remains global. Address translation is performed only if the chunk mask checking passed successfully, otherwise, the global address is maintained.

Address translation is performed as follows; (1) the global table ID (5 bits) is replaced with the local table ID; (2) upper bits of the next state, which are not used in calculating the address of rules within a table, are unchanged; (3) the value of the state shift is added to the value of the lower bits of the next state, carry bit is ignored; and (4) the global/local bit is set to indicate a local rule.

Local to global address translation is performed when the global/local bit on the rule in the search engine is set indicating that it is a local rule. The address translation includes: (1) the local table ID is replaced with the global table ID; (2) upper bits of the next state, which are not used in calculating the address of rules within a table, are unchanged; and (3) the value of the state shift is subtracted from the value of the lower bits of the next state, carry bit is ignored.

The chunk mask is a mechanism that allows locking of a partial cluster into the Locked memory (e.g., SRAM). It allows only the more frequently used areas in big clusters to be locked without the need to also lock least recently used parts of the cluster. This enables significant area savings for large clusters. Part of the rule can point to a local address only if all the rules pointed by this rule are in the locked state.

To obtain a better level of efficiency in the placement of the code, the PMA hardware allows dynamic mapping of the global search engine number (i.e. the number of the search engine as defined by the compiler) and the local search engine (i.e. the one used in the hardware). This allows the upload manager software to achieve a better balancing on the usage of the search engine storage.

The search engine number is mapped from a global search engine number to a local search engine number and from a local search engine number back to a global search engine number according to the search engine mapping field in the PCH. search engine mapping allows a higher level of flexibility for the upload manager rule placement by mapping. The pattern compiler sets the global search engine enumeration. Using the trivial mapping search engine 0 on the compiler output uses search engine 0 in the hardware, search engine 1 on the compiler output uses search engine 1 in the hardware, and so one. The upload manager uses search engine mapping to place (i.e. replace or move) rules which are logically assigned to a specific global search engine to a different physical search engine on which more free local rule area space is available. All the fields in the search engine mapping field in the PCH and in the GLAT entries refer to the logical search engine.

The initial rule is used for access to the set of default rules. The default rules can either be locked or unlocked. Note that in most cases the default rules are locked. To provide flexibility in the placement of the initial rule inside the locked memory, the initial rule address is translated using a GLAT entry (if the related entry is in the GLAT), just like any other state.

The initial rule address is loaded from the PCH. The PCH holds an initial rule table ID (which is identical for all four search engines) and a value of the rule mask per search engine. The initial rule's current state is assumed to be all zeros for all four search engines.

A memory miss occurs when a required rule is not in the rule cache. A single search engine can have up to two misses per byte searched, a miss on the transition rule and a miss on the default rule. When there is a miss on both default and transition rules, the hardware reads the two cache lines in one miss operation. In this case, it is possible that once the rules from one bank are returned from memory, the rules from the other search engine bank have been replaced and cause a new miss. If this occurs repeatedly, the search engine enters a livelock situation and will not make forward progress. To resolve this, the search engine fetches rules for both banks, even though one bank is already in the temporary area. Other possible solutions include using a special locking mechanism to ensure that rules are not replaced, and to process all rules that are available prior to the miss, and store the results of the rule selection as intermediate results.

Figure 25:
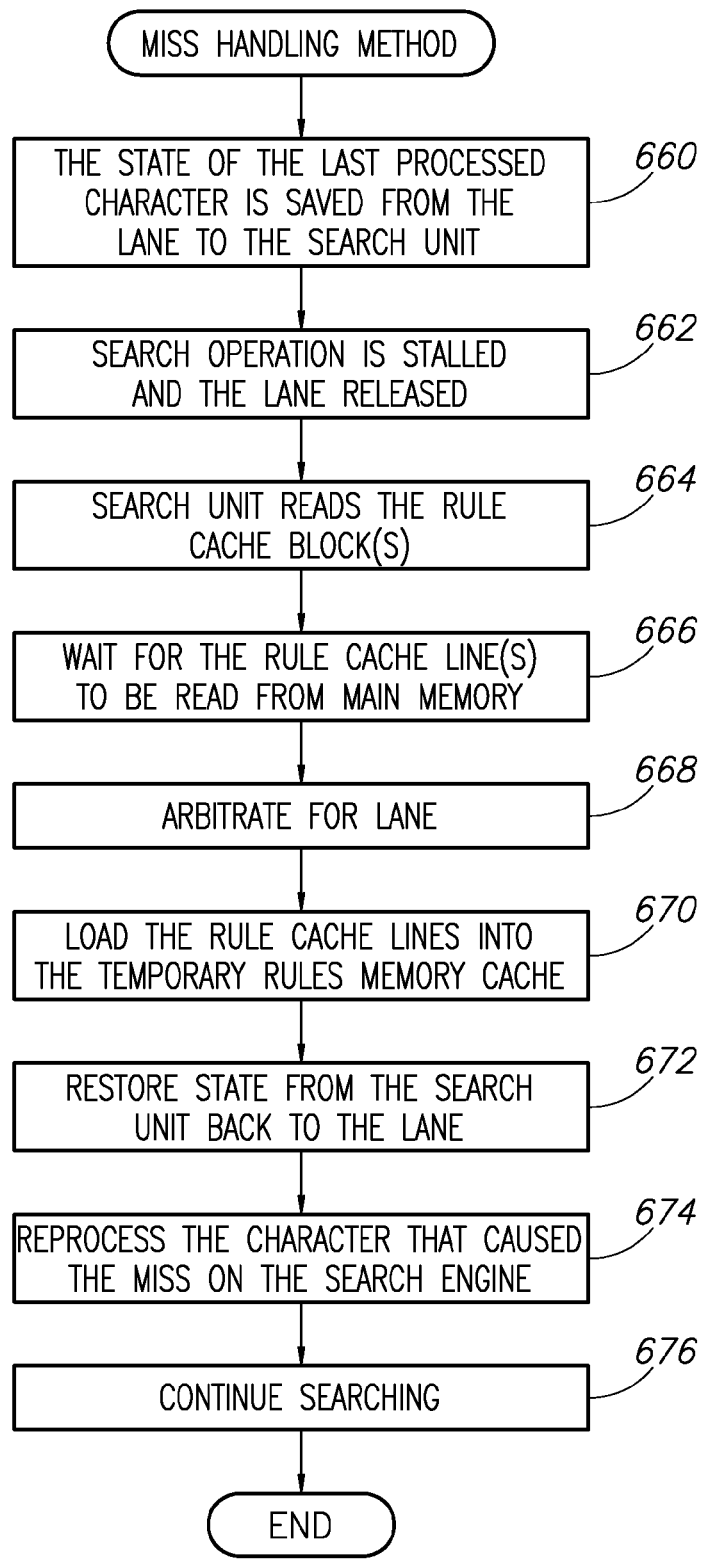
FIG. 25 is a flow diagram illustrating the method of handling a miss operation.

With reference to FIG. 25, the order of handling a miss operation is as follows. The state of the last processed character is saved from the lane to the search unit (step 660). The state does not need to be translated from local to global in this case. The search operation is stalled and the lane is released (step 662). The search unit reads the rule cache block(s) containing the missing rules from main memory (step 664). The method then waits for the rule cache line(s) to be read from main memory (step 666) and then arbitrates for a lane (step 668). The rule cache lines are loaded into the temporary rules memory cache (step 670) and the state from the search unit is restored back to the lane (step 672). The character that caused the miss on the search engine is reprocessed (or those search engines) that experienced a miss (step 674) and normal searching continues (step 676).

On a miss, the state of the search engine is kept in the search unit and the lane is freed back to the pool. Disengaging the logical lane from the SU following a miss, allows other SUs to use the lane, resulting in better performance. The state stored is the state from the last successful access to the rule cache (access to a locked rule or hit on the temporary rule cache). The state for the missed search engine comprises the state of the character previous to the one that caused the miss.

Each of the four search engines may have a miss on the default rules, the transition rules, or both. Hence, the search unit may handle up to eight misses in parallel for a single character. If a search engine experiences no rule misses, the search state saved to the SU is the state after the character. These search engines will not reprocess the character that caused the miss(es). If a search engine experienced a miss on the transition rule side, the state saved to the SU is the search engine state prior to the character. If the search engine experienced a miss only on the default rule side, the state saved is an intermediate state, resulting from the processing of the transition rules only, not the default rules. The final search engine state can be computed from this intermediate state once the default rules are available.

If there is one or more local result processor (LRP) commands associated with the byte that caused the miss the LRP commands are stored in the SU as part of the search context. The SU can hold all the LRP commands. Sending the LRP information to the SU costs additional Xbar cycles per LRP command to transfer the additional state information in each direction.

After reading the missing rule cache line, the CU arbitrates for a lane. Once the lane is granted the temporary area is loaded with the new rule cache line and then the search state is loaded. Only the search engines with the miss process the first character following a miss, as other search engines processed that character prior to the miss.

Note that it is possible that once C2 is calculated on search engine 2 there will be a miss on other search engines. In this case as well, the state is related to the last character that was successfully processed by the search engine.

The search engine comprises two engines: a transition side and a default side. Each side accesses the local memory for every input character and may experience a cache miss. The following cases can occur inside a search engine:

Case A: Both transition and default sides of the search engine have a hit on the local storage, either the locked rule or temporary rule. This is the trivial case and the normal operation.

Case B: One side (transition or default) has a hit on a locked rule and the other side has a miss.

Case C: One side has hit on a rule in the temporary area and the other side has a miss.

Case D: Both sides have a miss (need to read two cache line rules from the memory).

Note that in case B it is guaranteed that the locked rule stays in memory (rule placement is not changed during the PCH processing). In case C, it might be that by the time the missing rule is loaded from the Search Unit the rule in the temporary area is replaced. That can cause a live lock scenario on continuous misses when the search engine cannot get a miss on both rules. To resolve this, the PMA reads both rules. Alternatively, both rules are read only if the search engine failed the first time. Therefore, in cases C and D above, both rule lines (for the two sides of the search engine) are loaded together. The search unit within the command unit reads two rules cache lines from main memory. Once both rules are placed in local storage the search unit arbitrates for the lane. Once the search unit is reengaged with the lane, it writes both rules cache lines to the lane and continues the search. The search engine sends both read requests for the two cache lines back-to-back.

The space available for locked rules affects the performance of the PMA. While the upload manager defines the set of rules that should be locked in the local rules cache memory for best performance, the PMA hardware supplies a wide set of mechanism that allows efficient rules placement in the rules cache. Rules placement is performed on a per PCH basis and allows dynamic updates by the upload manger during run time.

An example of the tools available to the upload manager include: (1) selecting the bank for the transition rules; (2) global table ID to local table ID mapping; (3) state offset in the local storage; (4) placement of clusters inside the local table using the local address extended bit (E bit); (5) global to local search engine mapping; (6) search engine enable; and (7) placement of a rule in more than one physical lane.

As described supra in connection with FIG. 10, the search engine architecture implements a pattern search based on a programmable state machine. The search engine is implemented in hardware (or alternatively, software or a combination of hardware and software) and the transition rules are loaded from the memory (either local or remote). The rules define the transitions based on the input character causing the search engine to compute a new state following every rule. A more detailed description of the operation of the search engine can be found in U.S. Patent Publication 2005/0132342, to Van Lunteren, published Jun. 16, 2005, entitled "Pattern-Matching System" (which describes the operation of a pattern searching FSM) and in U.S. Patent Publication 2007/0124146, to Van Lunteren, published May 31, 2007, entitled "Pattern Detection" (which describes the operation of a pattern searching BFSM) both of which are incorporated herein by reference in their entirety.

The structure of a rule will now be described in more detail. A diagram illustrating the structure of an example rule is shown in FIG. 26. In an example embodiment, each rule line, generally referenced 392, comprises a plurality of bytes (or bits) in the rules memory and stores multiple rules 395, 396, 397 (e.g., three in this example). Each of the three rules comprises a plurality of bits. An effective rule encoding allows to pack all basic fields within a rule in a storage-efficient way, while also providing a way to extend rules that need more fields or information.

In addition to the three rules, a shared field 394 (also referred to as a shared command field) holds information shared by all the rules in the rule line. The shared field can have a meaning of dual hash, a local result processor (LRP) instruction or an extended address. In the case of dual hash, the format of the shared field 394, shown in FIG. 27A, comprises a table address 391 and a global/local flag 404. In the case of a LRP instruction, the format of the shared field 394, shown in FIG. 27B, comprises an instruction vector 393. In the case of an extended address, the format of the shared field 394, shown in FIG. 27C, comprises one or more group IDs 399. The extended address allows the search engine to switch to a different group. This enables to scale beyond the maximum number of states and rules that can be supported within a single group.

The two least significant bits of the rule line may indicate that the rule line holds less than three rules allowing the addition of rule extension information to either one or both rules. The extended rule information is used in most cases as a command to the local result processor (LRP). A diagram illustrating the structure of a rule line with extended rules is shown in FIG. 28.

Figure 29:
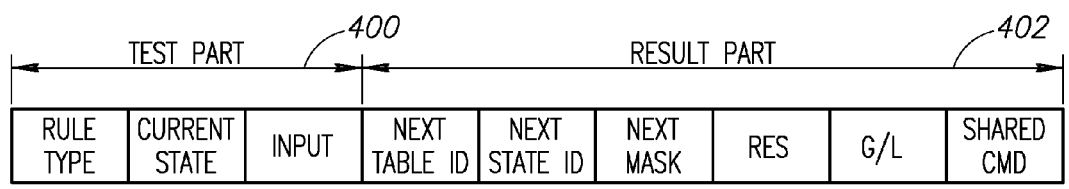
FIG. 29 is a diagram illustrating the structure of an individual rule in more detail.

A diagram illustrating the structure of an individual rule in more detail is shown in FIG. 29. The rules comprise two portions: (1) a test portion 400 comprising a test to see if there is a match to the current rule; and (2) a result portion 402 which defines the next state targeted by this rule. The next state is kept as the new search engine state and used to generate the address of the new rule based on the next character.

The initial rule is the base rule that points to the root of the rules tree. The initial rule is used when starting a search or whenever the search returns to its initial state. The initial rule is used in parallel to the transition rules read to find the default rule associated with every input character. The source of the initial rule address is in the PCH. This address undergoes GLAT translation in the command unit prior to being sent to the search engine. The translation converts the initial rule global address as presented in the PCH to a local address.

When the search engine is searching for the first character matching (either at the beginning of a new search, or during a search when no match is found), the search engine is kept in the initial state. In the initial state, only the initial rule is used and the transition rules are ignored. The search engine avoids reading the transition rules in this case. That allows memory read power to be saved when searching for the beginning of a pattern.

The PMA comprises the ability to specify a character class in a rule in place of the normal input condition for testing the current input character. For example in rule R2 (FIG. 7) the input is the letter "t". A character classifier 262 (FIG. 14) characterizes the byte in the input stream and the default rule or transition rule used by the search engine may test the provided character class information of the input character rather than the actual input character. Examples of character classes include: (1) \d numeric ("digit"); (2) \D not numeric; (3) \w alphanumeric; (4) \W not alphanumeric; (5) \s whitespace (space, carriage return, tab, new line, form feed); and (6) \S not whitespace. These operators can be specified in the default and transition rules instead of the wildcard of rule R2 or the specified input conditions of the other rules.

Figure 30:
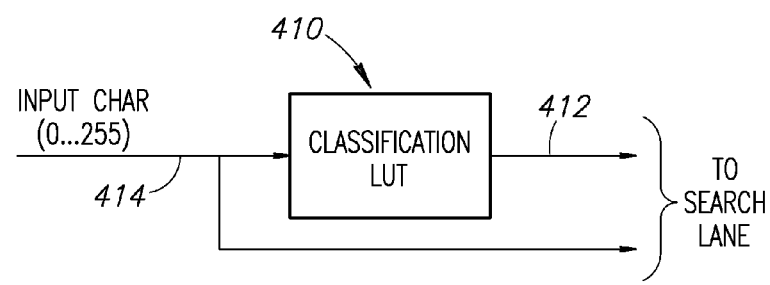
FIG. 30 is a block diagram illustrating the classifier in more detail.

With reference to FIG. 30, in one embodiment, the classifier comprises a classification look up table (LUT) 410 and associated logic circuitry that functions to generate a class vector 412 per each input character which functions as an index into the LUT. Each input character (256 options in case the input character is a byte) 414 selects a line in the classifier table 410. The class vector is output on the fly and input to the search lane along with the input character. The classifier functions to provide additional information about the input character to the search lane. For example, an input character may be part of the digit class, alphanumeric class or any other user defined class. Use of the classification serves to significantly reduce the number of rules required for certain patterns, thus effectively providing a form of 'rule compression'.

In one embodiment, each lane comprises two classifiers. Alternatively, each lane can comprise any number of classifiers depending on the implementation. The PCH of the pattern context defines which classifier is used. Both virtual lanes can use the same classifier. The classifier is initialized and updated by the upload manager using one or more upload manager commands. The classifier can be updated during run time utilizing one of the virtual lanes. Having two classifiers allows a pattern context set to be loaded using a new classifier definition while the earlier pattern context set is using the other classifier. The two classifiers can also be used when different pattern sets (with different classifiers) are assigned by the upload manager to use the same physical lane.

Figure 31:
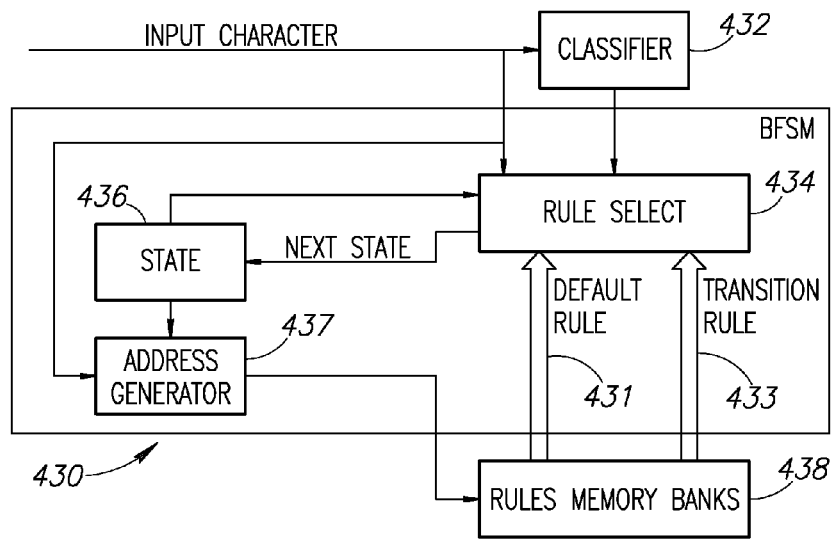
FIG. 31 is a high level block diagram illustrating the structure of the search engine.

A high level block diagram illustrating the structure of the search engine is shown in FIG. 31. The search engine 430 comprises a rule select circuit 434 that received input character and output of the classifier 432, state register 436 holding the current state vector, address generator 437 and rule memory banks 438.

Regarding the operation of the search engine, for each new character, the search engine generates two new rule addresses: (1) a transition rule address generated based on the selected rule, the current search engine state vector and the new input character; and (2) a default rule address generated based on the initial rule and the input character only.

The search engine has two main logic portions: (1) rule selection; and (2) address generation. The rule selecting logic 434 comprises four inputs, including (1) the current search engine state; (2) the rules read in the previous cycle; (3) the input character; and (4) the class of the input character (output of the classifier logic). The next state of the selected rule makes up the state definition of the search engine. It is used for the generation of the new rule address.

Address generator 437 functions to generate the addresses for reading the next rule lines (default and transition). The new address is either a global address or a local address. Rules with local address are read directly from the local rules memory (e.g., SRAM) connected to the search engine. Global rules are searched inside the temporary area (i.e. rule memory or cache). If there is a miss on a global rule, the command unit fetches the rules from main memory.

The search engine reads two new rule lines every cycle: one transition rule line 433 and one default rule line 431. Each line can hold multiple rules (e.g., three or less in case the line holds an extended rule). The selection of the rule is also referred to as a hash selection. Note that each logical search engine reads one character every character cycle. The logical search engine therefore reads the SRAM every second cycle.

Figure 32:
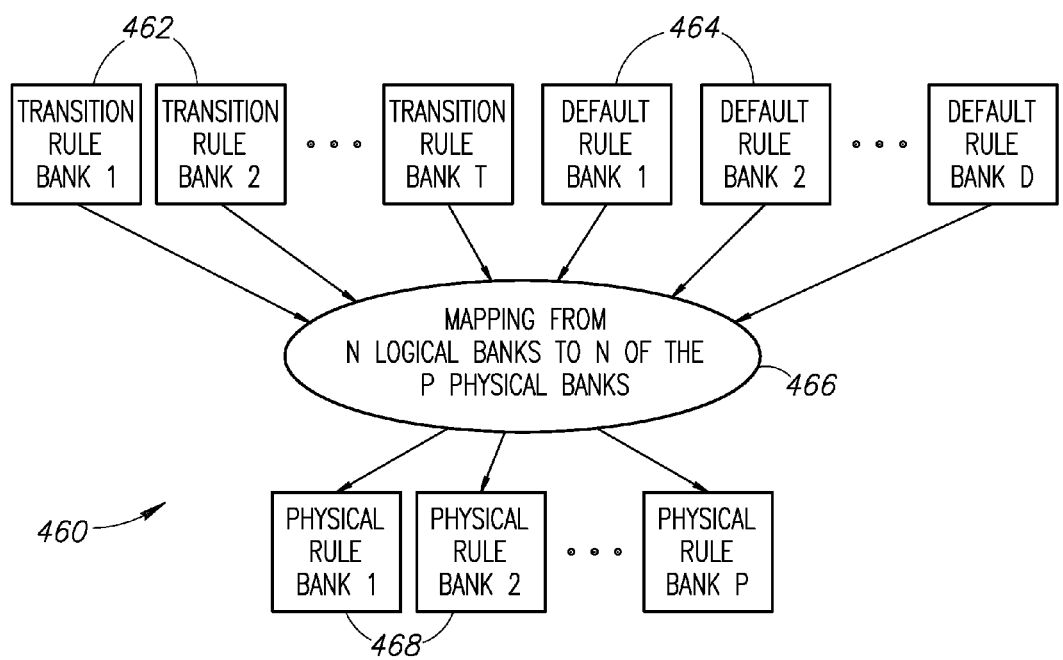
FIG. 32 is a diagram illustrating an alternative embodiment of the rule memory scheme.

In the example embodiment presented herein, a dual rule bank scheme is used whereby one bank holds transition rules and the other rule bank holds default rules. In an alternative embodiment, as shown in FIG. 32, the rule memory scheme, generally referenced 460, comprises a plurality T of logical transition rule banks 462 and a plurality D of logical default rule banks. The N=T+D logical rule banks are mapped via mapping logic circuitry 466 to N of a plurality of P physical rule banks 468. This embodiment permits the physical rule banks to hold any number and combination of logical transition and default rule banks.

The search engine checks for a match in both the transition rule line and the default rule line. A rule matches if it meets the following conditions: (1) match on the new character or class vector; and (2) an exact match on the state (referring to the state field within the rules test part which is only part of the state bits). The first match is made against the bits of the current character field in the new rule. The type of the match is defined by the rule type field in the rule. A match can be one of the following three types: (1) match on the class; (2) match on the character (either case sensitive or case insensitive); or (3) a "don't care" which always matches on the character checked. A match on the character/class can be a positive match or a negated match. Note that a negated match on a "don't care" condition results in a rule that never matches. This is used to code empty places in the rules structure.

The bits in the current state field should exactly match the designated (e.g., the most significant) state bits of the current search engine state (i.e. the next state of the rule selected in the previous cycle). If more than one rule has a match then the rule with the highest priority is selected. Rule priority is defined as follows for an example embodiment involving three rules in a default rule line and three rules in a transition rule line:

1. Transition rule 0—highest priority
2. Transition rule 1
3. Transition rule 2 when a rule is present.
4. Default rule 0
5. Default rule 1
6. Default rule 2 when a rule is present—lowest priority If there is no match on any rule, the initial rule is used to define the new state.

The next rule address is generated using the next state information taken from the result part of the selected rule (or the initial rule):

(next) State
(next) Mask
(next) TableID
(next) Global/Local

In a special case, additional information is taken from a shared command field, e.g., group ID, dual hash and extended address.

The next rule line address is generated using the mask to select bits from the (next) state and the (new input) character (Char). In the normal case there are three transition rules in a line from which the next rule will be selected (if there is a match on the rule). This is referred to as a hash. In the dual hash mode a line from the default rule bank is used as an extension of the transition rule hash. In this mode, the original set of rules for a given state, can be divided into disjoint subsets that are mapped independently on the default rule bank and the transition rule bank.

Note that the above description is applicable in the case there are only two rule banks and no dual hash is in use. In the event dual hash is used, the number of transition rules increases to a maximum of six.

The dual hash can be used when no default rule lookup is performed. Three implications of the dual hash include: (1) dual hash can be used for any state for which the input values covered by the transition rules are a super-set of the input values covered by the default rules; (2) the previous coverage can also be enforced by adding the "missing" (i.e. uncovered) input values of one or more default rules to a given state; and (3) dual hash can always be used for anchored matching (after the first character). Note that in anchored matching, the default rules are used only for the first character, unless they are used to generate LRP commands.

The dual hash is initiated for the next state when the shared command in the rule line indicates a dual hash and the shared command valid bit in the winning rule is set. In this dual hash mode, the next table ID value and the next state value for the default rule lookup are selected from the table ID and State of the shared command instead of the table ID and state from the initial rule (which is used for the default rules). The transition rule's next state and the mask are used for calculating the address of the next transition rule lookup. If there are multiple rules in a given rule line where each refers to a different dual hash next state, then the dual hash rules for these different next states can be organized in various ways, e.g., being mapped together on a single line within the default bank or being separately mapped on multiple lines within the default bank. For each of these organizations, e.g., mapped in a single-line manner or multi-line manner, the shared command field comprises all required information for performing independent hash lookups for these rules.

The rule check and selection in the dual hash is identical to the process in the normal (i.e. non-dual hash) case. During a cycle on which the default side of the search engine is running in a dual hash mode, there is no default rule checking. All rules from both banks (e.g., six rules) are referred to as transition rules. The rules on the transition side have higher priority than the rules on the default side (which is currently used for the dual hash). In case there is no match on either one of the rules, the search engine reverts to the initial state. For match result reporting, the "Match Reporting Rule" always indicates that the match is reported from a transition rule regardless whether the matching rule was on the transition bank or the default bank. The dual hash state, the dual hash table ID and a valid indication (indicating a valid bit of the dual hash) are maintained in the state block as part of the search state.

To illustrate the dual hash mechanism, consider the following example pattern context comprising four patterns: (1) abc[18]p ("abc", followed by "1" or "8", followed by "p"); (2) abc[2A]q ("abc", followed by "2" or "A" followed by "q"); (3) abc\ds ("abc", followed by any digit, followed by "s"); and (4) abc[^4]t ("abc", followed by any character other than "4", followed by "t").

Figure 33:
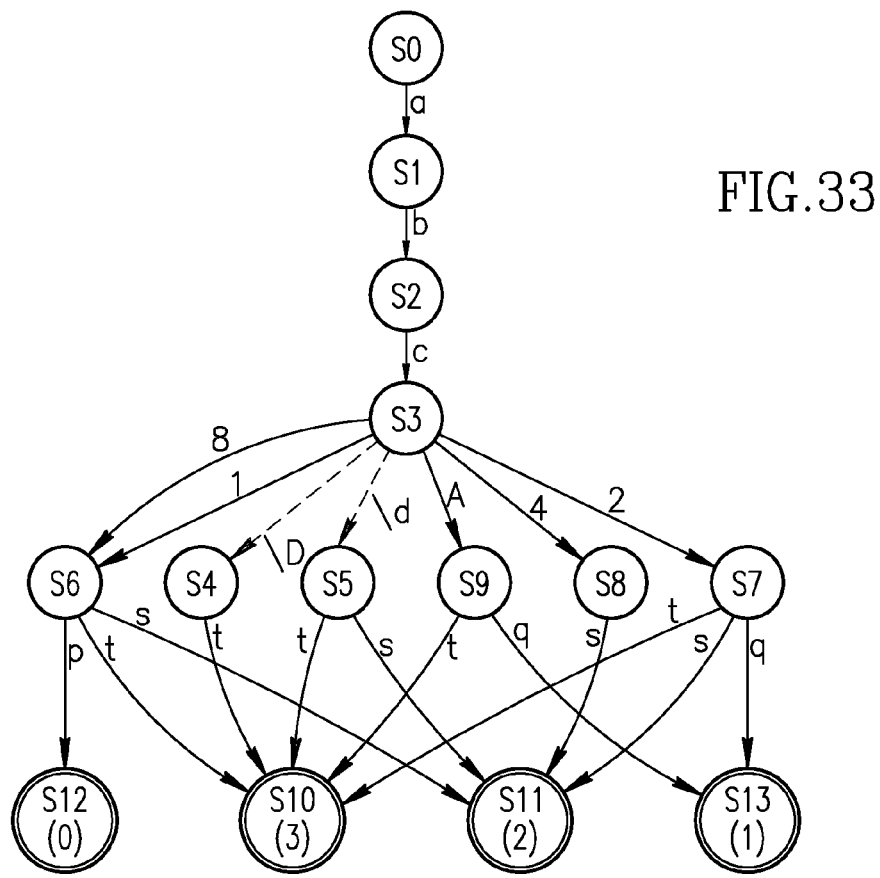
FIG. 33 is a diagram illustrating a finite state machine representing an example search.

In this example, the dual hash is useful for the state representing "abc" has been found. Note that any following character represents a continuation of one of the four patterns. Default rules are therefore unused in this state. The finite state machine representing such a search is shown in FIG. 33. In the following example, a transition from a state i to a next state j based on an input character 'a' is represented by $$S_i \xrightarrow{a} S_j.$$

In State 3, the pattern "abc" has been found. Seven transition rules from State 3 lead to six different states. These transition rules cover all characters while default rules are not used.

Rule $$S_3 \xrightarrow{\backslash d} S_5$$

and rule $$S_3 \xrightarrow{\backslash D} S_4$$

match many characters and have a lower priority than the other transition rules of State 3 which is represented by a dashed line in FIG. 33. A normal transition rule mask-based layout mechanism replicates these two rules due to limitations of the search engine hash function. Use of dual hash reduces this unnecessary replication. A transition rule table generated without dual hash and corresponding to the state diagram of FIG. 33 is presented below.

| Transition Rule Table | | | |
|---|---|---|---|
| Table Row | Rule 0 | Rule 1 | Rule 2 |
| 0 | | | $S_3 \xrightarrow{\backslash D} S_4$ |
| 1 | $S_3 \xrightarrow{A} S_9$ | | $S_3 \xrightarrow{\backslash D} S_4$ |
| 2 | | | $S_3 \xrightarrow{\backslash D} S_4$ |
| 3 | | | $S_3 \xrightarrow{\backslash D} S_4$ |
| 4 | | | $S_3 \xrightarrow{\backslash D} S_4$ |
| 5 | | | $S_3 \xrightarrow{\backslash D} S_4$ |
| 6 | | | $S_3 \xrightarrow{\backslash D} S_4$ |
| 7 | | | $S_3 \xrightarrow{\backslash D} S_4$ |
| 8 | | | $S_3 \xrightarrow{\backslash D} S_4$ |
| 9 | | | $S_3 \xrightarrow{\backslash D} S_4$ |
| 10 | | | $S_3 \xrightarrow{\backslash D} S_4$ |
| 11 | | | $S_3 \xrightarrow{\backslash D} S_4$ |
| 12 | | | $S_3 \xrightarrow{\backslash D} S_4$ |
| 13 | | | $S_3 \xrightarrow{\backslash D} S_4$ |
| 14 | | | $S_3 \xrightarrow{\backslash D} S_4$ |
| 15 | | | $S_3 \xrightarrow{\backslash D} S_4$ |
| 16 | $S_3 \xrightarrow{4} S_8$ | $S_3 \xrightarrow{\backslash d} S_5$ | $S_3 \xrightarrow{\backslash D} S_4$ |

-continued

Transition Rule Table

| Table Row | Rule 0 | Rule 1 | Rule 2 |
| --- | --- | --- | --- |
| 17 | $S_3 \xrightarrow{1} S_6$ | $S_3 \xrightarrow{\backslash d} S_5$ | $S_3 \xrightarrow{\backslash D} S_4$ |
| 18 | $S_3 \xrightarrow{2} S_7$ | $S_3 \xrightarrow{\backslash d} S_5$ | $S_3 \xrightarrow{\backslash D} S_4$ |
| 19 | | $S_3 \xrightarrow{\backslash d} S_5$ | $S_3 \xrightarrow{\backslash D} S_4$ |
| 20 | | | $S_3 \xrightarrow{\backslash D} S_4$ |
| 21 | | | $S_3 \xrightarrow{\backslash D} S_4$ |
| 22 | | | $S_3 \xrightarrow{\backslash D} S_4$ |
| 23 | | | $S_3 \xrightarrow{\backslash D} S_4$ |
| 24 | $S_3 \xrightarrow{8} S_6$ | $S_3 \xrightarrow{\backslash d} S_5$ | $S_3 \xrightarrow{\backslash D} S_4$ |
| 25 | | $S_3 \xrightarrow{\backslash d} S_5$ | $S_3 \xrightarrow{\backslash D} S_4$ |
| 26 | | $S_3 \xrightarrow{\backslash d} S_5$ | $S_3 \xrightarrow{\backslash D} S_4$ |
| 27 | | $S_3 \xrightarrow{\backslash d} S_5$ | $S_3 \xrightarrow{\backslash D} S_4$ |
| 28 | | | $S_3 \xrightarrow{\backslash D} S_4$ |
| 29 | | | $S_3 \xrightarrow{\backslash D} S_4$ |
| 30 | | | $S_3 \xrightarrow{\backslash D} S_4$ |
| 31 | | | $S_3 \xrightarrow{\backslash D} S_4$ |

In this example, the pattern compiler chose a mask of 0011011b and spread the rules across 16 rows. There is no workable mask which maps the rules into fewer rows. Note that rules $$S_3 \xrightarrow{\backslash D} S_4$$

and $$S_3 \xrightarrow{\backslash d} S_5$$

are replicated numerous times as they apply to a wide range of characters. Thus, they must be placed in every row that handles any characters to which the rule applies.

Transition and default rule tables generated with dual hash and corresponding to the state diagram of FIG. 33 are presented below.

Transition Rule Table

| Table Row | Rule 0 | Rule 1 | Rule 2 |
| --- | --- | --- | --- |
| 0 | $S_3 \xrightarrow{8} S_6$ | $S_3 \xrightarrow{2} S_7$ | $S_3 \xrightarrow{4} S_8$ |
| 1 | $S_3 \xrightarrow{1} S_6$ | | |

Default Rule Table

| Table Row | Rule 0 | Rule 1 | Rule 2 |
| --- | --- | --- | --- |
| 0 | $S_3 \xrightarrow{A} S_9$ | $S_3 \xrightarrow{\backslash d} S_5$ | $S_3 \xrightarrow{\backslash D} S_4$ |

Note that in the dual hash case, rules $$S_3 \xrightarrow{A} S_9, \quad S_3 \xrightarrow{\backslash d} S_5$$

and $$S_3 \xrightarrow{\backslash D} S_4$$

are placed in the default rule bank covering only one row. The remaining four rules are placed in two rows in the transition rule bank, using a mask of 0000001b chosen by the pattern compiler. Thus, all replication is eliminated, and as the above tables illustrate, a substantial reduction in storage requirements is achieved.

In some pattern contexts, there are patterns which must be anchored to the head of the input stream (i.e. start at the beginning of the input stream). Anchored patterns are only matched at the start of the input stream. Patterns that are not anchored will be denoted as unanchored patterns. The pattern context compiler achieves better efficiency if the anchored patterns use one or more dedicated search engines. Each search engine can be defined (by the PCH) as an anchored pattern search engine. An anchored pattern search engine uses an anchored idle flag in the search engine. The flag is cleared at the beginning of the match operation and the flag is set in the following conditions: (1) there is no rule match for a character of the stream; or (2) the rule's next state is "state invalid" (in one example embodiment it is coded by next state bit 0:1=b11).

When the anchored idle flag is set, the search engine does not report any match and does not send any commands towards the LRP. The value of the anchored idle flag is kept in the search engine state in the state block. An alternative method to check anchored rules uses the global position offset counter in the LRP which can be used for checking a zero start position. Both methods can be used for the beginning of stream anchored packets.

A pattern context might define a match which is valid only if the match was on the last byte of the stream. This type of pattern is referred to as an end of stream anchored pattern. The term anchored pattern (without "end of stream" prefix) is a pattern having a valid match only if the matching string starts at the first input byte. The application search command at the input to the PMA cannot guarantee reporting on the last character of the stream. In some cases, the application knows that the last byte was the end of the stream only after the last application search command was already sent. The LRP can report a match on the last byte of the application search command and set a flag in the match report to indicate that this is a valid match only if it was the last byte of the stream.

Some rules require a defined distance from the beginning of the stream. For example, if the following string is searched: " . . . abc" the implementation is to look for the string "abc" when the character "a" is at position 4 in the stream. Since the stream can be split across multiple application search commands, a counter is used to count the global position offset inside the packet. There are two ways that the global position offset can be checked: (1) use of a dedicated Global Offset Register (GOR); and (2) use of the offset register (OFR) in the LRP.

A match can be reported in one of the following ways:
1. A result flag is set on the rule at the output of the search engine rules matching and priority checking. The result flag can be set either on the transition rule or on a default rule. This method can report up to one match per character per search engine.
2. The result is reported through the local result processor (LRP) command initiated by the transition rule with the highest priority match at the output of the search engine.
3. The result is reported through the local result processor (LRP) command initiated by the default rule match at the output of the search engine.

Note that, when a default rule produces an LRP command, that LRP command is sent to the LRP even if a high-priority transition rule also matches. This allows the search engine to efficiently encode LRP commands that must be executed whenever a particular single character is encountered. Hence, a single search engine can generate two LRP commands for a single character: one from a matching transition rule, and one from a matching default rule.

In one example embodiment, a total of three matches per character per search engine can be reported, i.e. 12 matches per lane per character, however in alternative embodiments, any number of matches per character can be reported. When matches are expected to be rare the hardware can be optimized assuming a low number of matches. For example, when there are multiple matches per character, it indicates an input pipe may be stalled for few cycles to allow the match output results to be flushed from the lane back to the command unit.

Figure 34:
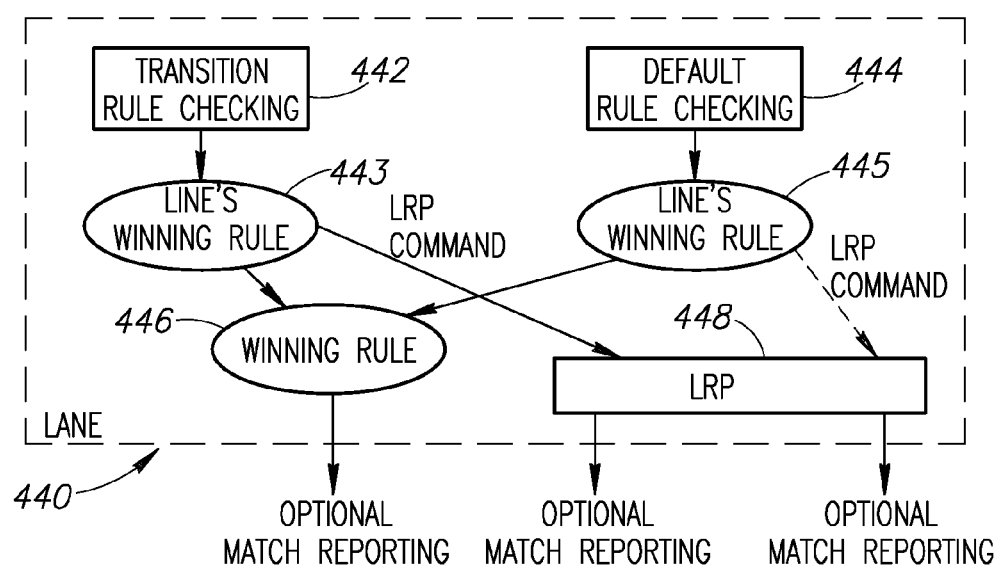
FIG. 34 is a block diagram illustrating the result reporting and LRP interface.

A block diagram illustrating the result reporting and LRP interface is shown in FIG. 34. The winning rule 446 is selected from the transition rule 442 checking line's winning rule 443 and the default rule checking 444 line's winning rule 445. In the case of multiple matches per character, the lane connection to the SU might be overloaded and cause back pressure on the lane. In this case, the lane stops processing new characters until all matches are reported.

The local result processor (LRP) is connected to all one or more (e.g., all four) search engines in a logical lane (there are thus two LRPs per physical lane). Each search engine sends up to two commands per cycle from both the transition rule bank and the default rule bank: (1) one command as the output of the transition rule checking (highest priority matching transition rule); and (2) one command as the output of the default rule checking (highest priority matching default rule).

A plurality of LRP commands (e.g., eight) can be received by the LRP: one from each search engine transition rule; and one from each search engine default rule. All commands can use the same set of opcodes.

A command can have either one of two sources in the rule line. The command is used only if there a match on the associated rule in the line.
1. Rule's Shared Command: This command is used if the shared command valid bit in the line's winning rule is set and the shared command is an LRP command. This command is associated with the rule when the shared command valid bit in the rule is set.
2. Rule's Extended Command: This command is associated with rule 0 (Type=b01), with rule 1 (Type=b10), or with both rules (Type=b11). If there is a valid LRP shared command, this extended rule is not executed.

Each command sent to the LRP is associated with the state of the search engine (i.e. cluster ID, table ID, and state), and with the current position. This information is used by the LRP for match result reporting.

The end match position is reported as the position of the current character when the match was found by the search engine in the stream. This information is transferred from the search engine to the LRP and from there, if there was a match, to the match reporting. The start match position can be reported for only some patterns due to the fact that for every potential match there can be multiple potential start match positions. Unlike the end match position, the start match position is managed by the local result processor through the local result processor command it receives from the rules. A rule can include a command that tells the local result processor to keep the current position in the local result processor registers. Because a valid match can only be determined after all input characters have been processed that make up a complete string that matches a given pattern, a later command triggered by the processing of the last character of a matching string will then point to one of those registers to provide the value of the start match position.

When processing related application search commands in chain mode the search state is loaded into the algorithm engine at the beginning of middle and last application search command processing. The state is from the algorithm engine that was previously stored at the end of first and middle application search command processing. The state is kept in the state block structure. The state block is a data structure located at an offset from the status block pointer at the application search command.

Match results are reported through a set of entries in an output buffer pointed to by the application search command. The match report comprises the information from which the application software can identify the pattern that caused the match reporting and its position. In one example embodiment the following information is included in the match report: (1) the search command in the application search command (search command 0 or search command 1); (2) match state or match character: When the match is reported by a direct match report coming from the search engine or reported by an LRP match report from a transition rule, the reported information about the search engine next state (from the winning rule result part) includes table ID (next table ID in the rule) and state (next state field of the rule); (3) when the match is reported by an LRP match report from a default rule, the reported information is the character on which the match was found; (4) the end match position which is the byte position in the input stream on which the pattern match ended; (5) optionally, the match report entry can hold additional valid information in the "Local Result Processor Information"

field. This information may comprise: The value of an LRP General Purpose Register (GPR), the value of an LRP Offset Register (OFR), this can be used for the start match reporting as the byte offset from the point on which the matched string was started. A flag in the match reporting indicates if this field is valid; and (6) an immediate value from the rule line.

Figure 35:
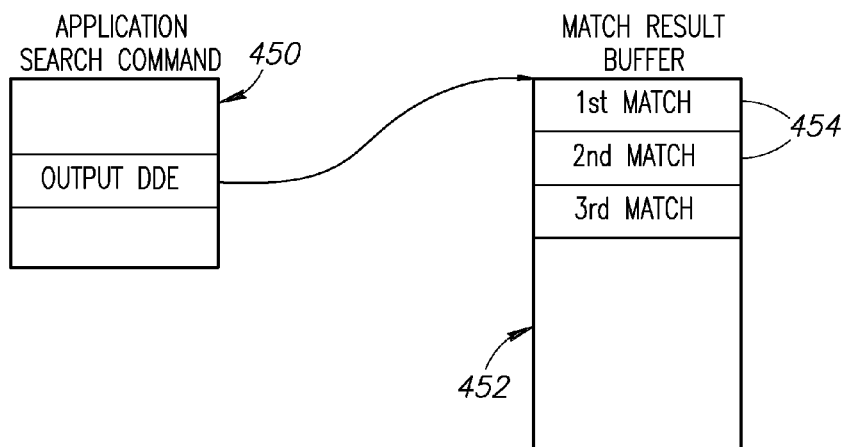
FIG. 35 is a diagram illustrating the generation of buffer match reports.

A finite number (e.g., 12) of match reports can be generated per search command per character. Each search engine sends a match report if the winning rule has a result flag set. Each search engine can also send up to two LRP commands that can cause a match reporting. Buffering is provided to buffer match reports before sending them to the match result buffer in memory, as shown in FIG. 35. If the internal buffering fills, the lane will stall to allow time for it to empty. In the case of a match port buffer overrun (the buffer 452 is located in main memory and is pointed to by the application search command 450) the application search command search operation is stopped and an output buffer overflow error is reported through the status block. The application may increase the size of the output buffer, and retry the search command. The total number of match entries 454 placed in the output buffer (for both search commands of the application search command) is reported in the status block. In continuous mode of operation this number defines the total number of matches for all the application search commands.

Regarding the dual hash, in alternative embodiments, a variety of different hash configurations can be implemented as described infra. Note that throughout FIGS. 36 to 39, the term 'bank' denotes a logical bank as opposed to a physical bank. In addition, accesses may be performed in parallel or in series to either separate or the same physical rule memories.

Figure 36:
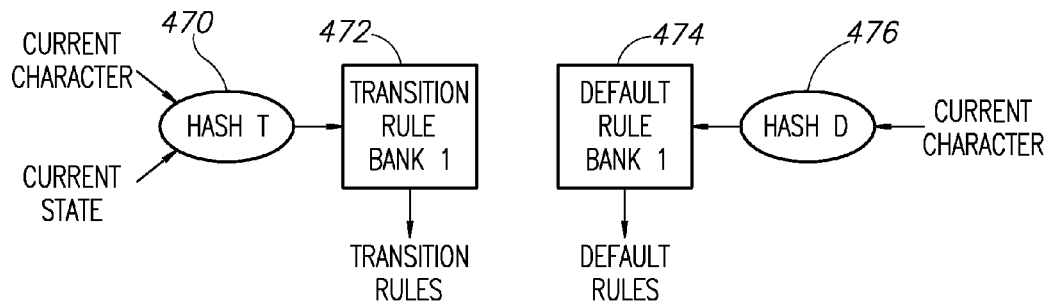
FIG. 36 is a diagram illustrating an example base hash configuration.

A diagram illustrating an example base hash configuration is shown in FIG. 36. In this basic configuration, the hash T 470 is performed on the current character and current state. The resulting hash T is used to lookup transition rules in transition rule bank 472. Similarly, the hash D 476 is performed on the current character. The resulting hash D is used to lookup default rules in default rule bank 474.

Figure 37:
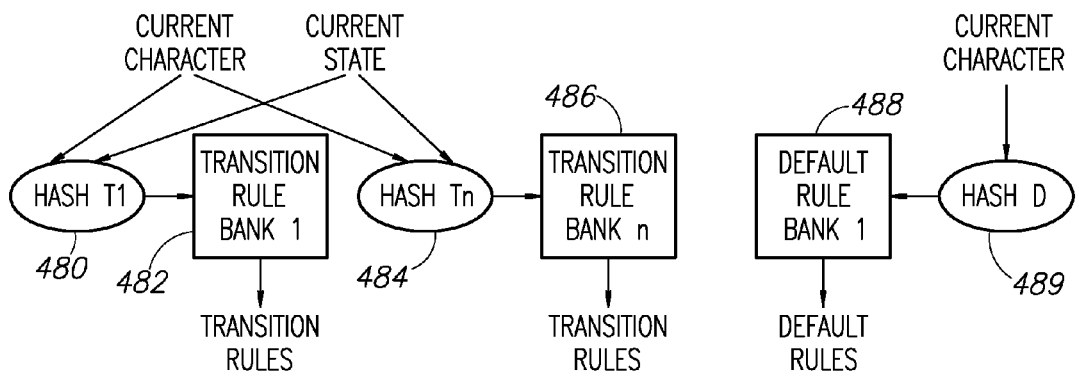
FIG. 37 is a diagram illustrating an example base hash configuration.

A diagram illustrating an example transition rule multi-hash configuration is shown in FIG. 37. In this configuration, a plurality of hashes T1 480 through hash Tn 484 are performed on the current character and current state. Hash T1 is used as a lookup to transition rule bank 1 482, hash T2 is used as a lookup to transition rule bank 2, and so on through hash Tn which is used as a lookup to transition rule bank n 486. Each hash result is operative to output a transition rule. In this configuration, only a single default hash, hash D 489, based on the current character is used as a lookup for default rule bank 1 488 which outputs default rules.

Figure 38:
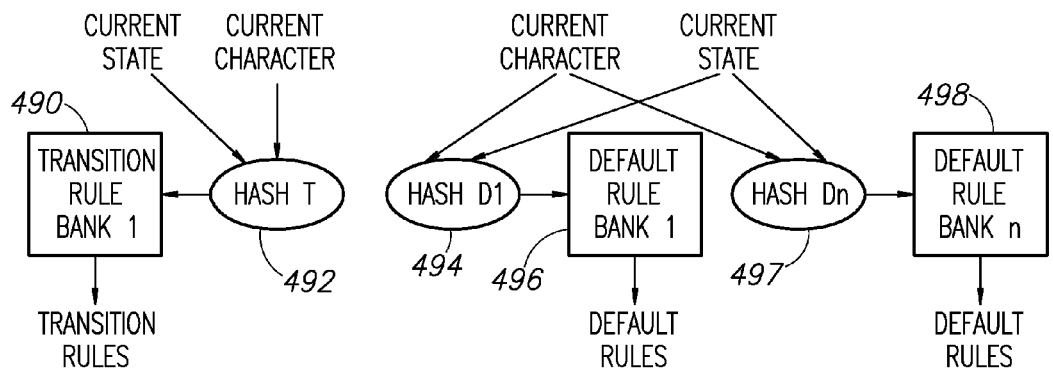
FIG. 38 is a diagram illustrating an example base transition rule multi-hash configuration.

A diagram illustrating an example default rule multi-hash configuration is shown in FIG. 38. In this configuration, a plurality of hashes D1 494 through hash Dn 497 are performed on the current character. Hash D1 is used as a lookup to default rule bank 1 496, hash D2 is used as a lookup to default rule bank 2, and so on through hash Dn which is used as a lookup to default rule bank n 498. Each hash result is operative to output a default rule. In this configuration, only a single transition hash, hash T 492, based on the current character and current state, is used as a lookup for transition rule bank 1 490 which outputs transition rules.

Figure 39:
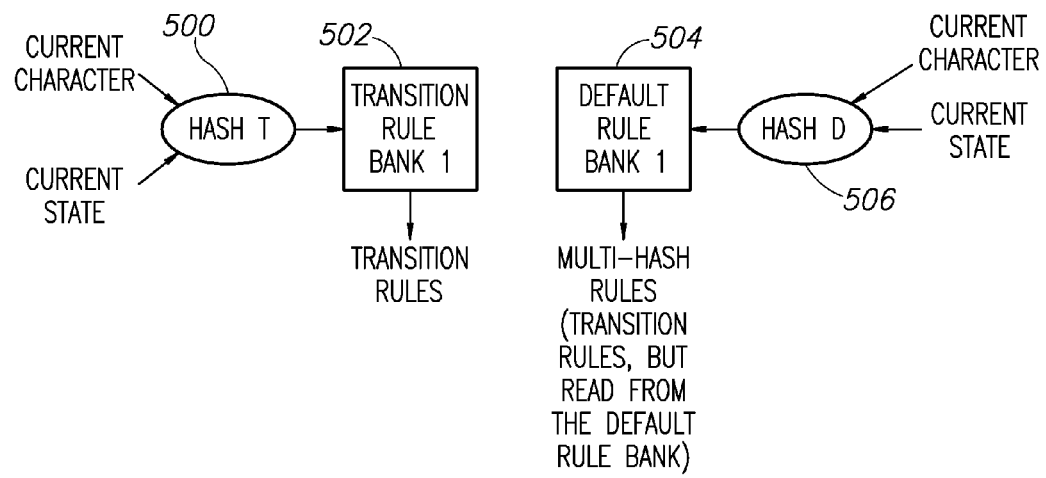
FIG. 39 is a diagram illustrating an example multi-hash configuration with default rule bank repurpo sing.

A diagram illustrating an example multi-hash configuration with default rule bank repurposing is shown in FIG. 39. In this configuration, a hash T 500 is performed on the current character and current state. Hash T is used as a lookup to transition rule bank 1 502 to output a transition rule. A multi-hash TD 506, based on the current character and current state, is used as a lookup for multi-hash rules in default rule bank 1 504 which outputs multi-hash rules (i.e. transition rules that are read from a default rule bank). It is possible, as a generalization, to perform transition rule multi-hash and default rule multi-hash and default rule bank repurposing in one embodiment.

Figure 40:
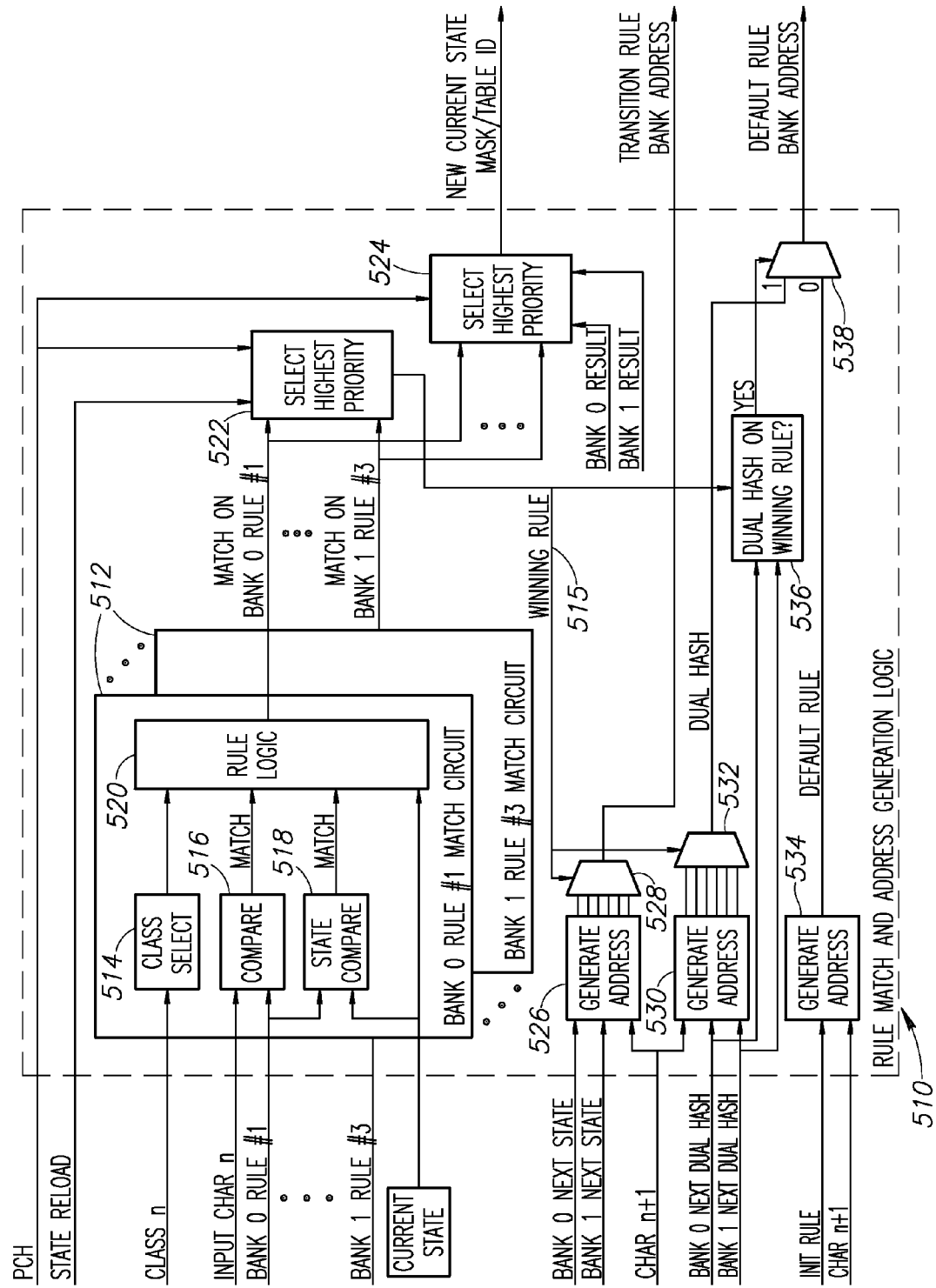
FIG. 40 is a block diagram illustrating example rule match and address generation logic.

In one embodiment, the search engine logic takes two cycles to process a single character: an SRAM read cycle and a computation cycle. Every physical Lane has four search engines which are time multiplexed between two logical lanes (meaning that the SRAM is read every cycle, every other cycle per logical lane). With reference to FIGS. 22 and 40, the address generation by the previous character is fed to the SRAMs 360, 362 in both banks. If it is a local rule, the selection is according to the rule address. If the rule is a global rule, the SRAM selection is done according to the tag 354 match results. The PCH 351 indicates which banks hold the transition rules and which banks hold the default rules for the specific PCH. Both banks can hold either transition or default rules.

The rule match and address generation logic, generally referenced 510, comprises a plurality of rule match circuits 512, one for each of three rules from both banks 0 and 1 (bank 0 rule #1, bank 0 rule #2, bank 0 rule #3, bank 1 rule #1, bank 0 rule #2, bank 1 rule #3 for a total of six rule match circuits), select highest priority circuits 522, 524, address generators 526, 530, 534, dual hash on winning rule decision block 536 and multiplexers 528, 532, 538. Each rule match circuit 512 comprises a class select block 514, compare block 516 and rule logic 520. Accordingly, the test portion of bank 0, rule 1 is input to the bank 0 rule 1 match circuit; the test portion of bank 0, rule 2 is input to the bank 0 rule 2 match circuit; the test portion of bank 0, rule 3 is input to the bank 0 rule 3 match circuit. Similarly, the test portion of bank 1, rule 1 is input to the bank 1 rule 1 match circuit; the test portion of bank 1, rule 2 is input to the bank 1 rule 2 match circuit; and the test portion of bank 1, rule 3 is input to the bank 1 rule 3 match circuit.

The data read from the SRAM banks is used by the search engine logic which functions to find the rule with the highest priority and to generate the next rule address. The search engine logic also drives the LRP command of the winning rule to the LRP. The search engine logic is operative to generate two addresses: one for the transition rule bank 511 and the other for the default rule bank 513. The information from the PCH 351 controls an output multiplexer to send the transition rule address and the default rule address to the appropriate bank.

The inputs to the rule logic 520 in each match circuit 512 comprises input character n, class of the input character (via class select 514), current state via current state register 539 and the test portions of the currently read rule. Each of the six rules (i.e. bank 0, rule 1 through bank 1, rule 3) is input to an individual match circuit 512. A rule matches if both the character/class checking 516 and the state checking 518 passed successfully.

The rule matching results outputs from the six match circuits 512 are input to the select highest priority logical circuit 522. The rules priority order is as follows: Transition_Rule0>Transition_Rule1>Transition_Rule2> Default_Rule0>Default_Rule1>Default_Rule2>Init. Rule. The PCH information input indicates whether the first three match results come from the default rules or the transition rules. The next address is generated via blocks 526, 530 and the winning rule 515 selects the correct address via multiplexers 528, 532. The transition rule bank address 511 is generated using the winning rule next state and the input character. The default rule bank address 513 may comprise either a default address generated by the initial rule and the input character or a dual hash address generated from the next dual hash value and the input character.

As described supra, the Local Result Processor (LRP) assists the basic operation of the search engine to handle complex patterns. In an illustrative example shown in FIG. 41 consider the search engine looking in parallel for matches of the regular-expression patterns "ab.*cd" (pattern 0) and "kl[^\n]*pq" (pattern 1) in a given input stream without the benefit of the LRP. The first pattern will match if the input stream contains a string "ab" that is followed by a string "cd" with any number of any type of characters in between. The latter is defined by the "." metasymbol which matches any character value, followed by a quantifier "*" (also known as Kleene star or Kleene operator) meaning zero or more matches on the associated character, in this case the metasymbol ".".

The second pattern will match if the input stream contains a string "kl" that is followed by a string "pq" with any number of any type of characters in between except for a newline symbol, as is defined by the character class "[^\n]" which corresponds to any character value that is not a newline symbol (\n) followed by a Kleene star.

Figure 41:
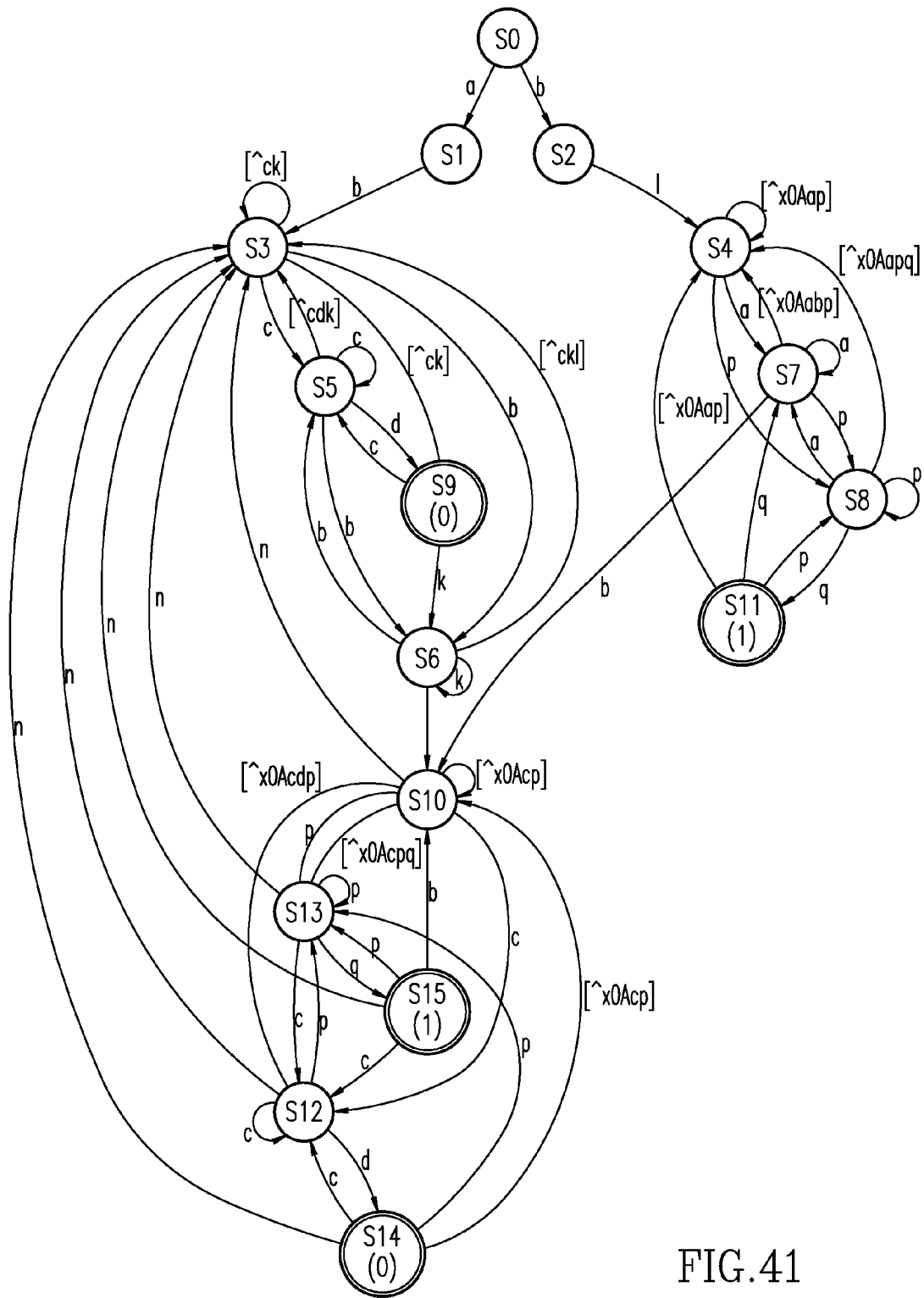
FIG. 41 is a block diagram illustrating an example search without the benefit of the LRP.

FIG. 41 illustrates a state diagram that is generated for the above pattern matching function for the case that no LRP is used. Note that the diagram in FIG. 41 is simplified for illustrative purposes, by not showing the initial rule and by showing the default rules as transition rules for the initial state S0.

Figure 42:
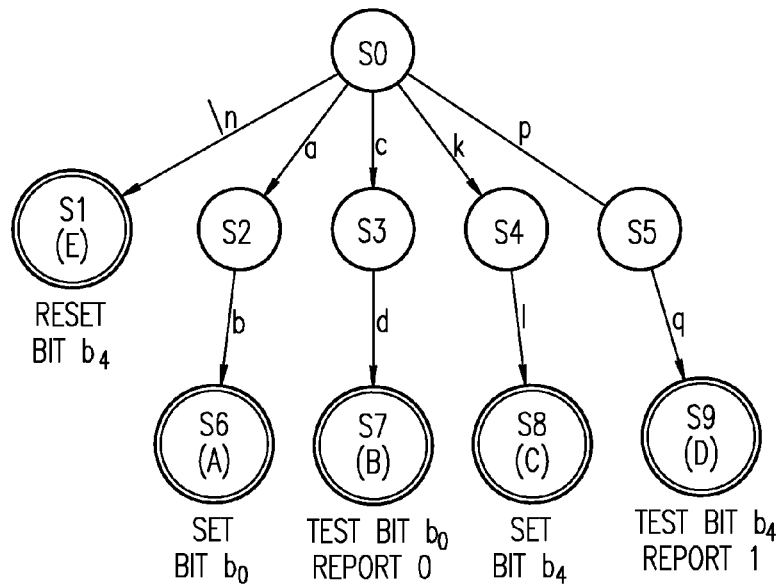
FIG. 42 is a block diagram illustrating the example search of FIG. 41 with the benefit of the LRP of the present invention.

FIG. 42 shows a state diagram that is generated for the case that an LRP constructed in accordance with the present invention is used. FIG. 42 is also simplified by not showing the initial rule and by showing the default rules as transition rules for the initial state S0. In this case, the subpatterns in the above two patterns, namely "ab", "cd", "kl" and "pq" are all searched independently of each other.

Upon detection of "ab" a set instruction is issued to the LRP that will set a bit in one of the registers in the register file of the LRP at position b0. Similarly, upon detection of "kl" a set instruction is issued to the LRP that will set a bit in a register at position b4. Note that these bits are allocated by the compiler and are in this case selected in an arbitrary way for illustrative purposes only. Upon detection of "cd" the bit at position b0 is tested and if set, a match report instruction is issued to report a match on pattern 0. This corresponds to the above definition of pattern 0. Similarly, upon detection of "pq" the bit at position b4 is tested and if set, a match report instruction is issued to report a match on pattern 1.

As shown in FIG. 42, the detection of a newline character (\n) in the input stream will trigger a reset instruction on bit b4. Consequently, a match on pattern 1 will only be reported if "kl" has been detected (which will result in bit b4 being set) not followed by a newline symbol (\n) (if detected, it would have reset bit b4), followed by "pq" (which will trigger the match report if bit b4 is still set). Note that in FIGS. 41 and 42, the state transitions originating in state S0 are default rules and the remaining transitions are transition rules. As can be seen from this example, use of the LRP results in a substantial reduction of the number of states and transition rules for wildcard patterns: the state diagram in FIG. 42 is significantly smaller than the one in FIG. 41.

Figure 43:
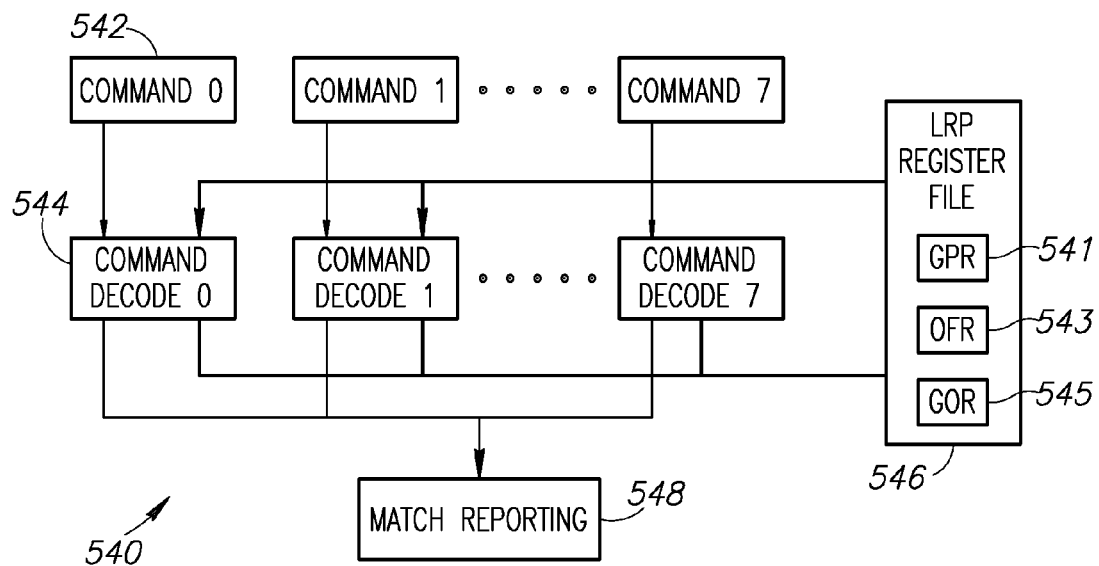
FIG. 43 is a simplified block diagram illustrating the LRP in more detail.

A simplified block diagram illustrating the LRP in more detail is shown in FIG. 43. The LRP, generally referenced 540, comprises a plurality of command decode circuits 544 (eight in this example embodiment) operative to receive corresponding commands 542 from the search engines and a register file 546 including general purpose registers 541, offset counter registers 543 and global offset registers 545. In one embodiment, the LRP is implemented as a set of registers 546 that are modified by commands sent from the search engines. There are two LRPs per physical lane, one for each logical lane. The LRP is structured as a processor (i.e. command/decode circuits) coupled to the set of registers 542 that receive commands from the search engines. One or more commands may be sent from the search engines to the LRP per character. The LRP can process the commands in a single clock cycle (the time required by the search engine to process a character).

In the example embodiment, the LRP comprises eight command decode (CD) circuits that operate in parallel. All command decode units receive the register file 546 as input for condition checking. Each command decode generates three bitwise register command operations, "Shift", "Reset" and "Set", for the target register.

The register file gathers the three register command bit vectors from each command decode circuit and performs a combined operation on the register. The LRP register file 546 comprises a plurality of general purpose registers (GPR) 541, a plurality of offset counter registers (OFR) 543 are used to hold temporary storage of the character position offset values.

The Offset Registers (OFR) comprise a plurality of free running counters (i.e. incremented every new character processed by the lane). In the example embodiment, OFRs are saturating and stop counting at 0xFFFF and do not wrap over. A special LRP command resets (to 0x0000) the OFR to start offset counting from a specified location. This is used to find the distance from the beginning of a match. The content of one OFR can be added to a match report. Software can then find the start position using the match position and the offset from the start position. Note that the match position is an offset local to the current application search command. In contrast, the offset reported by an OFR can refer to a start match position either in the current application search command input data or in earlier application search command's input buffer.

The Global Offset Register (GOR) is initialized to zero (0x00) at the beginning of a scan for a single mode packet and at the first packet of a continuous mode. The value of the GOR holds the global offset from the beginning of the search GOR=0 at the first byte of the search and is incremented for every new character processed by the lane. When the GOR reaches its maximal value of 0xFF it keeps the value unchanged until the end of the search. The GOR value is used as a condition in some of the LRP opcodes.

The LRP command can be used for the following type of operations: (1) OFR operation (e.g., reset OFR); (2) GPR operation (e.g., load, set, reset, shift, increment and decrement commands); (3) match reporting (e.g., report match with current state only, report match with current state and selected GPR (i.e. the value prior to current character selecting), report match with current state and selected OFR (i.e. the offset of the current character (the value prior to current character selecting), report match with current state and immediate data (from the LRP command).

The same GPR can be controlled by multiple instructions. The next value of each bit in the target register is defined by a defined priority which is calculated per bit. If there is more than one command affecting a bit in a register, the priority of the operation is as follows (from lowest priority to highest priority): (1) increment; (2) shift; (3) reset; and (4) set.

A short command comes from the rule shared command and allows sending a command to the LRP while having three rules in the line. Short command opcodes function to save rule space when full command opcodes are not needed.

The condition in a conditional command checks the relations between a vector of an immediate byte in the command and a specified byte in one of the GPRs. The condition can be one of the following types: (1) no condition; (2) the selected byte has all set bits in common with condition vector; (3) the selected byte has at least one set bit in common with condition vector; and (4) the selected byte equals the condition vector. A load operation is operative to load an immediate value into a selected general purpose register (GPR)

The LRP command can report a match. The match state reported is the next state of the search engine that initiated the LRP command. The following match options are provided: (1) match if a specified GPR bit is set; (2) match with no condition; (3) match if end-of-stream; and (4) match if condition met (=/=</>) on the value of the global offset register (GOR).

A set command allows a single bit or a vector to be set in a selected GPR. If the target bit is already set, this operation keeps the value of the bit unchanged. A reset command resets a single bit or a vector in a selected GPR. A shift command shifts a single bit or a vector in a selected GPR. There are two types of multi-register reset: (1) GPR multi-register reset (resets the selected general purpose registers (GPR)); and (2) OFR multi-register reset (resets the selected offset registers (OFR)). An increment command (also referred to as a count command), adds one to the value defined in a bit field in the defined GPR. A decrement command subtracts one from the value defined in a bit field in the defined GPR.

As described supra, the LRP enables complex pattern matching to be performed in hardware when the alternative is to send multiple partial matches to the software for further processing. A disadvantage of sending multiple partial searches to the software is the increased load placed on the software processing and the increased number of reported matches, which thwarts the goal of simplifying the match reporting logic assuming a low match reporting rate.

The Software Result Processor (SRP) is used for complicated pattern search cases that are beyond the capabilities of the LRP. These capability limitations might relate, for example, to the type of processing (instructions) that the LRP supports, or to the amount of information that can be stored within the GPRs. In this case, the LRP writes additional information in the match reports, for example, the contents of a GPR or OFR selected by a match report instruction, or immediate data that is contained in a match report instruction. This additional information can then be further processed by the SRP to determine if a pattern match has been found in the input stream.

Upload Manager Interface

The PMA provides application search commands that are used by the upload manager to control the operation of the PMA. The commands are used for the initialization, monitoring and dynamic updates of the PMA internal data structures, and include: (1) Sync. Command (ensures that all prior upload manager commands have been completed); (2) Commands to write the PCH, GLAT, local rule area and classifier (loads new contexts, and make rules local); (3) Flush Temporary Rules Command (makes the temporary area coherent after rule modification, and remove unloaded rules from the temporary area); (4) Search Engine Performance Monitor Read Command (retrieves statistical profiles of rule access patterns); and (5) Search Engine Performance Monitor Write Command (controls what statistics are taken for determining local rule sets).

There are seven control commands that are used by the upload manager to control the operation of the PMA algorithm engine (AE): (1) Sync. Command (checks that all previous commands in the pipe were completed); (2) Write PCH Command (updates an entry in the PCH table with information embedded in the application search command); (3) Write GLAT Command (updates the GLAT table with information embedded in the application search command); (4) Load Cluster Command (loads a rule cluster into one of the search engine local memories); (5) Load Classifier Command (loads a single classifier table, or part of it, into a single lane); (6) Flush Temporary Rules Command (flushes, i.e. invalidates, the cache of one or more banks of the search engine temporary rule area); (7) Search Engine Performance Monitor Read Command (dumps the content of the PMA internal search engine performance counter array to the defined location in main memory); and (8) Search Engine Performance Monitor Write Command (loads the contents of the PMA internal search engine performance counter array from a defined location in main memory). These commands are used for the initialization, monitoring and dynamic updating of the PMA internal data structure. The Flush and the Sync. Command do not move any data. The Search Engine Performance Monitor Command moves data from PMA to the main memory. The remaining commands move data between main memory and PMA internal data structures.

Upload manager command processing completes when a status block is written back to memory. In addition, hardware may assert an interrupt towards the processor; write a flag to memory, or any other suitable completion notification.

Search Engine Performance Monitoring

The search engine performance monitoring system comprises a statistical sampling mechanism that is, in one example embodiment, configured, initialized and read using upload manager application search commands. The system collects statistical profile information at multiple levels of resolution including: (1) which currently loaded contexts are frequently accessed; (2) which tables within particular contexts are frequently accessed; (3) which chunks within particular tables are frequently accessed, etc. It may also be beneficial to collect statistical profiles of other behaviors, such as (1) which states within a table are frequently accessed; (2) which rule lines or cache blocks within a table are frequently accessed; and/or (3) sequencing of accesses such as which state is commonly accessed following a given state.

The search engine performance counters collect statistical profiles of search engine activity that are used by the upload manager to determine which rules should be placed in the local area. Samples of the active states in the search engines are gathered by the search engines and sent to a performance monitoring unit 268 (FIG. 14) inside the PMA. The sampled states are processed based on the current configuration and, as a result of the processing, one or more counters may be incremented.

Figure 44:
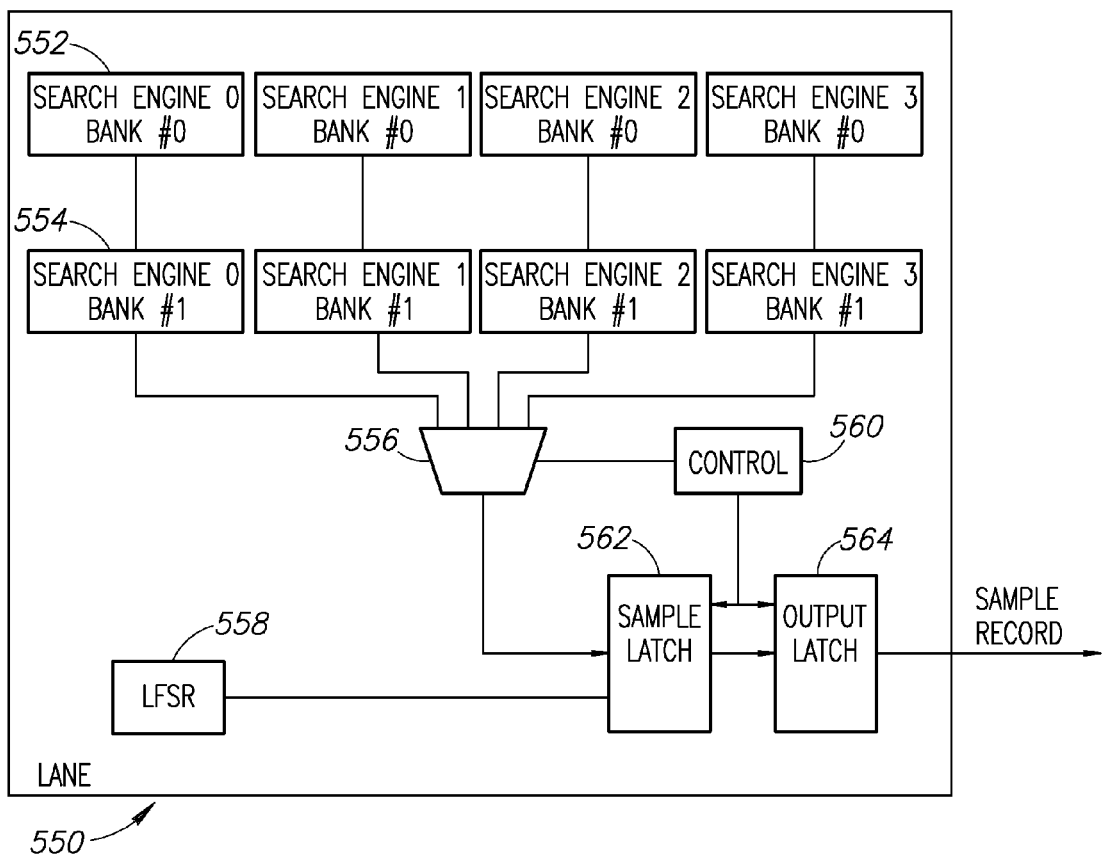
FIG. 44 is a block diagram illustrating the collection of sample records from a lane.

As shown in FIG. 44, within each lane 550, each search engine generates two sample records, one for bank #0 552 and one for bank #1 554. Each sample record comprises fields such as valid indication, rule read, hit/miss indication, bank, lane, search engine, group ID, global/local indication, table ID, mask and state. Each search engine produces a maximum of two records every fast clock. The sampling reduces this to one record every other slow clock across all search engines, greatly simplifying the performance monitor unit while still providing sufficient statistical accuracy and collection speed. In the example embodiment presented herein, each of the 16 logical search engines sends two samples every sample cycle, i.e. there are 32 sources of the sample record. The samples are multiplexed 556 and first written to a sample latch 562 and then an output latch 564, controlled by control block 560. Linear feedback shift register (LFSR) provides a randomized output which serves as the latch enable to the sample latch 562.

Figure 45:
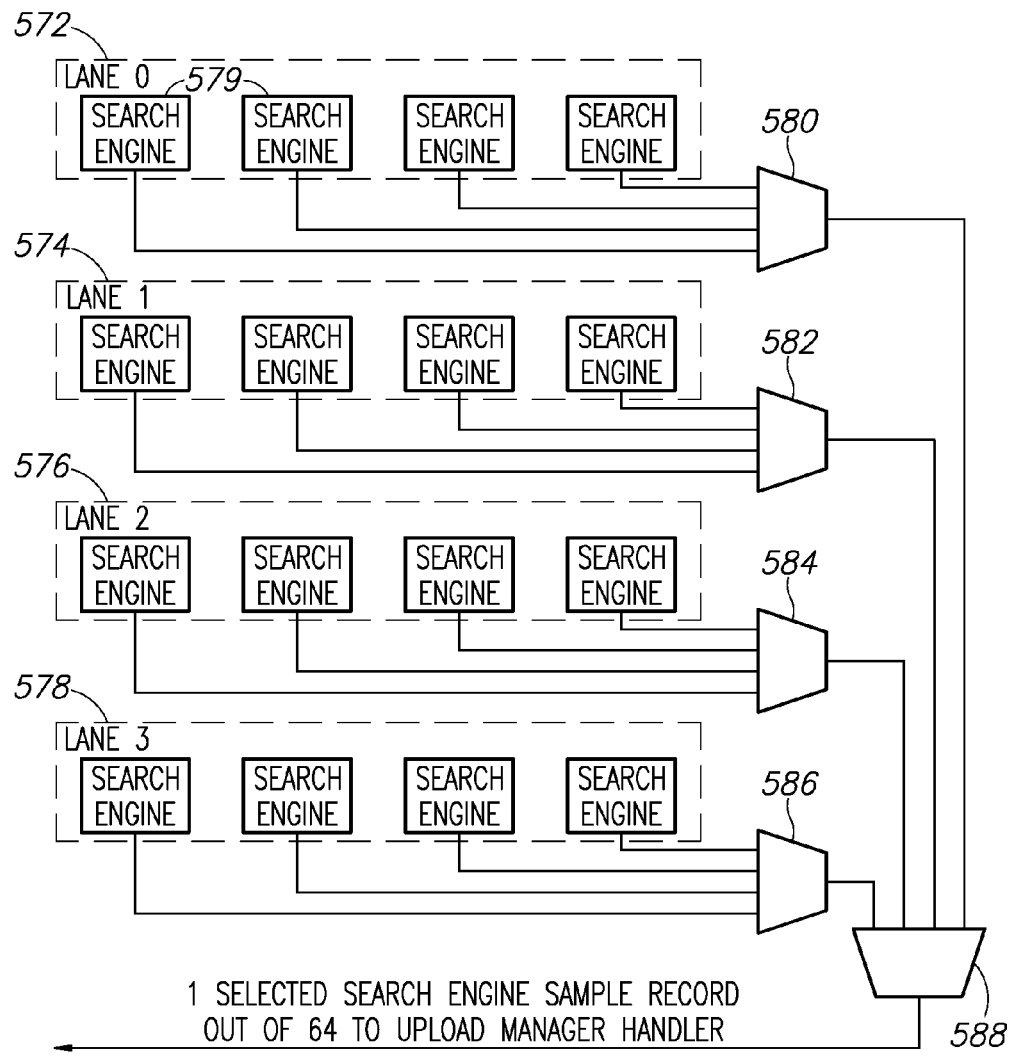
FIG. 45 is a block diagram illustrating the collection of sample records from multiple lanes.
Figure 45:
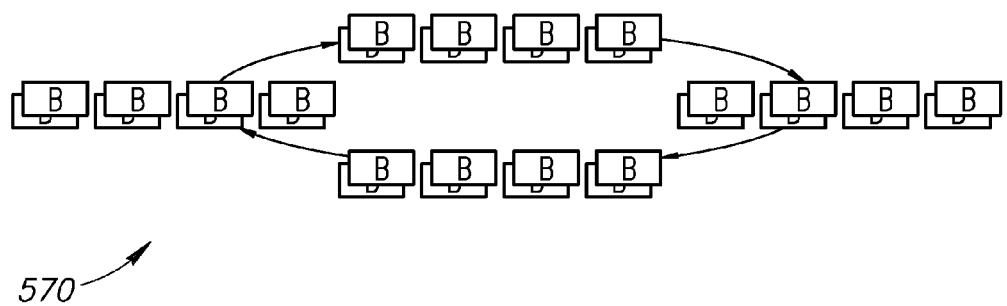

A shown in FIG. 45, each of the lanes 572, 574, 576, 578, comprising search engines 579, sends the records in a cyclic order: Lane[0], Lane[1], Lane[2], Lane[3]. Each lane 572, 574, 576, 578 sends a single sample at a time to its corresponding multiplexer 580, 582, 584, 586, respectively. The sample records are gathered in round robin fashion from the search engines through a shared search engine performance monitor record sample bus. The search engines inside the lane are sampled in the following order: SE[0] bank[0], SE[1] bank[0], SE[2] bank[0], SE[3] bank[0], SE[0] bank[1], SE[1] bank[1], SE[2], bank[1], SE[3] bank[1]. It is appreciated that different sampling is possible as well.

A lane samples the next search engine pseudo randomly one to sixteen cycles (or any other range) after the previous sample. The sample is taken regardless whether the search engine is in an idle, initial or active state. When the search engine is idle (not processing a character) the sample is marked as invalid.

An idle search engine sends a sample record with its search engine and lane information but with a clear valid bit. A pseudorandom function is generated that increments every sample once in 16 cycles using the four least significant bits of the following LFSR function: $x^9+x^5+1$. Note that other LFSR functions may also be used. The sample records are collected round robin fashion via multiplexer 588 from all the lanes and sent to the search engine performance counters in the upload manager handler logic.

Figure 46:
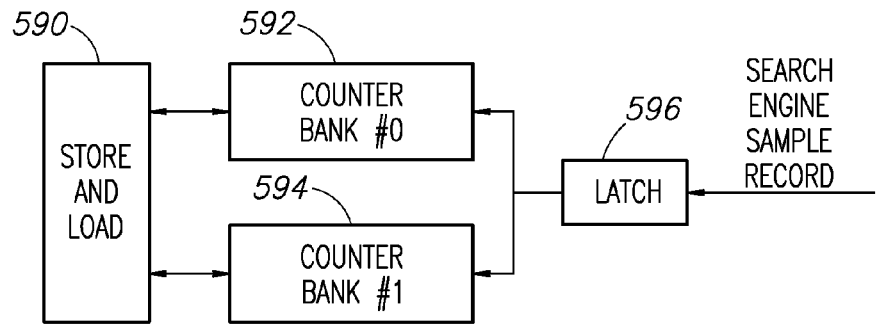
FIG. 46 is a block diagram illustrating the distribution of sample records to the performance counters.

As shown in FIG. 46, two counter banks, counter bank #0 592 and counter bank #1 594, both check each sample record. The sample records are collected from the lanes, and sent to the counter logic and written to latch 596. A selected valid sample record is sent to both counter banks. If the sample record valid bit is not set, the sample is dropped.

Figure 47:
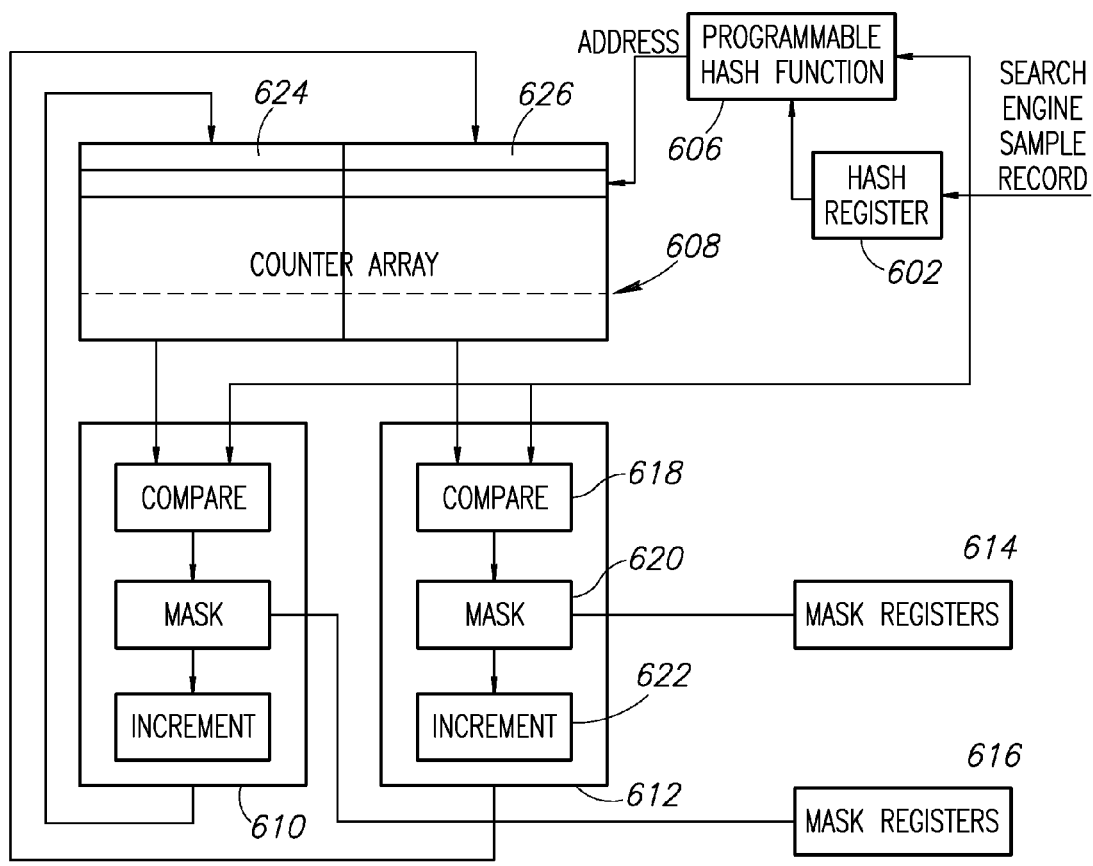
FIG. 47 is a block diagram illustrating the structure of the performance counter bank in more detail.

As shown in FIG. 47, the sample record passes through a programmable hash function 606. The output of the hash function is an address to a counter array 608. The sample records from the search engine are also input to a hash register 602. The output of the hash register is input to the programmable hash function 606. Each counter entry comprises two parts: (1) the reference sample record 624; and (2) the counter itself 626. The sample record and the reference sample record are masked using the mask registers 614, 616 and compared. Mask register 0 is used for the masking of counter 0 in counter bank and mask register 1 is used for masking of counter 1 in the counter bank.

If there is a match, the counter is incremented unless the counter has reached its terminal count or the counters have been frozen. All counters can be frozen if one of the counters reaches its terminal count. This allows the upload manager to obtain accurate relative profiles in the event that one counter saturates.

The sample record value is processed in a programmable hash function 606 to generate the counter's address in the counter array 608. The hash function used may comprise any suitable hash function depending on the particular implementation. In one example embodiment, each bit of the array address is selected from one of the bits in the sample record as defined in a hash register. Each counter array stores a plurality of lines. Each array line stores two counters processed in parallel. There is a separate mask for each counter. The bits in the reference sample record (i.e. from the array) and the search engine sample record corresponding to the set mask bits are compared 618. Following a match on all the compared bits, the counter is incremented 622. Note that a match and increment may occur on one, both or neither of the counters.

Preferably, the upload manager initializes the counter entries (same records reference field, mask select field, and counter field). The upload manager builds data structure in memory with the required content of the performance counter and sends a Write Search Engine Performance Monitor command using a dedicated upload manager application search command. The Store Search Engine Performance Monitor command application search command copies the performance counter from the PMA to main memory. The upload manager monitors the operation of the performance counters by reading the Performance Monitor Status register. This register holds information about the number of events and the state of the counters.

Note that the performance monitoring system may also be used to provide feedback to the search application for the purpose of monitoring, tuning, understanding or improving application performance and behavior. This may be done either using the information already collected by the upload manager, or by performing application-specific profiling using the performance counters.

Local Rule Area Management

Figure 48:
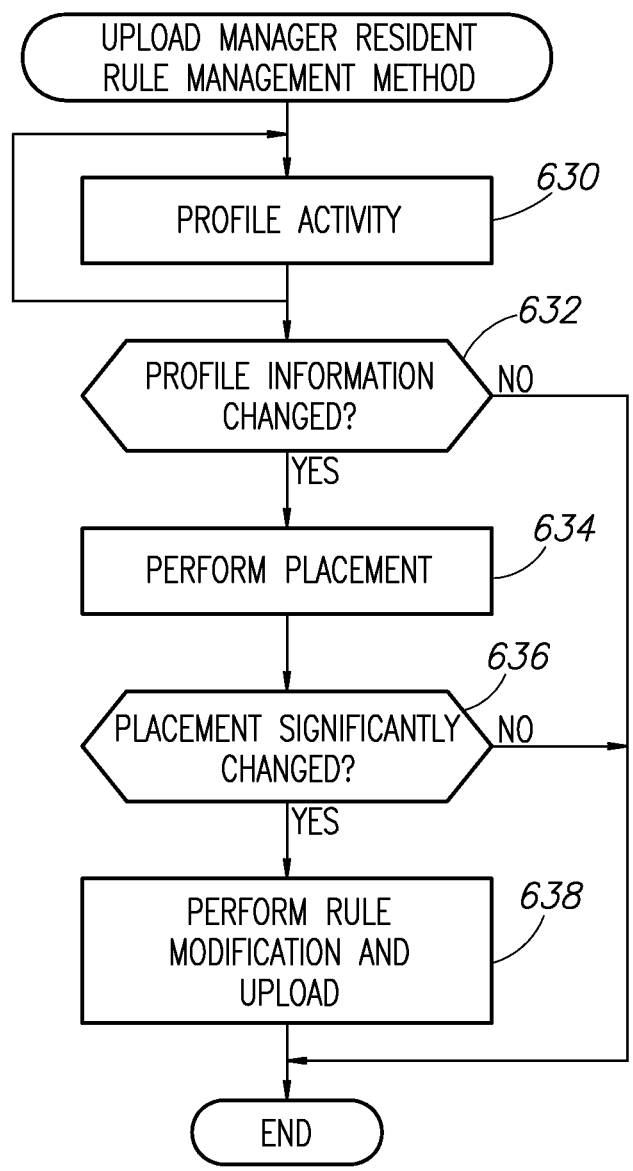
FIG. 48 is a flow diagram illustrating the upload manager local rule management method.
Figure 49:
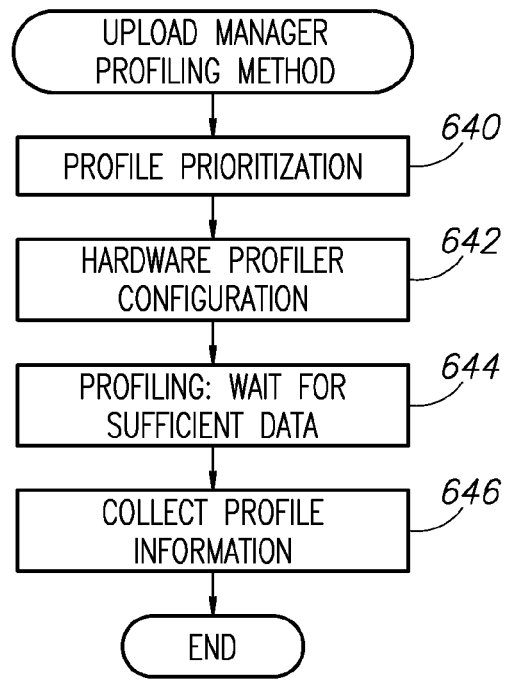
FIG. 49 is a flow diagram illustrating the upload manager profiling method.
Figure 50:
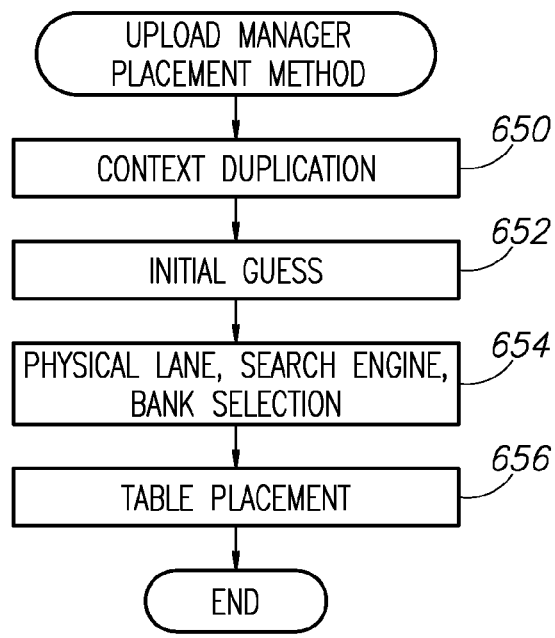
FIG. 50 is a flow diagram illustrating the upload manager placement method.

With reference to FIGS. 48-50, as described supra, the upload manager (UM) functions to manage the local rule area. For optimum performance, rules which are frequently accessed are placed in the local rule area. To achieve this, the upload manager software performs three basic tasks: (1) profiling (step 630); (2) placement (step 634), if profile information changed (step 632); and (3) rule upload and modification (step 638), if placement is significantly improved (step 636). In profiling, the upload manager uses the search engine performance monitor system to determine which rules are frequently accessed. With placement, given a statistical profile, the upload manager determines which rules should be placed in the local area and where they should be placed. The placement must be legal, following inherent constraints, such as not placing multiple rules in the same location and other constraints imposed by hardware limitations. With rule upload and modification, the upload manager uploads rules to the local rule area. Those rules targeting uploaded rules must be modified to reference the local rules in their new location.

In an alternative embodiment, a predefined profile is used that permits the upload manager to perform a 'warm' start whereby the PMA hardware is loaded with an approximated or estimated setting or configuration information. This is in contrast to a 'cold' start whereby the upload manager initially has no knowledge whatsoever about the nature of the system. In the cold start case, the PMA begins running using only the hardware managed cache (default rules cache) until the upload manager collects statistics and updates the rules in the local memory (software managed cache or local rules cache).

The predefined profile may be developed using heuristics, for instance default tables are typically accessed frequently, or may be developed using off-line profiling, for instance during search application development. It is also possible to use multiple strategies. For instance, on-line profiling can be used to determine which contexts are frequently accessed, while predefined profiles are used to estimate which tables and chunks within the tables are frequently accessed. In addition, predefined profiles can be used until the upload manager has sufficient time to collect on-line profiles.

In the example embodiment presented herein, the statistical profile is collected by a hardware profile mechanism.

Alternatively, profile information can be collected using software mechanisms, possibly with higher run-time overhead. For instance, profiles of which contexts are frequently accessed can be developed by the application search API as the application submits search commands.

The goal of profiling is to determine which rules are accessed most frequently. As a first step, profile prioritization is performed (step 640). The hardware profiler is configured (or alternatively a software profiler) (step 642). An "access" is one rule look-up required by one search engine to search a character. The profiling method then waits for sufficient data (step 644) to collect profile information (step 646). Each search engine may perform one or more (e.g., up to two) accesses per character searched, one or more on the transition rule bank and one or more on the default rule bank. The upload manager gathers profile information at three levels of resolution: (1) context level (of all contexts loaded, which ones are frequently accessed); (2) table level (for each search engine in a context, which of the tables in that search engine are frequently accessed; and (3) chunk level (for each table, which chunks within that table are frequently accessed).

Data is collected and maintained at each of these three levels. The access frequency for a particular chunk is the multiple of the context access frequency, the table frequency within that context and the chunk access frequency within that table. The counters are configured and information is collected over the duration of a search, called a "pass". The duration of a pass is preferably based on characters searched and/or counts profiled rather than real time. Multiple passes are typically required to collect all possible information. This process occurs continuously with new passes typically replacing prior data using an exponential decay.

The search engine performance monitor can be configured to collect each level as follows: (1) context level (group IDs correspond roughly to contexts) with the hash function is used to select low-order group IDs; (2) table level (the hash function is used to select the table IDs); (3) chunk level (the record contains the upper two mask bits and state bits which are sufficient to determine which chunks an accessed state could access. Other combinations of hash function, mask and comparison are also possible, and the upload manager may use multiple variants to optimize the collection processes.

In one embodiment, the performance monitor unit comprises two independent banks. The upload manager may configure the banks independently for different tasks. The search engine performance monitor receives both local and global accesses. In general, locked contexts are profiled in both locked and unlocked forms. The resulting samples are combined after collection either in hardware or software (e.g., the upload manager).

Each level of resolution involves collection of more information than the previous level. Since the search engine performance monitor has a fixed number of counters, it takes more passes, and therefore more time, to collect information at higher levels of resolution. The upload manager determines which information is most important to collect at any given time using any suitable mechanism. Each level is also less significant in terms of optimization of the placement. For example, it is more important to know which contexts are being used frequently, than which chunks within each table are frequently used.

Thus, upload manager utilizes a prioritization strategy. It first decides which level of information it will collect on each counter bank, prioritizes information at that level and then maps as much high priority information as possible onto that bank. The following general guidelines determine priority within a resolution: (1) more out-of-date data is more important to profile than recently profiled data; and (2) more frequently accessed groups/tables are more important to profile than rarely accessed groups/tables.

There are four basic steps to the placement algorithm, including: (1) replication (step 650); (2) initial guess (step 652); (3) physical lane, search engine and bank selection (step 654); and (4) physical table selection and placement (step 656). Replication involves determining how many replicated copies (i.e. placing the rules for the same PCH in more than one lane) to make for each context, to ensure proper load balancing across multiple physical lanes. Frequently used contexts are replicated; rarely used contexts are not. The initial approximation makes an initial estimate of how much locked space each compiled context, search engine and bank will need. This is used to avoid placing two compiled banks that both need a lot of space on the same physical bank in the next step. Physical lane, search engine and bank selection are based on the initial guess, for each compiled pattern context wherein the upload manager selects the physical lane(s), physical search engine and physical banks. This is done to: (1) balance "space pressure" across the locked area, i.e. attempt to avoid placing too many frequently used or "large" compiled banks on the same physical bank; and (2) balance "load", the fraction of characters scanned, across the multiple physical lanes, i.e. avoid a situation where excessive scans are sent to one or more physical lanes, leaving other physical lanes underutilized. Regarding, physical table selection, at this point, for every compiled table, the associated physical lane(s) and bank has been selected. The bank (or banks for replicated contexts) where each compiled table could be placed have been determined during the previous step. The algorithm attempts to pack as many compiled chunks into each bank, so as to maximize the characters "covered" (processed via local rules) for that bank.

If a context is heavily used, performance is optimized by storing multiple copies of the pattern context on different physical lanes, in order to obtain higher bandwidth for that context. The simple generic algorithm is just to divide (using a parameterized divider value) the fraction of characters searched by that context by a constant. This is the number of copies of each context that will be placed.

The initial guess portion of the algorithm estimates how much space will be locked for every compiled pattern context, search engine and bank. This information is used in the next step, physical bank selection. The estimation algorithm will greedily "place" tables as long as no constraint prevents them from being placed. This initial guess may be overturned either way by the final placement algorithm. Tables that the initial guess determined would be locked may not be locked, and tables that the initial guess determined would not be locked may be locked. The first part of the algorithm produces a priority sorted list of all compiled tables. The sort order is based on: Access Density=(Table Accesses)/(Table Size), where access density denotes accesses to the table per byte of storage required. The goal is to maximize the accesses per byte of local rule area. Hence, frequently accesses tables and smaller tables are locked first.

The initial guess produces an estimate of the locked size of each compiled pattern context, search engine and bank. Physical bank selection uses this information to map contexts, compiled search engines and compiled banks onto physical lanes, physical search engines and physical banks. The algorithm balances two competing goals: (1) balance the scan load across the physical lanes; and (2) balance the space demand across the physical banks.

The outer loop of the algorithm goes through each context, starting with the most frequently used contexts. The algorithm computes two costs for each possible physical lane (or combination of physical lanes for replicated contexts): (1) a load balance cost, which estimates the cost of imbalanced scan load across the physical lanes; and (2) a space cost, which estimates the space pressure on the search engine banks. Since the compiled search engine banks can be mapped onto the physical search engines in a variety of ways, the algorithm tries all the combinations and selects the mapping with the smallest space cost. It performs a weighted sum of the two costs, and picks the physical lane with the smallest total cost. The cost functions are based on n-squared measures which will try to produce balanced space and scan loading.

After physical bank selection, the physical lane, search engine and bank for every compiled context, search engine and bank has been determined. This implies that the target physical bank for every compiled table is known. This final phase selects actual locations for every locked table. This algorithm starts by producing a sort-list of tables to lock, essentially identical to the sort list produced by the initial guess whereby tables are locked in this order. The placement algorithm operates by finding a spot where a table fits. The "goodness" (or optimality) of a particular place for a table is based on trying to keep as many large contiguous free regions as possible. The n-squared type measure is used again. In addition, free space at the beginning of a table is especially valuable as some tables cannot be shifted at all.

First, if any part of the table has been previously placed, it must be removed, or it might interfere with further placement. Next, the algorithm attempts to find a place for the table, given the prior placement of all the other tables on the bank. If this succeeds, the algorithm moves on to the next table in sorted order.

If not, a "relayout" is invoked. A relayout involves pulling all the previously locked tables off of the bank, and replacing them, and the new table, back on the bank in a more optimal order. In packing problems generally, it is more efficient to pack the large objects first, and then try to fit the small objects around them. The access-density priority described supra, however, attempts to place small tables first. Hence, relayout uses a different priority order based only on size, not access frequency. The relayout succeeds if all the currently placed tables and the new one, are placed successfully. If the relayout does not succeed everything is put back where it was previously and the table is not locked.

The size measure is based on: (1) the number of rows in the table/chunk mask being placed; (2) the minimum shift amount (larger minimum shift amounts make the table harder to place); and (3) the number of duplicate copies of the table (context), wherein more duplicates make the table harder to place.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An apparatus for performing pattern matching on an input character stream, comprising:
   a state register operative to store a current state of one or more state machines;
   a character classifier having a class lookup table (LUT), said character classifier operative to characterize each character in said input stream and generate a class vector therefrom, said class LUT initialized and uploaded by an upload manager in communication therewith;
   a rules selector operative to perform a comparison among a plurality of rule candidates read from a transition rules memory and a default rules memory in an attempt to find a rule matching said current state, input character and class vector, said transition rules stored in compressed form in said transition rules memory and said default rules stored in compressed form in said default rules memory;
   an address generator operative to generate addresses corresponding to a next plurality of transition rules in accordance with input characters and current state, said next plurality of transition rules to be matched against said input character stream and the output of said rules selector;
   wherein said rules selector is operative to test the generated class vector information associated with an input character rather than the actual input character thereby substantially reducing the number of rules required for certain patterns and wherein the address generator is to generate, based at least in part on a global local address translation table, global addresses and local addresses corresponding to the next plurality of transition rules; and
   an upload manager to monitor search engine performance counters and determine the transition rules to store in local memory from main memory based in part on the search engine performance counters.

2. The apparatus according to claim 1, wherein said rules selector is operative to prioritize said plurality of rule candidates to select a winning rule to be matched against said input character.

3. The apparatus according to claim 1, wherein said rules comprise an invalid next state indication operative to indicate that a corresponding next state does not have any rules associated with it and wherein the next state selected comprises an initial state.

4. The apparatus according to claim 1, wherein said compressed rules enables the support of a plurality of pattern context sets.

5. The apparatus according to claim 1, wherein said rules compression is performed using hash functions.

6. The apparatus according to claim 1, wherein said plurality of rules comprises symmetric transition rule and default rule encoding and processing whereby a match is checked on both said transition rule and said default rule.

7. The apparatus according to claim 1, wherein said rules selector comprises a programmable state machine wherein said rules define the transitions thereof based on said input character.

8. The apparatus according to claim 1, wherein rules selection is at least partially based on the class of an input character, wherein said classes are encoded as one or more classes per input character.

9. The apparatus according to claim 1, wherein rules with the global addresses are searched inside a temporary rule area of said rules memory cache.

10. The apparatus according to claim 1, wherein said address generator is operative to generate a new local address wherein rules with local addresses are read directly from local resident rules area of said rules memory cache.

11. The apparatus according to claim 1, further comprising a shared rule extension wherein auxiliary information is added to one or more rules.

12. The apparatus according to claim 11, wherein said auxiliary information comprises a local results processor (LRP) command.

13. The apparatus according to claim 11, wherein said auxiliary information comprises an extended address.

14. The apparatus according to claim 11, wherein said auxiliary information comprises dual hash information.

15. The apparatus according to claim 1, further comprising a mode control operative to select between an anchored and unanchored mode of operation.

16. The apparatus according to claim 1, further comprising a reporting circuit for generating a match report on both the default rule side and transition rule side for the same input character.

17. The apparatus according to claim 1, further comprising a command circuit operative to generate a local results processor (LRP) command on both the default rule side and the transition rule side for the same input character thereby enabling efficient processing of single-character actions on LRP commands.

18. The apparatus according to claim 1, further comprising pipelined operation in each pattern search apparatus thereby enabling multiple virtual lanes.

19. A method of performing pattern matching on an input character stream, said method comprising:
providing a state register for storing a current state;
providing a character classifier having a class lookup table (LUT), said character classifier operative to characterize each character in said input stream and generate a class vector therefrom, said class LUT initialized and uploaded by an upload manager in communication therewith;
performing a comparison among a plurality of rule candidates read from a rules memory cache in an attempt to find a rule matching said current state, input character and class vector, said rules stored in compressed form in said rules memory cache;
performing a pattern search on an input character stream in accordance with said matching rule;
generating global and local addresses corresponding to a next plurality of rules in response to input characters and current states, said next plurality of rules to be matched against said input character stream;
accessing the next plurality of rules from local memory using the local addresses or accessing the next plurality of rules from main memory using the global addresses if the next plurality of rules are not stored in the local memory; and
testing the generated class vector information associated with an input character rather than the actual input character thereby substantially reducing the number of rules required for certain patterns.

20. The method according to claim 19, wherein said method is implemented on a programmable state machine wherein said rules define the transitions thereof based on the current input character.

21. The method according to claim 19, wherein said method is implemented on a programmable state machine wherein a new state is determined following each said rule based on a current rule and the current input character.

22. The method according to claim 19, further comprising prioritizing match results in the event more than one rule has a match associated therewith.

23. A method of performing pattern matching on an input character stream, said method comprising:
receiving a stream of input characters to be searched;
providing a character classifier having a class lookup table (LUT), said character classifier operative to characterize each character in said input stream and generate a class vector therefrom, said class LUT initialized and uploaded by an upload manager in communication therewith;
for each input character, generating a transition rule address and a default rule address;
reading transition rules corresponding to said transition rule address and default rules corresponding to said default rule address from a memory cache;
checking for a match on said input character stream in accordance with said transition rule and said default rule, a current state, input character and class vector;
generating global and local addresses corresponding to a next plurality of rules in response to input characters and current states, said next plurality of rules to be matched against said input character stream;
accessing the next plurality of rules from local memory using the local addresses or accessing the next plurality of rules from main memory using the global addresses if the next plurality of rules are not stored in the local memory; and
testing the generated class vector information associated with an input character rather than the actual input character thereby substantially reducing the number of rules required for certain patterns.

24. The method according to claim 23, further comprising prioritizing match results in the event more than one rule has a match associated therewith.

25. The method according to claim 23, wherein said method is implemented on a programmable state machine wherein said rules define the transitions thereof based on the current input character.

26. An apparatus for performing pattern matching on an input character stream, comprising:
providing a state register operative to store a current state;
a first circuit operative to receive an input character stream;

a character classifier having a class lookup table (LUT), said character classifier operative to characterize each character in said input stream and generate a class vector therefrom, said class LUT initialized and uploaded by an upload manager in communication therewith;

a second circuit operative to generate a transition rule address and a default rule address for each input character;

a rules selector circuit operative to compare a plurality of transition rule candidates corresponding to said transition rule address and default rules corresponding to said default rule address from a rules memory cache coupled thereto in an attempt to find a rule matching said current state, input character and class vector, said transition rules and said default rules are both stored in compressed form in said rules memory cache;

a matching circuit operative to perform a pattern search on said input character stream in accordance with said transition rule and said default rule;

an address generator operative to generate global and local addresses corresponding to a next plurality of transition rules in accordance with input characters and current state, said next plurality of transition rules to be matched against said input character stream and the output of said rules selector; and an update manager operative to access the next plurality of rules from local memory using the local addresses or accessing the next plurality of rules from main memory using the global addresses if the next plurality of rules are not stored in the local memory;

wherein said rules selector circuit is operative to test the generated class vector information associated with an input character rather than the actual input character thereby substantially reducing the number of rules required for certain patterns.

27. The apparatus according to claim 26, further comprising a priority circuit operative to apply rules priority in the event more than one rule has a match associated therewith.

28. The apparatus according to claim 26, wherein said matching circuit comprises a programmable state machine wherein said rules define the state transitions of said state machine based on said input character whereby a new state is determined following each rule.

29. The apparatus according to claim 26, further comprising a priority circuit operative to prioritize match results in the event more than one rule has a match associated therewith.

30. The apparatus according to claim 26, wherein rules with the global addresses are searched inside a temporary rule area of said rules memory cache.

31. The apparatus according to claim 26, wherein rules with the local addresses are read directly from local resident rules area of said rules memory cache.

* * * * *